US010686369B1

(12) United States Patent
Motoyama

(10) Patent No.: US 10,686,369 B1
(45) Date of Patent: Jun. 16, 2020

(54) DEVICE AND PROCESS FOR DETECTING AND MITIGATING REVERSE POWER-FLOW

(71) Applicant: Dean Hatsuo Motoyama, Honolulu, HI (US)

(72) Inventor: Dean Hatsuo Motoyama, Honolulu, HI (US)

( * ) Notice: Subject to any disclaimer, the term of this patent is extended or adjusted under 35 U.S.C. 154(b) by 0 days.

(21) Appl. No.: 16/521,523

(22) Filed: Jul. 24, 2019

(51) Int. Cl.
*H02M 1/42* (2007.01)
*H02M 7/517* (2006.01)
*H02J 9/06* (2006.01)
*H02J 3/06* (2006.01)

(52) U.S. Cl.
CPC ............ *H02M 1/4225* (2013.01); *H02J 3/06* (2013.01); *H02J 9/062* (2013.01); *H02M 7/517* (2013.01)

(58) Field of Classification Search
CPC ........ H02M 1/4225; H02M 7/517; H02J 3/06; H02J 9/062
USPC .............................. 363/89, 94, 109, 114, 125
See application file for complete search history.

(56) References Cited

U.S. PATENT DOCUMENTS

| | | | | |
|---|---|---|---|---|
| 2,697,176 A * | 12/1954 | Keith | ..................... | H02H 7/062 307/57 |
| 3,294,976 A * | 12/1966 | Tipton | ................... | H02H 7/062 307/57 |
| 3,518,491 A * | 6/1970 | Downs | ................... | G01R 19/15 361/82 |
| 4,121,271 A * | 10/1978 | Tsai | ....................... | H02H 3/003 307/127 |
| 2009/0174382 A1 * | 7/2009 | Bucella | ................... | H02M 1/36 323/282 |
| 2015/0194801 A1 * | 7/2015 | Schripsema | ............. | H02H 3/18 361/84 |
| 2015/0311696 A1 * | 10/2015 | Zhu | ........................ | H02H 3/207 361/21 |

* cited by examiner

*Primary Examiner* — Yemane Mehari
(74) *Attorney, Agent, or Firm* — Martin E. Hsia

(57) ABSTRACT

A power sensing and switching circuit, using voltage and current sensors, integrated circuits and logic gates that detects reverse power flow, from reactive loads, non-linear loads or dispersed electrical generators, and mitigates reverse power flow by functioning as a power factor correction device and by diverting the reverse power flow as recycled power to storage, local usage, or remote usage via a recovery line that mitigates distribution grid instability and speeds up the growth of dispersed electrical generators.

11 Claims, 23 Drawing Sheets

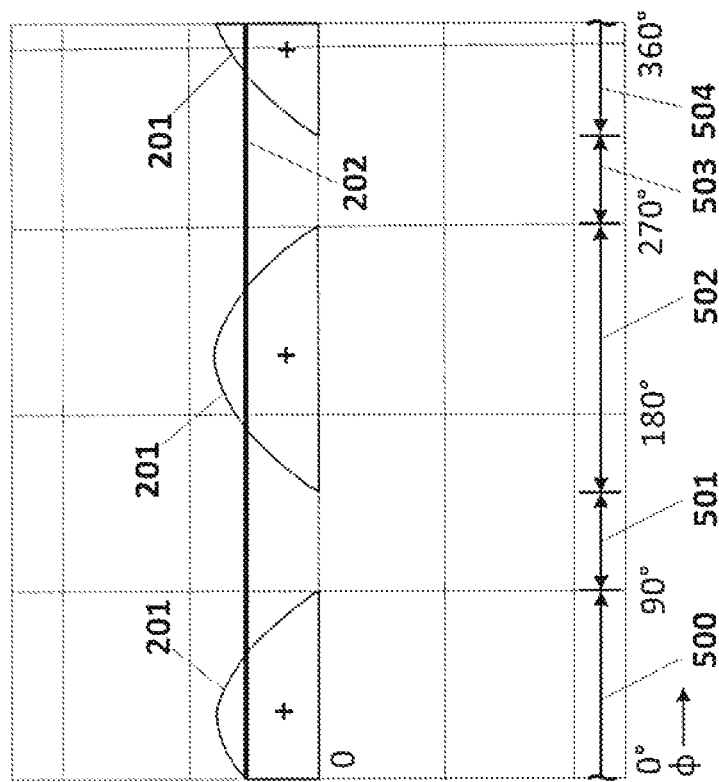
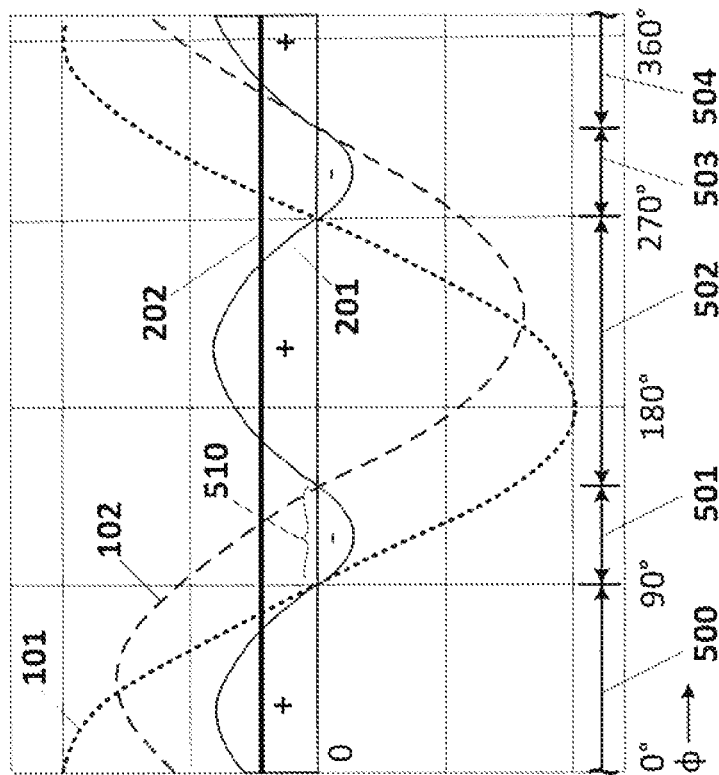

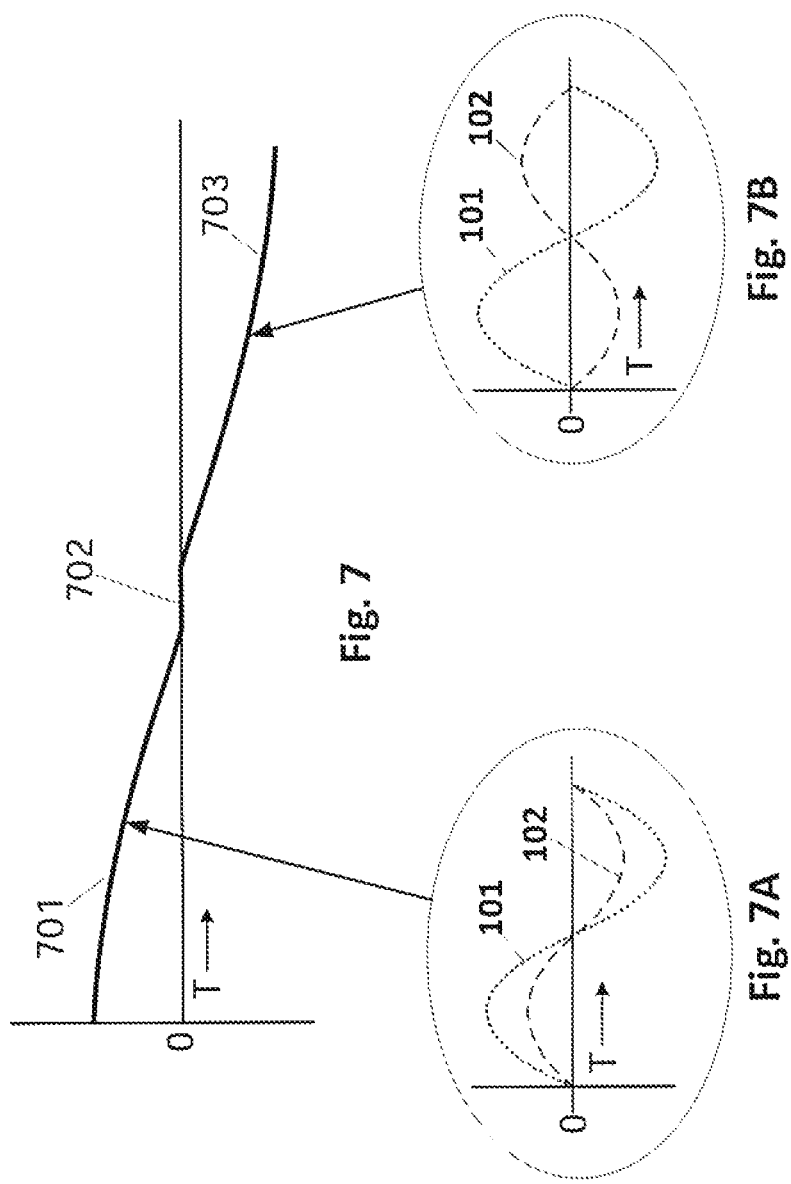

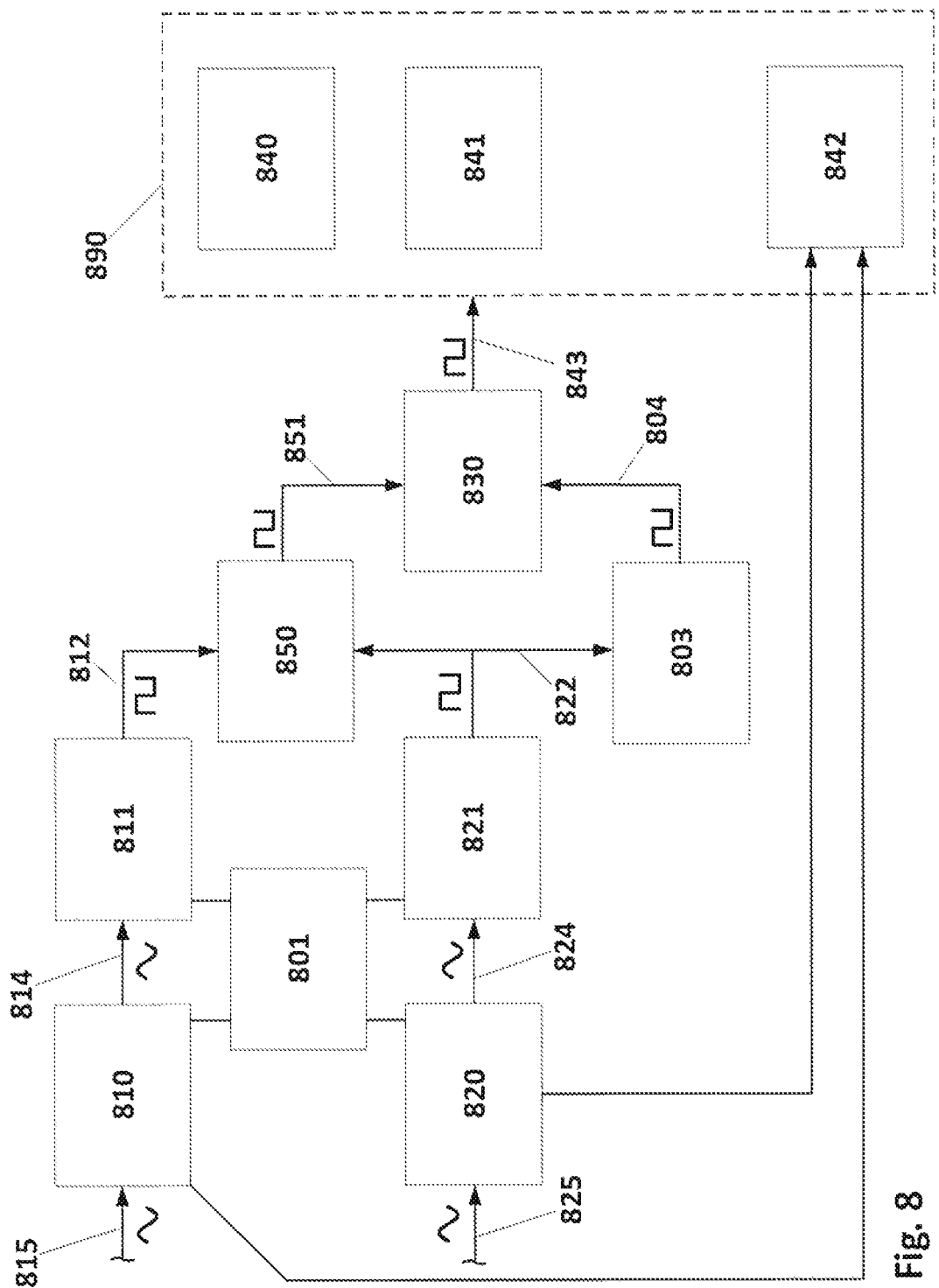

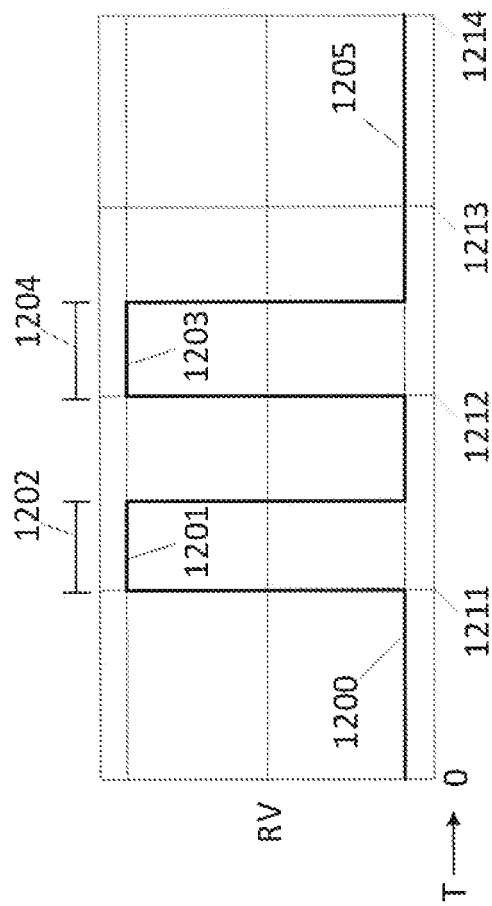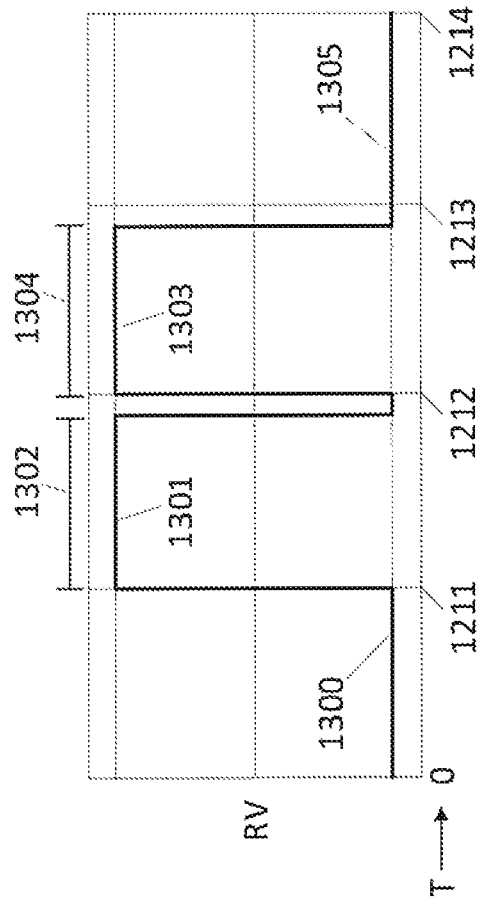

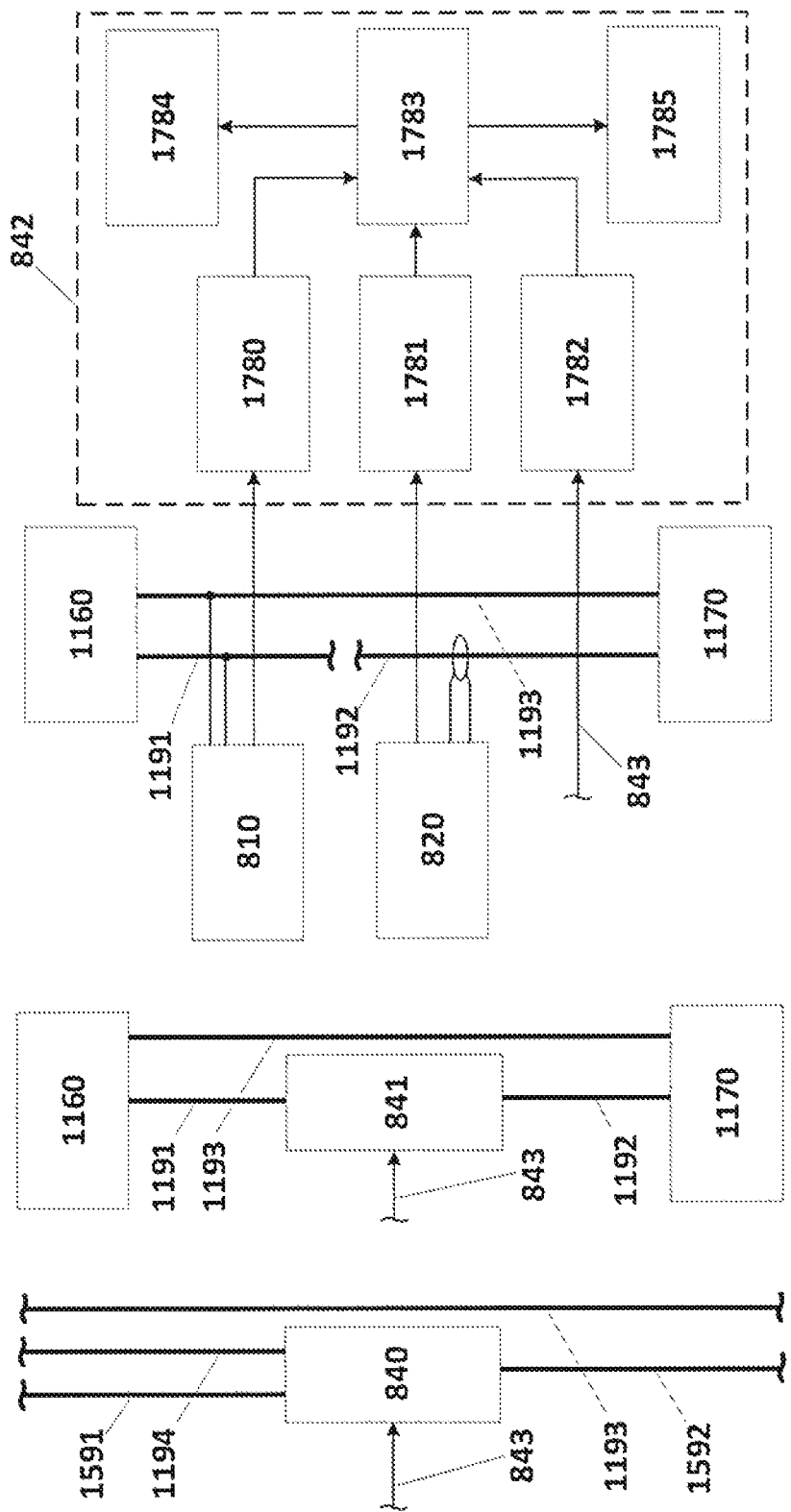

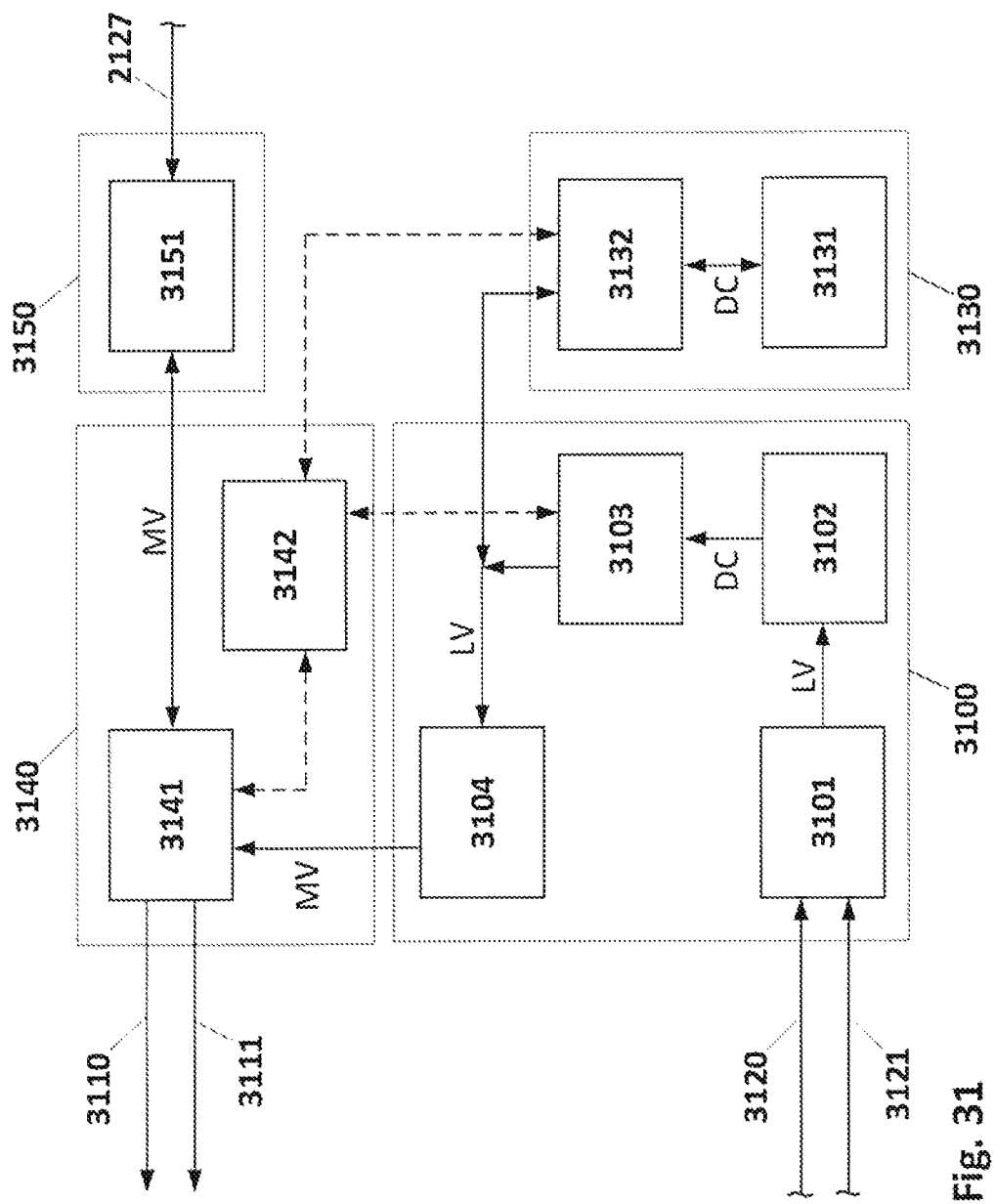

DEVICE AND PROCESS FOR DETECTING AND MITIGATING REVERSE POWER-FLOW

TECHNICAL FIELD

This present invention relates to a simple alternating current (AC) power sensing and switching circuit for detecting and mitigating reverse power flow in real time for energy efficiency, usable for power factor correction and recovering energy from reverse power flow.

BACKGROUND

The electrical power grid has been around for more than a century, delivering reliable power to customers (rate payers). The costs associated with providing this power may come from two main sources: power generation and delivery. In an ideal situation, power is generated and delivered to customers at the lowest cost possible. Inefficiencies add costs to the overall system and any improvements in increasing efficiency may translate to reduced power generation and delivery costs. One of the causes for power grid inefficiency is the presence of reverse power flow. The problem of reverse power flow is complex as it can be unwelcome as a waste problem or welcome as a surplus of power. Controlling reverse power flow requires a fundamental understanding of the sources that cause reverse power flow, which in turn requires a basic understanding of the structure of the power grid described below.

The power grid is made up of four parts: power generation, transmission grid, distribution grid, and customer load.

Power plants generate power through converting the energy in certain materials (for example, coal, natural gas, petroleum, and nuclear) to electricity. The thermodynamic limits of this conversion process result in approximately two-thirds (~65%) of energy in the raw materials being converted to electricity. Traditionally, power plants may be located hundreds of miles away from the customers that they serve, which require the establishment of an efficient delivery system between the power plant and the customer. Power lines are responsible for the delivery of power (analogous to water) between the power generators (analogous to the roots of a tree) and the customer (analogous to the leaves on a tree). Power lines can be divided into two main categories: transmission lines and distribution lines.

Transmission lines (analogous to the trunk of a tree) are power lines located between the generator and the substation that make up the transmission grid section of the power grid. Transmission lines are high voltage lines that are used to transfer power over long distances. Traditionally, transmission lines are unidirectional in a point to multi-point topology (analogous to a tree's complex branch structure from one point to multiple points). Power losses in the transmission lines are roughly 2% to 6%.

Distribution lines are power lines located between the substation and the customer sites that make up the distribution grid section of the power grid. Distribution lines may be further divided into two sub-categories: medium voltage lines and low voltage lines. Medium voltage lines (like the branches of a tree) carry power from the substation to the neighborhood community. Medium voltage lines use transformers to reduce the medium voltage lines to low voltage lines (analogous to twigs on the branches), which are the power lines that are familiar to customers (analogous to the leaves on the twigs). Power losses in the distribution lines are roughly 4%.

The customer load can be divided among three types of consumers: industrial, commercial, and residential. The customer load refers to the various amounts of electricity each consumer requires to satisfy their various electrical needs. Roughly 41% to 45% of the power generated from the utility (which shall mean and include all grid participants, including utilities, energy resellers, energy management companies, etc.), is lost before it reaches the customer site. If the power was generated closer to the customer, then the power losses in the transmission lines alone (roughly 6% to 10%) would be an improvement over power provided by the utility. Exacerbating this problem even further, the utility must also overcome a type of power generated at the customer site, which is referred to as reverse power. The direction of this power is from the customer site to the power grid and is called reverse power flow. There are two types of reverse power flow that are described below: reverse power flow from customer loads and reverse power flow from dispersed electrical generators.

Reverse Power-Flow from Customer Loads.

The customer load is made up of all electrical devices within the customer site that use the power provided by the utility. The customer site contributes to the power losses through the electrical characteristics of the customer load. The electrical characteristics of the customer load are made up of all the individual electrical devices combined. This type of reverse power flow is generated by an inefficient customer load. An inefficient customer load may be referred to as a low power factor load. The power associated with this type of reverse power flow creates two problems: customer loads cannot use this power and the utility needs to generate more power because of it. Therefore, this form of reverse power flow is unwelcomed and may be referred to as waste power. Traditionally, distribution lines are bidirectional (allowing power to move in both directions). This bidirectional capability allows for the waste power to re-enter the power grid and is referred to as backfeeding. If waste power is allowed to enter the transmission grid, then it may cause instability of the overall power grid. To prevent waste power from entering into the transmission grid, protection circuits are implemented by the utility to prevent backfeeding at the distribution grid level. A device that corrects an inefficient customer load may be referred to as a power factor correction device. For cost reasons, power factor correction devices are typically not implemented for the entire customer site but are rather implemented on a per product basis. Currently, no actual data is available to determine the amount of energy wasted from inefficient customer loads. If all products were mandated to have an ideal load (power factor of one), then this would equate to the least amount of power that the utility needs to generate which may translate to a lower cost of energy. However, the benefit of a lower cost of energy may not outweigh the additional cost of adding power factor correction in order for a product to have an ideal load. Cost savings can be gained on an individual consumer basis by using energy efficient products but until actual data on wasted power is known, utilities will have a difficult time justifying costs that are focused on correcting inefficient customer loads to rate payers.

Reverse Power-Flow from Dispersed Electrical Generators.

Dispersed electrical generators are small generators connected to the distribution grid. These generators are decentralized, modular, and flexible technologies that are located close to the customer load they serve and are typically less than ten megawatts. Dispersed electrical generators typically use renewable energy sources (for example, hydroelectric, biomass, biogas, solar power, wind power, and geothermal power) and increasingly play an important role for the electric power distribution grid. In the case of residential photovoltaic (PV) systems, the sun is a free source of energy and because the location of the PV system is at the customer site, the losses in power transmission may be negligible. The economic value of using dispersed electrical generators increases as the distance between the utility power plant and the customer increases. Dispersed electrical generators are designed so that the power generated "looks like" utility power and may be considered having near perfect efficiency (the power is synchronized). If the dispersed electrical generator creates more power than the customer load can consume, then the excess power is sent into the distribution grid as a reverse power flow. When dispersed electrical generators create reverse power flow, because the reverse power is synchronized, utilities do not have to produce more power to overcome this type of reverse power flow. The power associated with this type of reverse power flow is welcomed by both customers and the utility. To encourage renewable energy development, utilities have been directed by public utility commissions to adopt policies to buy the excess power produced by customers' dispersed electrical generators. Interconnection agreements in terms of renewable energy contracts are usually made between dispersed electrical generator owners and the utility. For contracts (like net metering contracts), the utility is required to allow the overgeneration of power into the distribution grid. However, utilities find distribution grid instability grows as more dispersed electrical generators are connected. Distribution grid instability occurs when excess power generated by the dispersed electrical generators is sent into the grid. Because of this, net metering contracts are now being replaced with contracts that limit the dispersed electrical generator's generation capacity to less than what is locally consumed.

BRIEF DESCRIPTION OF INVENTION

The terms "presently preferred" and "preferred", once used to describe a process, function, or part, may be discarded for the remainder of the document for the sole purpose of improving the readability of the document. The expected use of these terms will be understood to remain with the described process, function, or part unless otherwise specified.

Each dispersed electrical generator is a micro-power plant, which may not be controlled by the utility managing the grid. When thousands of dispersed electrical generators are connected to the utility's distribution grid, they make up an uncontrolled power plant producing variable amounts of power, which is dependent on conditions such as the weather and customer load. The overgeneration of power by dispersed electrical generators create reverse power. Inefficient customer loads consume power at times create reverse power flow at other times. The reverse power flow in this case makes the load appear as a generator. Therefore, we can say that reverse power flow appears as a generator to the power grid. If the protection circuits on the distribution grid were designed to isolate the transmission grid from the backfeeding problem, then placing generators on the distribution grid would seem to be contradictory to this design. If the reverse power flow were thought of as generators, then they should logically be put on separate transmission lines. Since the power entering a customer site may consist of both forward power flow and reverse power flow, detecting the difference between the two flows and sending the forward power flow to the customer load and diverting the reverse power flow away from the power grid would mitigate the backfeeding problem. The reverse power flow may then be recycled and reused. This is the basic concept of the present invention.

PATENT CITATIONS AND REFERENCES

U.S. Pat. No. 9,966,841 B2 to Choudhury, incorporated herein by reference, discloses a power supply that includes a power factor correction module that is real time and adaptive, based on operating conditions using an electronic switch.

U.S. Pat. No. 7,098,631 to Cohen, incorporated herein by reference, discloses a power factor correction module that modulates on and off intervals of a power switch using a current sensor that does not require sensing of the instantaneous value of the input voltage from the converter.

U.S. Pat. No. 4,672,298 to Rohatyn, incorporated herein by reference, discloses a power factor correction system adapted to cooperate with a line supplying power from a power generator that includes a reactive power-compensating device in shunt with the line supplying power, and is adapted to be connected in shunt with the inductive load.

U.S. Pat. No. 5,341,082 to Lorenezen et al., incorporated herein by reference, discloses circuitry for connecting a generator to a battery that prevents reverse current flow.

U.S. Pat. No. 9,476,740 to Zigovszki et al., incorporated herein by reference, discloses technologies for detecting and alerting to reverse flow conditions.

US Patent Application Publication US 2019/0097427 A1 by Tesla, Inc., incorporated herein by reference, discloses electrical cables, independent of connections to a power grid, connecting end-user electrical systems having energy-generation systems to other end-user electrical systems, or to the grid, so that power can be diverted between and among them.

PCT International patent application PCT/US2005/020005 (published as WO2005120202A2), incorporated herein by reference, discloses a power factor correction circuit with a voltage sensing circuit that compares output voltage to a reference voltage and that drives a switch with a pulsed signal.

"Reverse Power Mitigation System for Photovoltaic Energy Resources", Worcester Polytechnic Institute and National Grid, by Chojnowski, T., LaPlante, D., and J. Truong, (December 2015), incorporated herein by reference, discloses a reverse power flow mitigation system within a simulated electrical grid that detects the power output from a substation and sends a signal to a dispersed electrical generator to control its output, incorporated herein by reference.

"Mitigating the Impacts of Photovoltaics on the Power System", Schweitzer Engineering Laboratories, Inc., by Hao, K., Achanta, S., Rowland, B., and A. Kivi, (March 2017), incorporated herein by reference, discloses a high-speed control and radio communications to reduce output of a power plant to match local loads and limit reverse power flow.

"Transient Over-Voltage Mitigation and its Prevention in Secondary Distribution Networks with High PV-to-Load Ratio", Electric Vehicle Transportation Center, by Schwarzer, V., and R. Ghorbani, (February 2015), incorporated herein by reference, discloses various methodologies to mitigate transient over-voltages in the power grid.

"Clean energy technologies threaten to overwhelm the grid. Here's how it can adapt", Vox Media, by David Roberts, (December 2018), incorporated herein by reference, discloses a bottom-up redesign of the outdated power grid.

"Lost In Transmission: How Much Electricity Disappears Between A Power Plant And Your Plug?", Inside Energy, by Jordan Wirfs-Brock, (November 2015), incorporated herein by reference, discloses energy losses from generation to consumption.

"A Tale of Two Visions: Designing a Decentralized Transactive Electric System", IEEE Power and Energy Magazine, Volume 14, Issue 3, by Kristov, L., De Martini, P., and J. D. Taft, (May-June 2016), incorporated herein by reference, discloses two ways that distributed energy resources may be managed.

BRIEF DESCRIPTION OF DRAWINGS

FIG. 5 is a graph showing voltage, current, power and average power during one cycle of alternating current when voltage and current are +45° out of phase.

FIG. 6 is a graph showing voltage, current, power and average power during one cycle of alternating current when voltage and current are +45° out of phase, where reverse power flow is diverted by the present invention.

FIG. 7 is a graph showing power from the electrical utility's viewpoint as a dispersed electrical generator's power is increased. FIG. 7A shows that, before the dispersed electrical generator's power equals the entire load, voltage and current are completely in phase. FIG. 7B, shows that, after the dispersed electrical generator's power exceeds the entire load, voltage and current are out of phase, resulting in reverse power flow.

FIG. 8 is a conceptual diagram of the preferred embodiment of a device according to the present invention.

FIG. 12 is a graph showing input pulses to a monostable multivibrator.

FIG. 13 is a graph showing an output of the monostable multivibrator in FIG. 12 extending the duration of the input pulses.

FIG. 15 is a functional block diagram of the preferred embodiment of a device according to the present invention connected to a single pole double throw switch that is part of a switch control group.

FIG. 16 is a functional block diagram of the preferred embodiment of a device according to the present invention connected to a single pole single pole switch that is part of a switch control group.

FIG. 17 is a functional block diagram of a monitoring circuit that is part of a switch control group.

FIG. 31 is a block diagram of reinsertion of the recovery lines at a utility-owned site, like a substation, of the present invention to the distribution grid.

DISCLOSURE OF INVENTION

Figure 2:
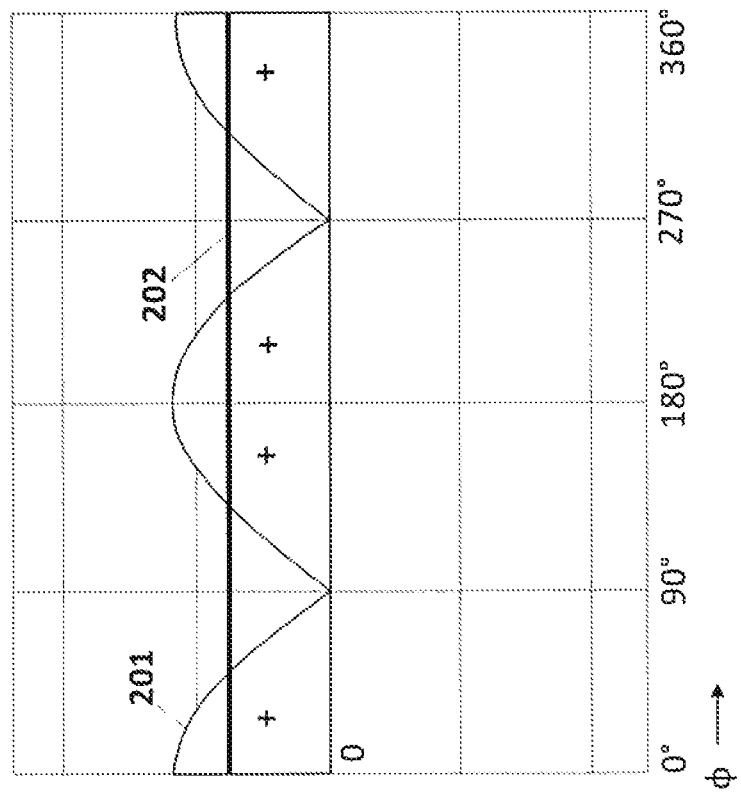
FIG. 2 is a graph showing power and average power during one cycle of alternating current when voltage and current are completely in phase.

In the following description, various embodiments and examples will be described. For clarity, specific configurations and details are set forth to provide a thorough understanding of the embodiments and examples. However, it will also be clear to one skilled in the art that the embodiments and examples may be practiced without the specific details. Well-known features may be omitted or simplified in order not to obscure the embodiment and examples being described. The preferred embodiment of the invention is a power sensing and switching circuit that detects and mitigates reverse power flow by detecting reverse power flow in real time and immediately diverting the reverse power flow to be reclaimed as recycled power.

New terminology will be introduced, as these are new concepts used by the present invention, which are described below. The present invention seeks to further define the role of the distribution grid by providing a more granular definition of the use of the distribution lines as well as introducing new power lines into the distribution grid. The distribution lines will be used to carry utility generated power to the customer load, and this direction will be referred to as forward power flow. The protection circuitry on the distribution lines will remain and be used to mitigate backfeeding issues in the event that accidental power is injected into the distribution grid. The present invention calls for new transmission lines between the substation and the customer site, which will carry only reverse power flow. These new transmission lines follow the same path as the existing distribution lines that may run on utility poles or in utility underground implementations between neighborhood groups of customers and the substation. A similar naming convention, which is used for the distribution lines, may be used for the new power lines. The naming convention may also help in distinguishing the intended direction of the power flow. Existing distribution lines which support power in the forward power flow direction will have power in their names, while lines which support power in the reverse power flow direction will have the word recovery in their names. Using this naming convention, the new lines may be called recovery lines. The power lines between the distribution line for the neighborhood groups of customers and individual customer sites are called power service lines. Therefore, lines that may connect the recovery lines to the customer site may be called recovery service lines. The recovery lines will use the same cable type as the existing low voltage lines. The recovery lines may be thought of as low voltage transmission lines that are defined in the distribution grid. This prevents confusion that may arise in distinguishing high voltage transmission lines from these new low voltage recovery lines. Reverse power flow from reactive, non-linear, and the overproduction of power from dispersed electrical generators may coexist. Therefore, even though the power produced by the dispersed electrical generator may have a power factor close to one, because it may now be combined with reverse power from reactive and non-linear loads, the net power sent to the distribution grid may result in a net power factor being less than one. This less than ideal power may be referred to as recycled power and may be sent to new lines that may be referred to as recycled power lines. Recycled power needs to be "treated" before it may be used. Recycled power prior to being "treated" may be sent to new lines that may be referred to as preconditioned power lines. "Treated" recycled power may be referred to as reconditioned power and may be sent to new lines that may be referred to as conditioned power lines.

The invention is a device for mitigating reverse power flow to a power source providing an alternating current to a load. The alternating current alternating according to a current waveform and having a cyclically varying voltage alternating between a minimum and a maximum at a frequency that defines a cycle duration. The varying voltage has a voltage waveform. Changes in current flow direction define current middle crossing points. The load changes the current waveform so the current waveform fluctuates, may vary in periodicity, and may differ from the voltage waveform, and noise is introduced into the alternating current by extraneous sources or the device.

The invention comprises:
(1) a power supply having a power supply positive voltage and a power supply negative voltage that creates a reference voltage midway between the power supply positive voltage and the power supply negative voltage;
(2) a voltage sensor connected to the power source; whereby the voltage sensor senses the varying voltage and outputs in real time a voltage-representative voltage signal with approximately the voltage waveform, scaled and biased to be centered between the power supply positive voltage and the power supply negative voltage and with crossing points over the reference voltage defining voltage middle crossing points at the ends and midpoint of each cycle;
(3) a current sensor connected to the load, whereby the current sensor senses the alternating current and outputs in real time a current-representative voltage signal with approximately the current waveform, scaled and biased to be centered between the power supply positive voltage and the power supply negative voltage and also scaled to be able to be compared with the reference voltage;
(4) a voltage any to square wave converter that has a voltage converter propagation delay, to receive the voltage-representative voltage signal and compare the voltage-representative voltage signal with the reference voltage, having a hysteresis circuit to generate a high voltage trigger point voltage in response to a voltage-representative voltage signal higher than the voltage middle crossing point plus the noise, and a low voltage trigger point voltage in response to a voltage-representative voltage signal lower than the voltage middle crossing point minus said noise, and that outputs voltage square waves that are high in response to the high voltage trigger point voltage and low in response to the low voltage trigger point voltage, whereby a voltage square wave that transitions from low to high and back to low again constitutes a voltage pulse;
(5) a current any to square wave converter that has a current converter propagation delay, to receive the current-representative voltage signal, and to compare the current-representative voltage signal with the reference voltage, having a hysteresis circuit, to generate a high current trigger point voltage in response to a current-representative voltage signal higher than the current middle crossing voltage plus said noise, and a tow current trigger point voltage in response to a current-representative voltage signal lower than the current middle crossing voltage minus said noise, and that outputs current square waves that are high in response to the high current trigger point voltage and low in response to the low current trigger point voltage, whereby a current square wave that transitions from low to high and back to low again constitutes a current pulse having a leading edge and a trailing edge, that has a current pulse length;
(6) a polarity checker that compares the voltage square waves and the current square waves that generates a polarity pulse when the voltage square wave is high and the current square wave is low, and also when the voltage square wave is low and the current square wave is high;

(7) a pulse extender connected to the current any to square wave converter that extends a current pulse for a pulse duration time and continues to extend the pulse duration time if a subsequent current pulse arrives in less than a cycle duration, whereby an extended current pulse indicating a reliable current for the pulse duration time is created; and (8) a switch control leads to an output operably connected to the pulse extender and the polarity checker that enables the polarity checker only for the pulse duration time, whereby when the polarity pulse is high, reverse power flow is considered being possibly present, and when the polarity pulse is low, reverse power flow is not considered being possibly present, but the polarity checker is enabled only if the extended current pulse indicates reliable current, whereby the switch control indicates to the output reverse power flow when reliable current is indicated and reverse power flow is considered being possibly present, and the switch control indicates to the output no reverse power flow when reliable current is not indicated or when reverse power flow is not considered being possibly present.

The voltage converter propagation delay and the current converter propagation delay are substantially identical.

Preferably, the high current trigger point and the high voltage trigger point are substantially identical, and the low current trigger point and the low voltage trigger point are substantially identical.

Preferably, the pulse extender further comprises:

(1) a leading pulse lengthener triggered by the leading edge of the current pulse having a leading pulse length of greater than half of the cycle duration but less than the cycle duration; and a trailing pulse lengthener triggered by the trailing edge of the current pulse having a trailing pulse length of slightly less than the cycle duration; and a two-input OR gate connected to the leading pulse lengthener and the trailing pulse lengthener that extends the pulse duration time of the pulse extender if either of the leading pulse lengthener or the trailing pulse lengthener is triggered; and the leading pulse lengths and the trailing pulse lengths overlap each other to cover the periodicity of current pulses that may vary in periodicity from the voltage pulses;

(2) a leading pulse lengthener triggered by the leading edge of the current pulse having a leading pulse length of greater than half of the cycle duration but less than the cycle duration; and a trailing pulse lengthener triggered by the trailing edge of the current pulse having a trailing pulse length of slightly less than the cycle duration; and a three-input OR gate connected to the leading pulse lengthener and the trailing pulse lengthener and that also receives the current pulse, that extends the pulse duration time of the pulse extender if the leading pulse lengthener is triggered or the trailing pulse lengthener is triggered or the current pulse is received; and the leading pulse lengths and the trailing pulse lengths and the current pulse lengths overlap each other to cover periodicity of current pulses that may vary in periodicity from the voltage pulses; or (3) a trailing pulse lengthener triggered by the trailing edge of the current pulse having a trailing pulse length of slightly less than the cycle duration; and a 2-input OR gate connected to the trailing pulse lengthener, and that receives the current pulse that extends the pulse duration time of the pulse extender if the trailing pulse lengthener is triggered or the current pulse is received; and the trailing pulse lengths and the current pulse lengths overlap each other to cover the periodicity of current pulses that may vary in periodicity from the voltage pulses.

Preferably, the output comprises a monitoring circuit connected to the voltage sensor, the current sensor, and the switch control, that provides reverse power flow metering information.

Preferably, when the output is a monitoring circuit, the pulse extender further comprises:

(1) a trailing pulse lengthener triggered by the trailing edge of the current pulse having a trailing pulse length of slightly less than the cycle duration; and the trailing pulse lengths cover periodicity of current pulses that may vary in periodicity from the voltage pulses.

Preferably, the power source is a power service line, and the load is a customer load line, the output comprises a single pole double throw switch controlled by the switch control connecting the power service line to (1) the customer load line, when the output of the switch control indicates no reverse power flow, and (2) a recycled power line, when the output of the switch control indicates reverse power flow, that diverts the alternating current from the customer load line to the recycled power line as recycled power.

Preferably, when the output is a single pole double throw switch, the invention further comprises:

(1) a power transformer circuit connected to the recycled power line;

(2) a preconditioned power line connected to the power transformer circuit; and (3) a recycled power reconditioning circuit containing a recycled energy storage system connected to the preconditioned power line.

When the output of the switch has the recycled power, the alternating current flows from the recycled power line through the power transformer circuit, through the preconditioned power line to the recycled power reconditioning circuit and into the recycled energy storage system.

Preferably, the output comprises a single pole single throw switch controlled by the switch control connected to the load that opens when the switch control indicates reverse power flow and closes when the switch control indicates no reverse power flow.

Preferably, when the output is a single pole single throw switch, the pulse extender further comprises a trailing pulse lengthener triggered by the trailing edge of the current pulse having a trailing pulse length of slightly less than the cycle duration; and the trailing pulse lengths cover periodicity of current pulses that may vary in periodicity from the voltage pulses.

The invention defines a process for mitigating reverse power flow in an alternating current circuit that includes a generator and a customer load which utilizes the power sensing and switching circuit to detect times of reverse power flow by detecting when the current and voltage are of opposite polarities and diverts the reverse power flow to create recycled power. The recycled power sent to the recovery service line is a low voltage line. The recovery service line connects to recovery lines, are low voltage lines for remote recycling of the recycled power. The recycled power sent to preconditioned power lines may be used for local recycling of the recycled power by reconditioning the recycled power using a recycled power reconditioning circuit to create reconditioned power and introducing the reconditioned power into a customer service panel for use by a customer load or by storing the recycled power in an energy storage system for future use.

The present invention comprises four parts: (1) a power sensing and switching circuit, (2) recovery lines, (3) a power transformer circuit, and (4) a recycled power reconditioning circuit.

Understanding Reverse Power Flow.

Reverse power flow is a complex subject and requires knowledge in elementary electrical concepts to understand what it is and knowledge in utility practices to understand how it is presently being managed. This baseline terminology will be described below. Utilities charge their customers for the energy they generate. To determine how much energy is being used, the utilities measure the hours of energy (watt-hours) being used by the load. Power is the capacity of energy measured in watts, and the total usage (per month) is billed to a customer. Utilities provide power to customers via alternating current circuits. The components of power are called voltage (electrical pressure) and current (electrical flow) and are described below.

For clarity and simplicity, single phase delivery of power is described, and the same concepts may be applied to polyphase systems. The measurement taken over one or more cycle durations, which is the root mean square (similar to average) of the peak voltage, is called the mains voltage (+120 volts AC in the United States [US]), which is regulated by utilities. US power systems are described except where noted and the same concepts may be applied for other countries with different mains voltages.

In a simple AC circuit comprising a power source and a load, both the current and voltage are ideally sinusoidal. The current alternates back and forth towards and away from the source, with a voltage that varies between a minimum −170 volts AC and a maximum +170 volts AC peak-to-peak voltage, at a specific frequency (60 cycles per second [Hertz] in the US). The peak voltage is the voltage difference between the middle crossing point 0 volts of the peak-to-peak voltage and the maximum voltage +170 volts AC. The time taken for a cycle to complete may be referred to as a cycle duration (1/60 cycles per second or 16.7 milliseconds). Alternating current (AC) flows in an alternating direction (goes back and forth) during each cycle, with the current positive when moving in one direction and negative when moving in the other direction. As the load's energy usage increases and decreases, the current will increase and decrease as well. Because both the current and the voltage alternate with time, the power will alternate with time as well. The measurement of the mains voltage +120 volts AC is taken over one or more cycle durations of the ideally sinusoidal voltage, which varies between ±170 volts AC, which explains the relationship between the two voltage measurements. The current is also measured over one or more cycle durations and the product of the voltage and current is the power measured in watts, which is the unit of energy that utilities base their billing on. From a practical standpoint, power measurements are made over one or more cycle durations that are used for calculating billing information.

Resistance is a concept used in direct current (DC) circuits and restricts the flow of electricity in direct currents. Impedance is a concept used in alternating current (AC) circuits and restricts the flow of electricity in alternating currents. There are three different elements that make up the impedance of the load: resistor, capacitor, and inductor. The characteristics of the load may be resistive (from a resistor), capacitive (from a capacitor), inductive (from an inductor), or a combination of the three. A capacitor is a device that stores electrical energy in an electric field, while an inductor is a device that stores electrical energy in a magnetic field when an electric current is passed through it. The load comprises an active part (resistive) and a reactive part (capacitive or inductive).

A capacitor may be thought of as providing a negative contribution to the reactive part of the load (capacitive reactance), while an inductor may be thought of as providing a positive contribution to the reactive part of the load (inductive reactance). When the reactance of the capacitor and inductor contributions are added together, the net result will be the sum of the two contributions. If there is more capacitive reactance than inductive reactance, then the reactive part of the load equals a net capacitive reactance. Likewise, if there is more inductive reactance than capacitive reactance, then the reactive part of the load equals a net inductive reactance. The reactance contributions of capacitors and inductors are affected by the frequency of the alternating current. Capacitive reactance decreases as frequency increases and inductive reactance increases as frequency increases. The impedance of a load has a profound effect on the phase of the voltage and current waveforms, which affects the delivery of power.

Phase is the comparison of the voltage and current waveforms. Being in phase means that the voltage and current waveforms are both positively increasing or negatively increasing at every point of time, with both passing through their middle crossing points at the same time. Any deviation of the voltage and current from this is referred to as being out of phase. The phase difference between the voltage and current is dependent on the impedance of the load. If the capacitive reactance increases in the load, then the phase difference between the voltage and current waveforms tends towards −90°. If the inductive reactance increases in the load, then the phase difference between the voltage and current waveforms tends towards +90°. The most efficient transfer of power is when the voltage and current are in phase (difference between the voltage and current waveforms are 0°). Efficiency starts to decrease as the phase difference moves away from 0°. If there is a way to remove or mitigate the reactive part of the load, then this would increase the overall efficiency of the power generation and delivery system. Utilities want to be as efficient as possible when generating power. However, the active and reactive characteristics of the load are created by the customer load, which the utility has no control over. To quantify this efficiency, a simple measurement (power factor) is used to describe the efficiency of the load so that corrective measures may be taken to reduce the impact of the reactive part of the load. The power factor is calculated using two measurements (real power and apparent power), which are described below.

The combination of the active power and the reactive power is referred to as the complex power. The apparent power is the power supplied to the circuit, comprising the magnitude of the complex power. Power factor is a measure of the efficiency of the power being used in an AC circuit and is the ratio of real power (measured in watts) to the apparent power (measured in volt-amperes reactive). The power factor is a unitless value that has a range from −1 to +1. The power factor of a circuit is +1 when the voltage and current are in phase. If the phase difference between the voltage and current increases, then the power factor tends toward 0. If the phase difference between the voltage and current decreases, then the power factor tends towards +1. Where the load is a power generator, the power factor is −1.

Transmission lines are not ideal conductors because they have resistive elements (power lines and other wires have resistance) and reactive elements (for example, transformers) in them. Power factor correction devices on the distribution grid help to reduce power losses due to the reactive elements in the transmission lines. A high power factor at or near +1 is desirable in an electrical transmission system to reduce transmission losses and improve voltage regulation, which helps to reduce the cost of the overall system.

The general approach to mitigating low power factor reactive loads is to apply reactive components that have an equal but opposite reactance to the load such that the combined reactance is zero, resulting in a purely active load. This would be a good approach if the load reactance were static, but unfortunately the load is constantly changing. The cost associated in dynamically compensating the reactive changes in the load may be justified for larger commercial customers but may be too costly for residential customers. Since the costs of mitigating low power factor loads may be prohibitively high at the customer site, utilities have focused their efforts on grid-tied, power factor correction devices. Utilities have implemented power factor correction devices on the grid (for example, synchronous condensers, static and dynamic volt-ampere reactive compensators, static synchronous compensators, and capacitor banks). These systems are implemented within a community attempting to aggregate all the reactive loads into a net reactive load that can be dealt with more easily in centralized locations. These systems work by using passive elements (capacitors and inductors) to alter the phase of electrical currents and voltages and are effective for low power factor loads.

A load is non-linear when the current used by the load does not have a sinusoidal waveform even if it is connected to a sinusoidal voltage. These non-linear sinusoidal currents contain harmonic (higher multiples of the frequency of a periodic waveform) noise currents that interact with the impedance of the distribution grid. The interaction creates voltage distortion that can affect the utility equipment in the distribution lines as well as the customer loads that are connected to it. Non-linear loads were primarily found in heavy industrial equipment (such as arc furnaces, large variable drives, heavy rectifiers for electrolytic refining). The harmonics were typically localized and mitigation of the harmonics was done locally without affecting the distribution grid. Today, non-linear loads are now common and have created harmonic noise problems in industrial applications and in commercial buildings. Compact fluorescent lights, light-emitting diode (LED) based lights that contain their own AC/DC lighting ballasts, and switch-mode power supplies used in modern televisions, computer systems and electronic equipment are examples of products which incorporate non-linear power supplies. Switch mode power supplies are power supplies that use higher frequencies to reduce the size of internal transformers for miniaturization in consumer electronics. Switch-mode power supplies can be found in virtually every power electronic device (such as computers, servers, monitors, printers, photocopiers, telecom equipment, broadcasting equipment, banking machines). Switch-mode power supplies have the advantages of reducing power consumption, reducing heat dissipation, and reducing the size and weight of power supplies, which are becoming more commonplace and replacing traditional linear power supplies. However, switch-mode power supplies are also a highly non-linear load, and they may show power factors as low as +0.6. Non-linear power factor correction devices come in two categories: passive and active. Passive power factor correction devices incorporate inductors and capacitors to provide a low-frequency pass filter circuit to attenuate (reduce) the high frequency harmonics created by the non-linear loads. The disadvantages of passive power factor correction circuits are large filter sizes, high costs, and the necessity for different passive circuits to operate in different countries, making portability an issue. These disadvantages make passive power factor correction unsuitable for many applications. Active power factor correction uses active electronic circuitry and is typically used as the power factor correction circuit in switch-mode power supplies. Active power factor correction circuits incorporate complex circuitry, called a boost convertor and controller, that can boost the voltage to keep the current in phase with the voltage, thus making the power factor closer to +1. An active power factor correction device for switch-mode power supplies decreases the efficiency of the power supply because of the additional power required for the active circuit. The gains in efficiency of the switch-mode power supply are offset by the additional power that the active circuit requires.

Detection of Reverse Power-Flow.

To provide consistency in the figures, voltage waveforms may be represented as dotted lines, current waveforms may be represented by dashed lines, and power waveforms may be represented by solid lines. Graphs are not to scale and are only intended to provide a general understanding of AC power principles. To provide consistency in terminology, voltage refers to instantaneous voltage, current refers to instantaneous current, and power refers to instantaneous power, unless otherwise specified. The same generator and load circuit as described will continue to be used for consistency unless otherwise specified. Reverse power flow originates from three sources: reactive power in loads, non-linear power in loads, and the overgeneration of power. Each of the three sources of reverse power flow will be described below.

Detection of Reverse Power-Flow in Reactive Loads.

If the load is purely resistive (such as in a light bulb or oven), then the instantaneous voltage and instantaneous current remain in phase. A purely resistive load may be used as a baseline to determine, in an ideal situation, the direction of the power flow. Purely resistive loads are associated with the active part of power (or real power). In a purely resistive load, the product of the instantaneous voltage and instantaneous current, which equals the instantaneous power, is always positive. Transmission losses may occur in the utility power grid between the generated power and the customer load but in a purely resistive load, all power that reaches the load is fully used (consumed) by the load.

Figure 1:
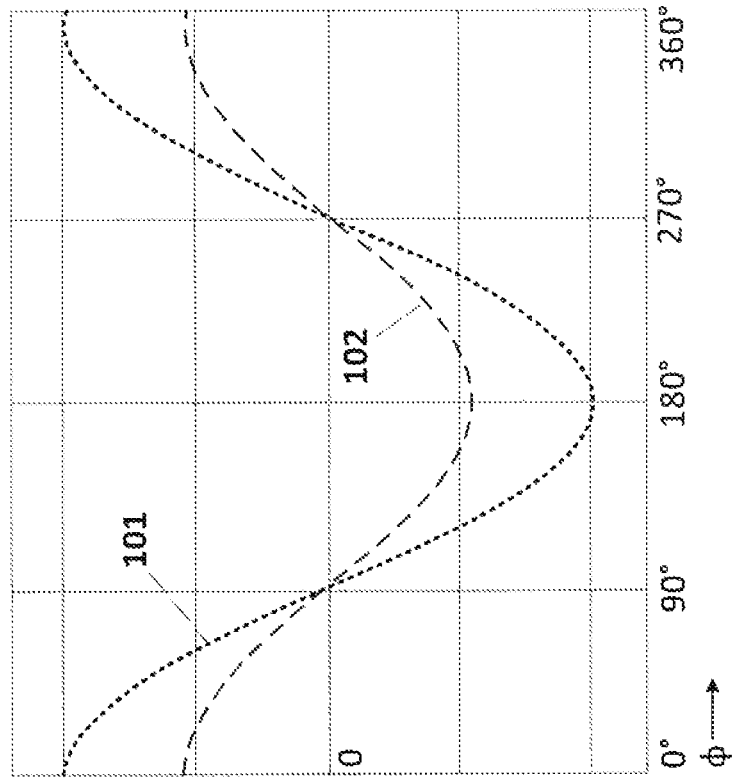
FIG. 1 is a graph showing voltage and current during one cycle of alternating current when the voltage and current are completely in phase.

FIG. 1 shows a graph of the instantaneous voltage 101 (dotted line) and instantaneous current 102 (dashed line) in a purely resistive load. The x-axis shows the time (expressed in phase angle φ of the +360° cycle, which is more appropriate for graphing period signals) and the y-axis shows the amplitude (height) of the waveforms with respect to a zero crossing point. The instantaneous voltage 101 and instantaneous current 102 are completely in phase for a purely resistive load, and this is shown by both waveforms crossing the horizontal axis (zero crossing point) at zero amplitude at the same time and always having the same polarity (i.e. both instantaneous voltage 101 and instantaneous current 101 always have a positive amplitude, or both instantaneous voltage 101 and instantaneous current 102 always have a negative amplitude).

The graph in FIG. 2 shows the instantaneous power 201 (solid line), and average power 202 (heavy solid line), which are derived from the instantaneous voltage 101 and instantaneous current 102 shown in FIG. 1. The x-axis shows the time (expressed in phase angle φ), and the y-axis shows the amplitude (height) of the waveforms. The instantaneous power 201 is the product of the instantaneous voltage 101 and instantaneous current 102, whereas the average power 202 is the product of the average voltage (not shown) and average current (not shown). When the instantaneous voltage 101 and instantaneous current 102 are of the same polarity, the instantaneous power 201 is positive, as shown by the "+" signs, and the instantaneous power 201 becomes zero when the instantaneous voltage 101 and instantaneous current 102 shown in FIG. 1 are both zero. The average power 202 is flat and is a good scalar (having magnitude but no direction) quantity for power measurements, where a value over several cycle durations is needed. However, the average power 202 provides no information about the direction in which the power is flowing. Notice that the instantaneous power 201 has a periodic cycle that is +180° long. Notice also that the instantaneous voltage 101 and instantaneous current 101, which are shown in FIG. 1, are both at the minimum value when the phase angle φ is at +180°. The instantaneous power 201, which is shown in FIG. 2, is at the maximum value when the phase angle φ is at the midpoint of the cycle, at +180°, and also at the ends of the cycle, at 0° and 360°. The instantaneous current 102 in FIG. 1 will alternate between a positive maximum and a negative minimum. However, in a resistive load, the instantaneous power 201 is always positive or zero. The positive instantaneous power 201 implies that transferring power from the source to the load has a power direction from the source towards the load at every point of time unless the instantaneous voltage 101 and instantaneous current 102 are zero, which is when the instantaneous power 201 is also zero.

In a purely resistive load, the direction of the instantaneous power 201 is always from the source towards the load (forward power flow direction) and the power instantaneous power 201 is positive. This implies that positive power equates to forward power flow. It can be inferred that negative power may equate to reverse power flow. Also, the instantaneous current 102 is alternating back and forth between the source and the load. This is very important to understand because the direction of the instantaneous current 102 is sometimes mistaken to be the direction of the power flow, which is not necessarily always the case.

If the load is purely capacitive (such as a picture tube) or purely inductive (such as a motor), then the instantaneous voltage and instantaneous current will no longer be in phase. Both a purely capacitive load and a purely inductive load are referred to as purely reactive loads. In a purely capacitive load, the voltage is −90 degrees out of phase from the instantaneous current. In a purely inductive load, the instantaneous voltage is +90 degrees out of phase from the instantaneous current. However, the resulting average power, the power transferred, and the direction of power explanation of the purely capacitive load will be identical to that of the purely inductive load. Therefore, within the context of reverse power flow, the purely capacitive load will not be described.

Figure 3:
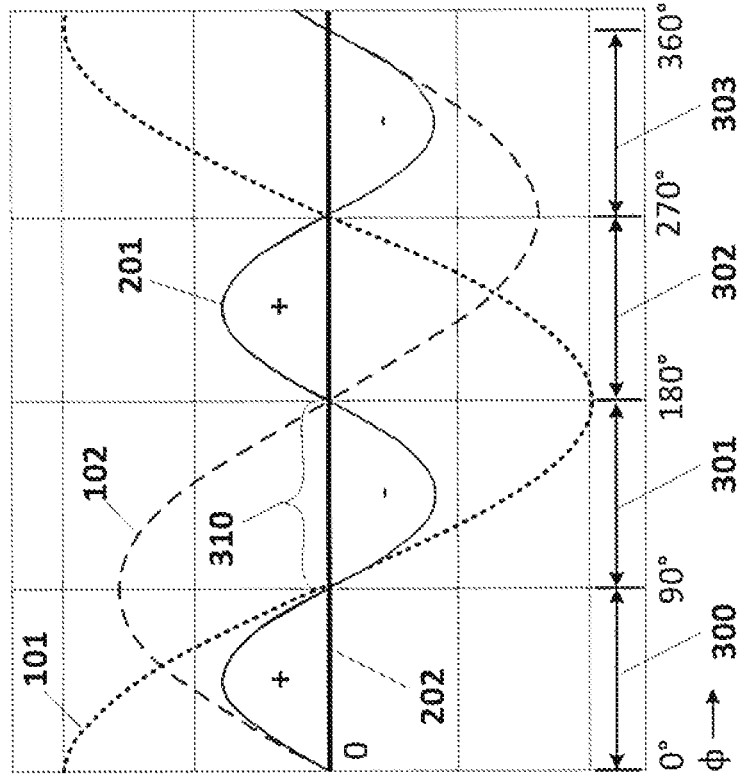
FIG. 3 is a graph showing voltage, current, power and average power during one cycle of alternating current when voltage and current are +90° out of phase.

The graph in FIG. 3 depicts instantaneous voltage 101 (dotted line) and instantaneous current 102 (dashed line) for a purely inductive load. The x-axis shows the time (expressed in phase angle φ) and the y-axis shows the amplitude (height) of the waveforms. The instantaneous voltage 101 and instantaneous current 102 are out of phase by +90° shown at 310. The instantaneous power 201 (solid line) is the product of the instantaneous voltage 101 and instantaneous current 101, whereas the average power 202 (heavy solid line) is the product of the average voltage (not shown) and average current (not shown). The positive sections of the instantaneous power 201, "+" sign, are shown in intervals 300 and 302. The negative sections of the instantaneous power 201, "−" sign, are shown in intervals 301 and 303. When the instantaneous power 201 is positive, power is transferred from the source to the load and the direction of the power is from the source towards the load, showing a forward power flow direction. When the instantaneous power 201 is negative, power is transferred from the load to the source, and the direction of the power is from the load towards the source, showing a reverse power flow direction. In the purely inductive load case, the power transferred from the source to the load is the same as the power transferred from the load to the source. The resulting average power is zero, showing that no net power has been transferred to the load. One of the key attributes of the phase is that if the load characteristic does not change, then the phase remains constant. Notice that when the load is purely reactive, power is equally transferred to and from the load. In a purely reactive load, half of the time, the power is in the direction towards the load and the other half of the time the power is in the direction of the source. During this time, the load remains unchanged and the phase remains constant. Therefore, phase alone does not provide any indication on the direction of the power flow. This implies that reactive power measurements alone cannot be used to determine the direction of power. The purely reactive load case is important to understand, as it also implies that the power flow direction may only be measured in real time.

Figure 4:
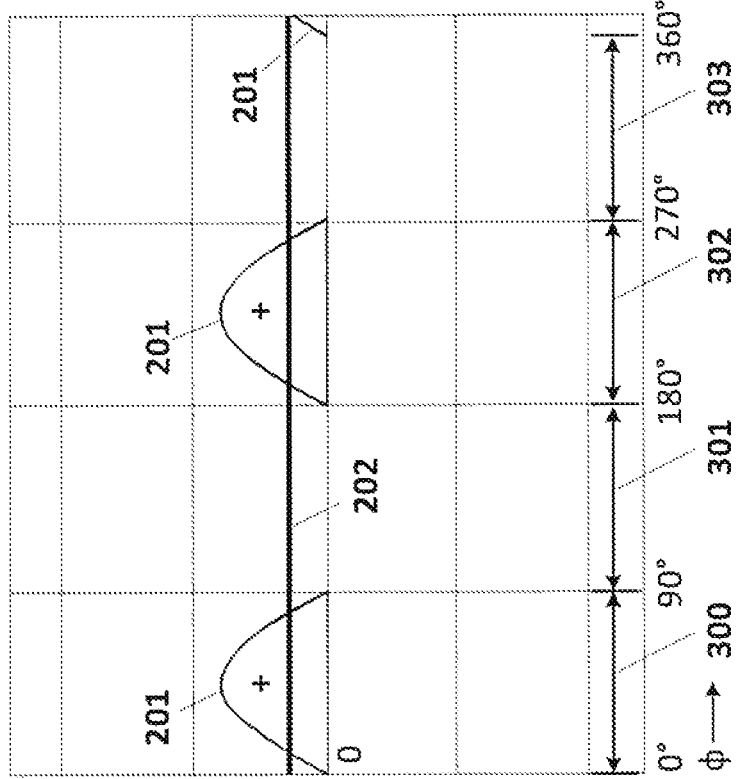
FIG. 4 is a graph showing power and average power during one cycle of alternating current when voltage and current are +90° out of phase, where reverse power flow is diverted by the present invention.

The graph in FIG. 4 depicts the same instantaneous power 201 in FIG. 3, with the negative sections of the instantaneous power 201 removed by the present invention. The x-axis shows the time (expressed in phase angle φ), and the y-axis shows the amplitude (height) of the waveforms. The positive sections of the instantaneous power 201, "+" sign, are shown in intervals 300 and 302. The removed negative sections of the instantaneous power 201, "−" sign, are shown in the intervals 301 and 303. When the instantaneous power 201 negative sections are removed only the positive instantaneous power 201 will remain. Notice that the result of removing the reverse power flow intervals 301 and 303 from the instantaneous power 201 results in a positive average power 202, and all power generated by the source is transferred to the load. When all power is transferred to the load, the power factor of the load is +1, which implies that the invention may act as a power factor correction device.

Ideal loads are either purely active or reactive and thus are useful in power explanations but are impractical in actual customer loads. As long as a load has reactive elements in it, the load will be referred to as a reactive load. If there are no reactive elements in a load, then it is an active load (purely resistive).

The graph in FIG. 5 depicts instantaneous voltage 101 (dotted line) and instantaneous current 102 (dashed line) for a reactive load. The x-axis shows the time (expressed in phase angle φ) and the y-axis shows the amplitude (height) of the waveform. In this example, a phase shift of +45° is shown at 510 so that the graph is easier to visualize. The instantaneous power 201 (solid line) is the product of the instantaneous voltage 101 and instantaneous current 102, whereas the average power 202 (heavy solid line) is the product of the average voltage (not shown) and average current (not shown). The positive sections of the instantaneous power 201, "+" sign, are shown in intervals 500, 502 and 504. The negative sections of the instantaneous power 201, "−" sign, are shown in intervals 501 and 503. When the instantaneous power 201 is positive, power is transferred from the source to the load, and the direction of the power is from the source towards the load, showing a forward power flow direction. When the instantaneous power 201 is negative, power is transferred from the load to the source, and the direction of the power is from the load towards the source, showing a reverse power flow direction. Notice that the sections of the instantaneous power 201 waveform represented by a positive power have increased from the purely inductive load shown in FIG. 3. As the phase difference between the instantaneous voltage 101 and instantaneous current 102 decreases, the positive sections of the instantaneous power 201 increases.

The graph in FIG. 6 depicts the same waveform for instantaneous power 201, in FIG. 5, with the negative sections of the instantaneous power 201 removed by the invention. The x-axis shows the time (expressed in phase angle φ), and the y-axis shows the amplitude (height) of the waveforms. The positive sections of the instantaneous power 201, "+" sign, are shown in intervals 500, 502 and 504. The removed negative sections of the instantaneous power 201, "−" sign, are shown in the intervals 501 and 503. The resulting instantaneous power 201 has only positive power remaining. Notice that the result of removing the reverse power flow in intervals 501 and 503 results in a positive average power 202, and all power generated by the source is transferred to the load. The following points may be made of the reverse power flow in reactive loads.

(1) Reactive power alone is unable to determine the direction of power.
(2) The current flow alone is unable to determine the direction of power.
(3) Phase alone is unable to determine the direction of power.
(4) Average power is unable to determine the direction of power.
(5) A positive power shows forward power flow direction.
(6) A negative power shows reverse power flow direction.
(7) Reverse power flow may only be determined from instantaneous power measurements.
(8) Removal of the negative sections of the instantaneous power performs the same function as a power factor correction device.

Detection of Reverse Power-Flow in Non-Linear Loads.

Linear loads take current proportionally to the voltage that is applied, whereas non-linear loads take current non-proportionally to the voltage that is applied. For a linear load, the consumed current from a sinusoidal voltage waveform source will also be a sinusoidal waveform. For a non-linear load, the consumed current from a sinusoidal voltage waveform source will be a waveform that is non-sinusoidal. The same logic for reverse power flow detection may be applied for reactive loads to non-linear loads. The following points may be made of reverse power flow in non-linear loads.

(1) A positive power shows forward power flow direction.
(2) A negative power shows reverse power flow direction.
(3) Reverse power flow may only be determined from instantaneous power measurements.
(4) Removal of the negative sections of the instantaneous power performs the same function as a power factor correction device.

Detection of Reverse Power-Flow from the Overgeneration of Power.

When dispersed electrical generators create excess power, the voltage and the current are +180° out of phase. At no time are the product (power) of the voltage and current ever positive with the only exception when both are zero, which equates to zero power. From the utility perspective, the load now looks like a power generator. Since the calculation of the overgeneration of power is always negative, the power factor will be −1 from the utility's perspective, which is consistent with the definition of a generator. Since the power is negative, this implies that the excess power being generated is in the reverse power flow direction.

FIG. 7 provides a visual representation of the average power when the reverse power, created by a dispersed electrical generator, is sent back into the distribution grid. The y-axis shows the amplitude (height) relative to the x-axis time (T). For the sake of simplicity, a purely resistive load is illustrated, which makes the use of the average power graph easier to visualize compared to the instantaneous power graph. The average power waveform (heavy solid line) shows what occurs just prior to and after the reverse power flow is generated. The reference point of measurement is on the distribution grid side of the customer service panel. Forward power shown at 701 is when the average power is positive. Forward power 701 decreases in amplitude as the dispersed electrical generator increases in power. During this time, the load consumes all the power from the dispersed electrical generator, and the power shown is utility power. All power from the utility power will be transferred to the load. At the point of time that the utility power and the generator power are equal, no power flow is present, which is shown at 702. As the generator power becomes greater than the utility power, the power will reverse direction and a reverse power flow condition will occur, which is shown at 703 by the negative average power. The load is at its capacity and cannot use all the power created by the dispersed electrical generator, and the power shown will now be from the dispersed electrical generator.

FIG. 7A shows the instantaneous voltage 101 (dotted line) and instantaneous current 102 (dashed line) waveforms shown in the eclipse during the time that there is forward power 701. Since the load is a resistive load, the instantaneous voltage 101 and the instantaneous current 102 are in phase and have the same polarity at any instantaneous point of time and the resulting instantaneous power and average power will be positive.

FIG. 7B shows the instantaneous voltage 101 (dotted line) and instantaneous current 102 (dashed line) waveforms shown in the eclipse during the time that there is reverse power 703. Since the load is resistive, the instantaneous voltage 101 and instantaneous current 102 will be +180° out of phase and will be opposite in polarity at any instantaneous point of time and the resulting instantaneous power and average power will be negative.

Reverse Power-Flow Key Attribute.

The reverse power flow from reactive and non-linear loads (considered being wasted energy) and from the overgeneration of power from dispersed electrical generators (considered being a beneficial power, up to the point it creates grid instability) have one attribute in common. In all cases, the real time power is negative when the reverse power flow is present. This is the key attribute used for the detection of reverse power flow. Since real time power is only negative when the instantaneous voltage and instantaneous current are opposite in polarity, a simple polarity check may be made at any instantaneous point of time to determine if reverse power flow is present or not. When detecting reverse power flow, if phase differences between the instantaneous voltage and instantaneous current were used, then this approach requires at least one-half of a power cycle time to determine whether reverse power is present or not. Because these detection approaches are delayed there would be no opportunity to mitigate reverse power flow. Therefore, mitigation of reverse power flow may only be accomplished by detecting reverse power flow in real time. Polarity checking of the instantaneous voltage and the instantaneous current may provide the fastest real time detection of reverse power flow thereby allowing for real time reverse power flow mitigation.

The Power Sensing and Switching Circuit.

Figure 11:
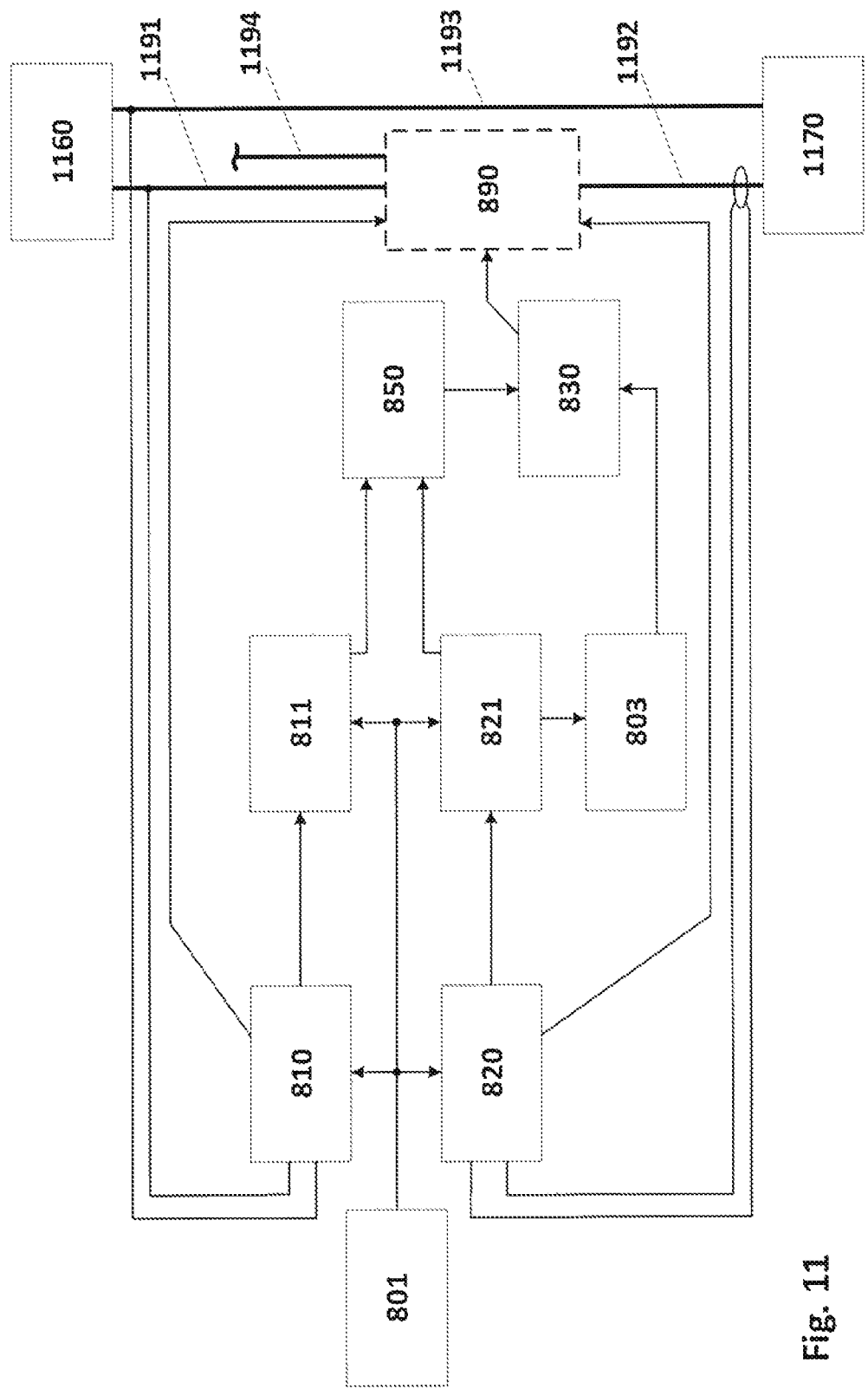
FIG. 11 is a functional block diagram of the preferred embodiment of a device according to the present invention.

A device for mitigating reverse power flow may be referred to as a power sensing and switching circuit. To better understand the power sensing and switching circuit, a conceptual diagram, FIG. 8, is used to explain the general working principles of the circuit. A functional block diagram, FIG. 11, is then used to explain how the conceptual diagram is envisioned as a functional circuit which is then showed in a preferred circuit-diagram example, FIG. 20.

Conceptual Diagram of Power Sensing and Switching Circuit.

The power sensing and switching circuit takes real time voltage and current waveforms, detects when there may be a reverse power flow condition, and separates the reverse power and forward power from the power source. The voltage and current waveforms will need to be processed by the power sensing and switching circuit through signal processing blocks.

FIG. 8 depicts the processing blocks of the power sensing and switching circuit. The process blocks are interconnected by analog or digital signals and within the context of the power sensing and switching circuit are defined below. Analog signals are continuous signals that vary in time and are represented by sine wave symbols. Digital signals are logic signals with only two possible values and are represented by square wave symbols. The process blocks perform a specific function or set of functions. Process blocks with the same input and output types provide similar functionality, which are described below.

(1) The following process blocks have analog inputs and analog outputs that describe the conversion from an original analog waveform to a scaled analog waveform.
   a. Voltage sensor 810.
   b. Current sensor 820.

(2) The following process blocks have analog inputs and digital outputs that describe the conversion from a scaled analog waveform to a digital signal.
   a. Voltage any to square wave converter 811.
   b. Current any to square wave converter 821.

(3) The following process blocks have digital inputs and digital outputs that describe the logic math to detect and mitigate a reverse power flow condition.
   a. Polarity checker 850.
   b. Pulse extender 803.
   c. Switch control 830.

Since real time measurements of voltage, current, and power are required to detect reverse power flow, the power sensing and switching circuit must operate in real time. Measurements that are taken over one or more cycle durations (like an average value or root-mean-square value) are not applicable to the power sensing and switching circuit unless specifically stated otherwise.

Defining the Power Source and Load.

A power source may be defined as providing an alternating current to a load. The alternating current alternating according to a current waveform and having a cyclically varying voltage alternating between a minimum and a maximum at a frequency that defines a cycle duration. The varying voltage has a voltage waveform. Changes in current flow direction define current middle crossing points. The load changes the current waveform so the current waveform fluctuates, may vary in periodicity, and may differ from the voltage waveform, and noise is introduced into the alternating current by extraneous sources or the device. The power sensing and switching circuit uses active circuits, and therefore the power supply and ground terminologies need to be defined, which are described below.

Power Supply Terminologies.

References to power supply terminal connections use various terminologies for positive and negative power supplies. For clarity, the positive power supply terminal will be referred to as the power supply positive voltage and the negative power supply terminal will be referred to as the power supply negative voltage. Power supplies that have a power supply positive voltage and a power supply negative voltage will be referred to as dual power supplies. Power supplies with no power supply negative voltage will be referred to as single power supplies.

Ground Terminologies.

The ground may be quite a confusing term, and the terminology used henceforth will be used for the power sensing and switching circuit unless specifically stated otherwise. In a dual power supply, the ground is zero volts. In a single power supply, there is no power supply negative voltage, and the ground becomes the equivalent of the power supply negative voltage with a value of zero volts. The designation for the power supply ground will be referred to as ground. In electrical circuits, there is a term called the signal ground, which is the common return path for the signal. Confusion is created when using this explicit definition for the signal ground versus when the signal ground is the reference point. The middle crossing point of the waveform is at zero volts and is referred to as the zero-crossing point. When the reference point is no longer the ground of the circuit, the two terms may no longer be interchanged. When using a single power supply, the conventional practice is to take half of the power supply voltage and add that to the signal. In this way, the signal's original positive and negative peaks which had a middle crossing point at zero volts may now be moved to a new middle crossing point, which is half of the positive supply terminal. Using the term zero-crossing point no longer applies to the middle crossing point, since it is no longer at zero volts. The new middle crossing point may sometimes be referred to as the virtual ground, which is a reference point. To avoid confusion, the terminology that incorporates the word ground when used as a reference point (like signal ground or virtual ground) will not be used to describe a reference point in the power sensing and switching circuit. Instead, the use of the term ground will be defined as the point where the signal returns to and any reference points used in the circuit will be explicitly defined.

Process Block: Reference Voltage.

A power supply having a power supply positive voltage and a power supply negative voltage creates a reference voltage 801 midway between the power supply positive voltage and the power supply negative voltage. The power sensing and switching circuit comprises a power supply that creates a reference voltage 801.

Analog Waveform Scaling Process.

In order to measure analog voltage and current waveforms, the original analog waveform must first be made compatible with the input of the measuring circuit. Scaling a waveform may be defined as creating a proportionately identical replica of the waveform that is compatible with the input of the measuring circuit.

Process Block: Voltage Sensor.

A voltage sensor 810 connected to the power source; whereby the voltage sensor 810 senses the varying voltage shown at 815 and outputs in real time a voltage-representative voltage signal with approximately the voltage waveform shown at 814, scaled and biased to be centered between the power supply positive voltage and the power supply negative voltage and with crossing points over the reference voltage 801 defining voltage middle crossing points at the ends and midpoint of each cycle. The output of the voltage sensor 810 will be sent to the voltage any to square wave converter 811 and the monitoring circuit 842.

Process Block: Current Sensor.

A current sensor 820 connected to the load, whereby the current sensor 820 senses the alternating current shown at 825 and outputs in real time a current-representative voltage signal with approximately the current waveform shown at 824, scaled and biased to be centered between the power supply positive voltage and the power supply negative voltage and also scaled to be able to be compared with the reference voltage 801. The output of the current sensor 820 will be sent to the current any to square wave converter 821 and the monitoring circuit 842.

Analog Signal to Digital Signal Conversion Process.

The any to square wave converter takes an input signal, compares it with the reference voltage 801, and converts it into a square wave signal output. The comparison process may be susceptible to noise as the input signal becomes equal to the reference voltage 801. In order to mitigate noise from the conversion process, we need to first define what noise is and then determine a process that mitigates the noise from the comparison process.

Defining Noise.

Electronic noise is an unavoidable condition when designing electronic circuits. Noise is introduced into the signal by extraneous sources or by the device (power sensing and switching circuit). First, some assumptions need to be made about the noise.

(1) The noise may comprise many frequencies.
(2) The different frequencies may have different amplitudes.
(3) The individual frequencies may form a composite waveform and may be referred to as noise.

Based on these assumptions, a model may be constructed of the noise. The following terminology may refer to its properties. The noise may vary from its lowest voltage at the bottom of the noise (low peak) to its highest voltage at the top of the noise (high peak) and may be referred to as the noise peak-to-peak voltage. The halfway point between the top and bottom peaks may be referred to as the noise middle crossing point. The amplitude of the noise middle crossing point to the noise peak may be referred to as the noise signal height.

Defining Hysteresis.

The defined noise signal is bound by a low peak and high peak voltage. A circuit which may compare the input signal to the reference voltage may be referred to as a comparison circuit. A process called hysteresis may be applied to a comparison circuit that allows the output to retain its value until the changes significantly to trigger a change. Hysteresis may be used to convert a noisy input on a comparison circuit to provide an output square wave which may resemble a square wave output of the same input signal void of noise.

Figure 9:
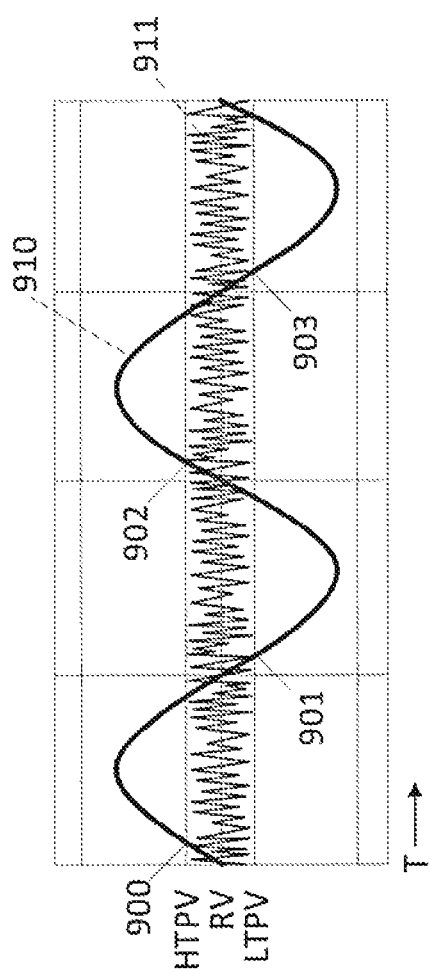
FIG. 9 is a graph showing an input signal into a non-inverting Schmitt trigger comparator with hysteresis being applied.
Figure 10:
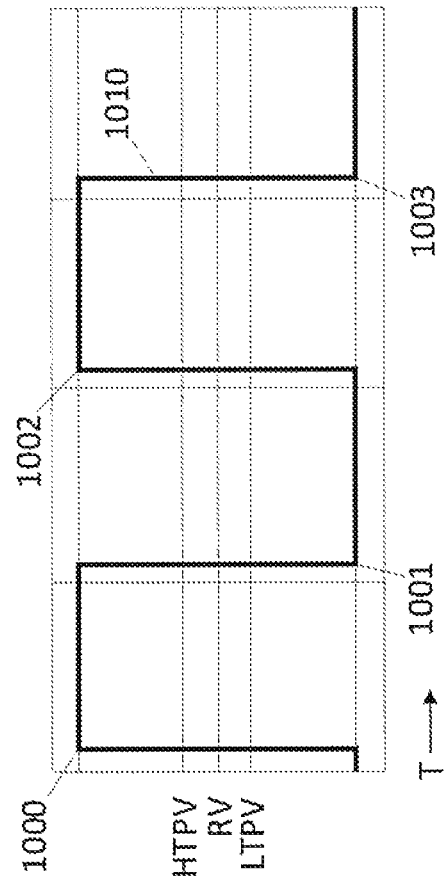
FIG. 10 is a graph showing an output signal of the non-inverting Schmitt trigger comparator in FIG. 9 after hysteresis is applied.

FIG. 9 shows a graphical representation of an input sinusoidal signal shown at 910, with hysteresis being applied to the comparison circuit. FIG. 10 shows a graphical representation of the resulting square wave output shown at 1010, of the comparison circuit. Signals are not to scale. The vertical axis of both graphs represents voltage, which is not to scale. The horizontal axis of both graphs represents time, which is not to scale. For clarity, the noise signal shown at 911, would normally be shown superimposed on the sinusoidal signal but is shown as a separate signal with an exaggerated height. A low trigger point voltage (LTPV) is slightly lower than the low peak of the noise signal. A high trigger point voltage (HTPV) is slightly higher than the high peak of the noise signal. The voltage between the high trigger point voltage (HTPV) and low trigger point voltage (LTPV) may be referred to as a noise zone. When the input signal crosses the high trigger point voltage (HTPV), shown at 900, the output of the comparison of the input signal with the reference voltage (RV) will be high, shown at 1000. The output remains high as long as the input continues to be higher than the low trigger point voltage (LTPV) shown at 901. Once the input signal crosses the low trigger point voltage, the output will become low, as shown at 1001. The output remains low as long as the input continues to be lower than the high trigger point voltage (HTPV) shown at 902. Once the input signal crosses the high trigger point voltage (HTPV), the output will become high, as shown at 1002. The output remains high as long as the input continues to be higher than the low trigger point voltage (LTPV) shown at 903. Once the input signal crosses the low trigger point voltage (LTPV), the output will become low, as shown at 1003. The process continues to repeat itself in the manner described above. If the signal is between the low trigger point voltage and the high trigger point voltage, then the previous state of the comparison circuit is kept. Hysteresis has prevented the output of the comparison circuit from being triggered by the noise voltage surrounding the reference voltage (RV), which has effectively mitigated the noise.

Process Block: Voltage any to Square Wave Converter.

A voltage any to square wave converter 811 that has a voltage converter propagation delay, receives the voltage-representative voltage signal shown at 814 and compares the voltage-representative voltage signal with the reference voltage 801, having a hysteresis circuit to generate a high voltage trigger point voltage in response to a voltage-representative voltage signal higher than the voltage middle crossing point plus the noise, and a low voltage trigger point voltage in response to a voltage-representative voltage signal lower than the voltage middle crossing point minus said noise, and that outputs voltage square waves shown at 812 that are high in response to the high voltage trigger point voltage and low in response to the low voltage trigger point voltage, whereby a voltage square wave that transitions from low to high and back to low again constitutes a voltage pulse. The resulting real time digital output shown at 812 will be sent to a polarity checker 850.

Process Block: Current any to Square Wave Converter.

A current any to square wave converter 821 that has a current converter propagation delay, to receive the current-representative voltage signal shown at 824, and to compare the current-representative voltage signal with the reference voltage 801, having a hysteresis circuit, to generate a high current trigger point voltage in response to a current-representative voltage signal higher than the current middle crossing voltage plus said noise, and a low current trigger point voltage in response to a current-representative voltage signal lower than the current middle crossing voltage minus said noise, and that outputs current square waves shown at 822 that are high in response to the high current trigger point voltage and low in response to the low current trigger point voltage, whereby a current square wave that transitions from low to high and back to low again constitutes a current pulse having a leading edge and a trailing edge, that has a current pulse length. The resulting real time digital output shown at 822 will be sent to the polarity checker 850.

Analog to Digital Conversion Propagation Delay Considerations.

The analog processing for the voltage and current signals are more susceptible to time delays as compared to digital signals. Since the invention relies on the timing of the instantaneous voltage and current signals, maintaining the timing between the voltage and current signal is key to the operation of the polarity checker 850. For this reason, the voltage converter propagation delay and the current converter propagation delay should be substantially identical.

Process Block: Polarity Checker.

A polarity checker 850 that compares the voltage square waves shown at 812 and the current square waves shown at 822 that generates a polarity pulse shown at 851 when the voltage square wave is high and the current square wave is low, and also when the voltage square wave is low and the current square wave is high. The resulting real time digital output shown at 851 will be sent to the switch control 830.

Process Block: Pulse Extender.

It is important to note that a polarity check may be made at any instantaneous point of time, and, as a result, the reverse power flow detection is quick and in real time. However, there are two problems using this approach:
 (1) When the current signal is in the noise zone, the current signal and noise are indistinguishable from each other.
 (2) When there is no current signal the polarity checker 850 may output erroneous pulses.

In both cases, the reliability of the current signal is in question. The two functions that are used to detect a reliable current signal are a noise level detector and a current detector.

Noise Level Detector Function.

The current any to square wave converter 821 will only output a current pulse when the current signal is higher than the high current trigger point voltage. In effect, the current pulse may also be used to provide an indication of when the current signal is larger than the current noise zone. The current any to square wave converter 821 may serve a dual purpose of providing the same current pulse to the polarity checker 850 to be used for reverse power flow detection and to the pulse extender 803 to be used for noise detection. For this reason, the current any to square wave converter 821 is the noise level detector, and it will not be included as part of the pulse extender 803 process block. The resulting real time digital output shown at 822 will be sent to the pulse extender 803.

Current Detector Function.

The noise level detector function provides a method to determine when there is a reliable current. However, the duration of time that the current signal may be reliable is unknown, and this uncertainty affects the accuracy of the polarity detector. An assumption about the current signal needs to be made to determine when the reliable current is no longer present. If the current signal is periodic, then it may be assumed that the current may be present for at least a cycle duration and the detection period may be for at least a cycle duration. A pulse extender 803 connected to the current any to square wave converter 821 that extends a current pulse for a pulse duration time and continues to extend the pulse duration time if a subsequent current pulse arrives in less than a cycle duration, whereby an extended current pulse shown at 804 indicating a reliable current for the pulse duration time is created. The resulting real time digital output 804 will be sent to the switch control 830.

Process Block: Switch Control.

A switch control 830 leads to an output shown at 843 operably connected to the pulse extender 803 and the polarity checker 850 that enables the polarity checker 850 only for the pulse duration time, whereby when the polarity pulse is high, reverse power flow is considered being possibly present, and when the polarity pulse is low, reverse power flow is not considered being possibly present, but the polarity checker 850 is enabled only if the extended current pulse indicates reliable current, whereby the switch control 830 indicates to the output reverse power flow when reliable current is indicated and reverse power flow is considered being possibly present, and the switch control 830 indicates to the output no reverse power flow when reliable current is not indicated or when reverse power flow is not considered being possibly present. The switch control output shown at 843 will be sent to a switch control group 890.

Switch Control Group.

The switch control output shown at 843 is selected from the group, referred to as a switch control group 890, enclosed in a dashed line box, consisting of:
 (1) A single pole double throw switch 840 (SPDT) may be used for the diversion of reverse power flow to be used as recycled power.
 (2) A single pole single throw switch 841 (SPST) may be used for standalone power factor correction devices.
 (3) A monitoring circuit 842 may be used with or without a switch and may provide reverse power flow metering information.

Functional Block Diagrams of Power Sensing and Switching Circuit.

FIG. 11 shows the power sensing and switching circuit that includes the following functional blocks: (1) Reference Voltage 801, (2) Voltage Sensor 810, (3) Current Sensor 820, (4) Voltage Any to Square Wave Converter 811, (5) Current Any to Square Wave Converter 821, (6) Pulse Extender 803, (7) Polarity Checker 850, (8) Switch Control 830, and (9) Switch Control Group 890 in a dashed line box. A general power line 1191 may be used as a general term for a line connected to a general power source 1160. A general load line 1192 may be used as a general term for a line connected to a general load 1170. A neutral line 1193 may be used as a general term for a line used to carry current back to the general power source 1160. A general power line 1191, general load line 1192, neutral line 1193, and recycled power line 1194 are shown as heavier lines that represent alternating current electrical power lines as compared to the lighter lines which represent circuit signals.

Integrated Circuit Selection Criteria.

The power sensing and switching circuit incorporates both analog integrated circuits and logic integrated circuits. Analog circuits deal with signals that vary between the power supply negative voltage and the power supply positive voltage. Digital circuits deal with signals that are either at zero voltage or at the power supply positive voltage and do not have a valid state between these extremes. An integrated circuit is an electronic device in which larger analog and digital circuits with discrete parts (such as resistors, capacitors, transformers, transistors) have been implemented on a small piece of semiconducting material. Before integrated circuits, circuit designs using discrete parts had to be connected together. As the number of discrete parts increased, the reliability and space taken became problematic. Imagine the level of effort required to build a computer chip using discrete parts. To overcome the problems of reliability and space conservation, integrated circuits were developed. For clarity, analog integrated circuits and digital integrated circuits may be referred to as chips, unless otherwise specified. One such analog integrated circuit used extensively throughout the design is called the operational amplifier. The operational amplifier (not shown) electronic symbol is a triangle with an inverting "−" input and a non-inverting "+" input. The operational amplifier, or op-amp, is a voltage-amplifying device designed to be used with external elements (such as resistors, capacitors, inductors, diodes) between its input and output terminals. These elements determine the resulting function or operation of the amplifier. The different configurations using external elements perform a variety of different operations such as signal conditioning, filtering, comparing, and mathematical operations (addition, subtraction, integration, and differentiation), giving rise to its name of an operational amplifier. Because measurements are done in real time, the power sensing and switching circuit relies on speed in chip operational effectiveness, i.e., chips designed for low propagation delay. Propagation delay is the time it takes a signal to travel from the input to the output of a circuit that may comprise one or more chips. Chips with a wider dynamic range, such as rail-to-rail operational amplifiers, are preferred over operational amplifiers that do not have this functionality. Rail-to-rail functionality means that an operational amplifier's inputs and outputs may operate near the supply voltages, which allow for lower supply voltages. Chip noise is also very important when sensor measurements are involved, and chips with lower noise levels are preferred. From a cost perspective, deciding between a dual power supply, which has an equal negative and a positive voltage (such as a ±12 volts DC power supply) or a single power supply, which has a single positive voltage (such as a +5 volts DC power supply) is dependent somewhat on the chips being used. Since single power supplies are typically used for logic-integrated circuits, the cost of the overall solution may be reduced if the entire circuit is designed around them. From a single power supply standpoint, there is consistency between chip manufacturers in that a higher supply voltage translates to a lower propagation delay in most cases. The propagation time is lower for a chip using a +5 volt DC supply as compared to a +3.3 volt DC supply. The design of the power sensing and switching circuit uses a preferred single +5 volts DC power supply and references to the signal voltages relative to this power supply voltage will be used for the remainder of the document unless otherwise specified. The circuit is not limited to using a +5 volt DC power supply, and other single power supplies or dual power supplies may be used.

Functional Block: Reference Voltage.

The methods used when measuring power may involve taking the original waveforms and creating equivalent signals compatible with integrated circuit technology. The original waveform minimum and maximum values need to be resealed to fit within the lower and upper input ranges of the integrated circuit being used. Scaling of a waveform is described below, using the +5 volts DC single power supply with the assumption that the chip used allows for a peak-to-peak signal input of 0 volt to +5 volts AC and the waveform to be scaled has a peak-to-peak value with both peaks having the same amplitude but opposite signs (±Peak). There are three requirements for a properly scaled signal.

(1) The maximum expected high peak (+Peak) of the original waveform is translated to the +5 volt AC of the scaled signal.
(2) The minimum expected low peak (−Peak) of the original waveform is translated to the 0 volts of the scaled signal.
(3) The original waveform between the two peaks, needs to be translated with the same or constant ratio to the scaled signal such that the scaled signal is a proportionally accurate representation of the original waveform.

This scaling terminology is used since the units of the original waveform (voltage or current) may still be used with the intent of the final scaled signal being in the voltage units of the power supply and chips. If the original waveform is a current waveform, then the current waveform may be first converted to a current-representative voltage signal before the scaling takes place. The functional blocks shown for the voltage sensor 810 and current sensor 820, include all the signal processing required to provide an output signal that is a scaled version of the original waveform compatible with the any to square wave converter inputs. Because the power sensing and switching circuit relies primarily on timing accuracy, any imperfection in the waveform of the scaled signal is tolerable, as long as it doesn't negatively impact the middle crossing point of the voltage or current signals. Scaling of a waveform also requires that the middle crossing point be translated. Using the same requirements for the scaled signal above, the middle crossing point of the scaled signal will need to be equal to half of the power supply positive voltage (+5 volts DC). Therefore, the preferred reference voltage 801 is equal to +2.5 volts DC. Each section of the circuit that requires the reference voltage may be implemented by using discrete resistors. However, because of slight variations in the values of the resistors, this would cause variances between reference voltages throughout the circuit. Using a single reference voltage for the entire circuit provides consistency and improves the overall performance of the circuit. The output of the reference voltage 801 circuit has no time dependency and the ability to maintain a constant reference voltage (+2.5 volts DC) with as little noise or distortion as possible is the most important functionality of this part of the circuit. Of note, a reference voltage only pertains to analog signal measurements, as there are no reference voltages in digital logic circuits.

Functional Block: Voltage and Current Sensors.

The detection of reverse power flow requires that the voltage and current detection be done simultaneously with little to no reactive elements that would introduce any additional phase shifting or time delay differences between the voltage and current signals.

Functional Block: Voltage Sensor.

The voltage from the general power source 1160 may be referred to as the voltage waveform. The voltage sensor 810 takes the voltage waveform and provides an output signal, which is the input to the voltage any to square wave converter 811, which may be referred to as the voltage signal. The voltage signal is a voltage-representative voltage signal of the power source voltage waveform, unless otherwise specified. The voltage signal name is used to differentiate it from the power source voltage waveform. Once a voltage waveform is converted to a voltage signal, it will continue to be referred to as a voltage signal, as it goes through the various signal processing stages. The voltage signal is not fixed but varies just like the power source voltage waveform. The voltage signal may vary from its lowest voltage at the bottom of the voltage signal to its highest voltage at the top of the voltage signal. The bottom and top of the voltage signal may be referred to as the peaks of the voltage signal, and the voltage that varies between the top and bottom voltages may be referred to as the peak-to-peak voltage signal. The halfway point between the top and bottom peaks may be referred to as the voltage middle crossing point. The voltage middle crossing point occurs at the ends and midpoint of each cycle. In the power sensing and switching circuit, the voltage waveform is the reference source, and the most reliable location to place the voltage sensor 810 is on the general power line 1191. Voltage measurements are done using either a capacitive voltage divider, a resistor divider, or a step-down voltage transformer. Capacitive voltage dividers use two capacitors, which are attached in the middle, with one connected to the high voltage terminal and the other connected to the ground. The middle of the capacitive voltage divider provides the scaled down representation of the voltage waveform, with the scaling dependent on the values of the two capacitors chosen. When the middle of the divider is connected to an inductive line tuning element and a voltage transformer, this device is called a capacitor voltage transformer and is typically used for high voltage power measurements. Resistor dividers may also be used to step-down the mains voltage. There is no isolation of the mains voltage to the measuring device so caution must be used if this method is implemented. For low voltage power, a power transformer may be directly connected to the mains supply to produce a voltage-representative voltage signal of the voltage waveform. The power transformer has little impact to the power factor of the mains supply and also provides isolation for safety reasons. The primary windings of the power transformer are connected to the general power line 1191 and the neutral line 1193. The secondary windings of the power transformer provide an output voltage that has a slightly higher output voltage than the chip it needs to connect to. A resistor divider circuit is used to scale the voltage output of the power transformer for compatibility to the chip input requirements of the voltage any to square wave converter 811. The preferred voltage sensor 810 comprises a power transformer with a resistor divider circuit that produces a voltage-representative voltage signal of the voltage waveform which is scaled for compatibility with the voltage any to square wave converter 811.

Functional Block: Current Sensor.

The current sensor 820 may be connected to the load line. Current sensors for power systems detect electric current in a wire and generate a signal proportional to that current. Current, unlike voltage, may vary depending upon the amount of power consumed. Current may be likened to water in a supply pipe. The spigot on the water pipe is partially or fully opened or closed, depending on the amount of water that needs to be consumed, which is the same as for current. The biggest challenge for current sensor manufacturers is to make a sensor that has accuracy over a very large range of current. The current transformer (metal core-based), the Rogowski coil, and the Hall Effect current sensor are more common technologies used as current sensors and are described below.

A current transformer is a common form of current sensor. The main difference between a current transformer and a power transformer is that current transformers convert high current values into small current values, whereas a power transformer may convert high voltage values into low voltage values. Current transformers with metal cores are larger than other current sensors but provide reliable phase measurements. Current transformers that use nickel cores are used in high accuracy, low-level current sensing applications, such as ground fault detection circuits. Ring-type series transformers with nickel cores reduce phase-angle errors exhibited by similar transformers using silicon steel cores. Current transformers may also be manufactured using high-grade amorphous or nanocrystalline alloys. These current transformers may provide very small phase errors. The current transformer is toroidal (ring-shaped like a doughnut), having an iron or nickel core that surrounds a current carrying primary winding/cable. The alternating current in the primary winding/cable of the transformer produces an alternating magnetic field in the transformer's core which then induces an alternating current in the secondary winding/cable of the transformer. Vendors construct current transformers with a hole in the middle, which has a round or rectangular center. The current carrying cable being measured passes through this hole. Current transformers are referred to as non-intrusive when there is no direct physical or electrical connection to the circuit. The only link between the circuit being monitored and the current transformer is the magnetic field developed around the primary winding/cable as current flows through it. The current in the primary winding/cable is unaffected by the insertion of the current transformer. The output of the current transformer is proportional (by a single fixed ratio) to the input, so it has a linear range of operation. However, when the core is saturated, the output of the current transformer is no longer linear in operation, which limits its current measurement range. Current transformers have a decent dynamic range (1 A to 200 A) and provide a stable operation for the circuit when operating within their linear ranges. The preferred current sensor 820 may use a nickel core or high-grade amorphous or nanocrystalline alloy current transformer.

A Rogowski coil, named after Walter Rogowski, comprises a helical coil of wire with the lead from one end returning through the center of the coil to the other end, so that both terminals are at the same end of the coil. The whole assembly is wrapped around the straight conductor whose current is to be measured. There is no metal core present in the Rogowski coil and these devices do not suffer from core saturation issues like a traditional current transformer, giving it much larger current measurement ranges. These sensors are also immune to DC currents and, as a result, may measure small AC currents in the presence of a large DC current. However, these current sensors require an integrator circuit to get a measurable current waveform on the output. An active integrator function may be implemented using an operational amplifier but because of the capacitor needed on the feedback leg, the circuit cannot sense current down to direct current DC. Introducing the capacitor in the signal processing path may require phase compensation circuitry to correct this phase shift. The Rogowski coil signal is also tiny (in the 500 µV/A range) and requires amplification to be compatible with the integrated circuit chips being used. Having said this, Rogowski coils may operate from 0.1 to 900 A. The advantage of the Rogowski coil is its larger linear operating range, making it preferable over the use of a CT sensor for larger dynamic range requirements.

A Hall effect current sensor, named after Edwin Hail, relies on the voltage difference (the Hall voltage) across an electrical conductor, transverse to an electric current in the conductor and to an applied magnetic field perpendicular to the current. The sensor has the advantage of being able to read both AC and DC currents. However, the sensors produce a low signal level and require amplification. The sensor is susceptible to magnetic flux from surroundings (such as other wires), which requires careful location and shielding of the sensor. To overcome these problems, some manufacturers include magnetic shielding and amplification as part of the sensor which improves the sensor's signal-to-noise ratio and drift. The Hall effect current sensors provide a ratiometric output, which is an output in volts that represents the original current waveform. The fundamental advantage that distinguishes Hall effect technology is that the current based magnetic characteristics being sensed are not affected by heat at practical temperature ranges. As a result, Hall effect sensors may provide high accuracy measurements in harsh environments with wide temperature ranges.

A current waveform on the mains may vary between a high peak and a low peak with the same magnitude but opposite signs (±140 amperes AC as an example). The decision to convert all signals to a voltage representation requires that the current waveform be first converted to a current-representative voltage signal. Using the preferred current transformer, a resistor placed across the current transformer terminals, which is referred to as a burden resistor, will convert the alternating current into a current-representative voltage signal. The preferred current sensor 820 comprises a nickel core current transformer with a burden resistor that produces a current-representative voltage signal of the current waveform which is scaled for compatibility with the current any to square wave converter 821.

Functional Block: Any to Square Wave Converter.

Because time delays are problematic in real time data processing, timing delays need to be minimized and circuit simplification is paramount to the operational effectiveness of the circuit. While it is important to minimize propagation delays, it is equally important that the voltage converter propagation delay and the current converter propagation delay be substantially identical. In order to minimize the propagation delays between the voltage any to square wave converter 811 and the current any to square wave converter 821, identical integrated circuit chips are used. Using the same integrated circuit chips may introduce the same timing delay for both converters, which may have the effect of canceling the timing differences between the converters. The any to square wave converter incorporates three functions that are run in series in the following order: the input isolation function, the low-pass filter function, and the analog-to-digital signal conversion function. These three functions are described below.

Input Isolation Function.

The preferred inputs of the any to square wave converter should isolate the voltage sensor 810 and current sensor 820 outputs. Sensors may not have enough current to power the chips. An operational amplifier may buffer the output of the sensor and provide enough current to power these chips. The same design principles of identical chips used for both the voltage signal processing and the current signal processing should be applied here.

Low-Pass Filter Function.

Preferably, to avoid introducing phase shifts (phase errors) due to reactive elements (like capacitors and inductors), the same design principles of identical chips used for both the voltage signal processing and the current signal processing should be applied here for the passive low-pass filter function such that the voltage phase error and the current phase error are substantially identical. The low-pass filter may be used in the any to square wave converters to attenuate high frequency external noise which is introduced by the power transformer (used in the voltage sensor 810) and current transformer (used in the current sensor 820). The decision to use a preferred passive filter as compared to an active filter is that the passive filter introduces no propagation delay and requires no power to operate. However, this is at the expense of some signal amplitude loss. Passive filters may introduce a phase distortion into both the voltage any to square wave converter 811 and the current any to square wave converter 821 so care must be taken in the selection of the passive filter elements. The lower the cutoff frequency (frequency where the low-pass filter has an attenuation of −3 decibels), the larger the introduced phase distortion, but the attenuation of high frequency noise is superior. The higher the cutoff frequency, the smaller the introduced phase distortion, but the attenuation of high frequency noise is inferior. The selection of the passive filter cutoff frequency requires a balance between the amount of phase distortion allowed versus the amount of high frequency noise attenuation that is effective. To keep the phase distortion difference introduced by the passive filter to a minimum, tight tolerances should be used for the passive filter elements. This allows more flexibility on the selection of the passive filter cutoff frequency.

Analog Signal to Digital Signal Conversion Function.

The voltage signal and current signal are analog signals that vary between 0 volts and +5 volts AC (for a +5 volt single power supply). The analog signal varies around the middle crossing point (+2.5 volts AC). Since the analog signal is a representation of the original waveform, the following observation may be made. If the analog signal goes below the middle crossing point (0 volts to +2.5 volts AC), then this represents the negative portion of the original waveform. If the analog signal goes above the middle crossing point (+2.5 volts AC to +5 volts AC), then this represents the positive portion of the original waveform. A digital signal varies between two voltage states: 0 volts (digital logic 0) and +5 volts DC (digital logic 1). The any to square wave converter operation is to convert the negative representation of the analog signal (0 volts to +2.5 volts AC) to 0 volt (digital logic 0) and to convert the positive representation of the analog signal (+2.5 volts AC to +5 volts AC) to +5 volts DC (digital logic 1). The preferred analog integrated circuit able to accomplish this function is called a comparator. A comparator compares the magnitude of two inputs and determines which is the larger of the two. The preferred comparator integrated circuit used for the preferred any to square wave converter is a special form of an operational amplifier with a much improved timing (propagation) delay as compared to a general purpose operational amplifier. For clarity, the original waveform should not be assumed to be a sinusoidal wave. If the original waveform is a sinusoidal wave, then the output of the comparator will be a square wave. Non-linear loads create non-sinusoidal waveforms and the output of the comparator would look like a pulse or a series of pulses. Because of the distortion to the waveforms, precise measurements require that the voltage middle crossing point (+2.5 volts AC) and the current middle crossing point (+2.5 volts AC) is identical to the reference voltage 801 (+2.5 volts DC). Maintaining identical chips for the comparators and using the same reference voltage 801 may reduce any timing errors and improve the performance of the circuit. The preferred comparator has an inverting input "−" and a non-inverting input "+". The reference voltage 801 is connected to the inverting input, and the analog signal is connected to the non-inverting input. If the analog signal is on the non-inverting input, then the comparator is called a non-inverting comparator and is the preferred comparator implementation for the any to square wave converter. If the non-inverting input has a higher voltage than the reference voltage 801, then the output of the comparator will be +5 volts DC. If the non-inverting input has a lower voltage than the reference voltage 801, then the output of the comparator will be 0 volts. The preferred comparator circuit performs well when there is a voltage difference between the non-inverting and inverting inputs; however, if there is noise on its input or if the input is slow to change, then the comparator's output may oscillate, switching its output back and forth between the low power supply voltage (0 volts) and the high power supply voltage (+5 volts DC). One way to mitigate this problem is to provide hysteresis by the use of positive feedback resistors around the comparator. Positive feedback is a technique for sending back a part or fraction of the output signal to the non-inverting input of the comparator via a preferable divider circuit set up by two resistors with the amount of feedback being proportional to their ratio. The comparator with hysteresis is called a Schmitt trigger and is a commonly used comparator circuit to mitigate output oscillations due to noise or when the input signals are slow to change. The Schmitt trigger may be implemented as an inverting or non-inverting comparator. The preferred non-inverting Schmitt trigger may be used in both the voltage any to square wave converter 811 and the current any to square wave converter 821. The preferred voltage signal is large enough that a non-inverting Schmitt trigger may not be necessary for the voltage any to square wave converter 811; however, using identical non-inverting Schmitt triggers for both the voltage and current any to square wave converter 821 may cancel out any timing difference that may occur if the Schmitt trigger was only used on the current any to square wave converter 821. Therefore, to minimize any timing differences between the voltage and current non-inverting Schmitt triggers, the high current trigger point and the high voltage trigger point should be substantially identical, and the low current trigger point and the low voltage trigger point should be substantially identical. There are only two voltage outcomes on the output of the any to square wave converter. The two voltages may be translated into a digital representation of those voltages.

(1) If the outcome is +5 volts, then the output may be a high signal.

(2) If the outcome is 0 volts, then the output may be a low signal.

The output of the voltage any to square wave converter 811 that transitions from low to high and back to low again constitutes a voltage pulse. The output of the current any to square wave converter 821 that is high constitutes a current pulse. The resulting voltage pulse and current pulse is sent to the polarity checker 850.

Functional Block: Polarity Checker.

The preferred polarity checker 850 compares the voltage square wave from the voltage any to square wave converter 811 with the current square wave from the current any to square wave converter 821, and checks whether the polarity is the same or opposite at each instantaneous point of time. When the reverse power flow is present, the output of the polarity checker 850 will produce an output square wave that may be referred to as a polarity pulse. The polarity checker 850 will compare the voltage square waves and current square waves and will generate a polarity pulse when the voltage square wave is high and the current square wave is low, and also when the voltage square wave is low and the current square wave is high. An exclusive OR (XOR) logical operation with two inputs results in a value of true if one but not both of its inputs is true. The output of the polarity checker 850 results in the same XOR logic operation. Therefore, a preferred logic gate called the exclusive OR (XOR) logic gate may be used for the polarity checker 850 functional block. The resulting polarity pulse is sent to the switch control 830.

Functional Block: Pulse Extender.

A pulse extender 803 will provide an extended pulse as long as a reliable current is detected. Preferably, the pulse extender 803 comprises one of the following extended pulse alternatives:

(1) Alternative 1:
  a. The alternative 1 extended pulse is continuous but may have a small period of time that is low between the leading edge of the first current pulse and the leading edge of the first leading pulse lengthener.
  b. The alternative 1 extended pulse may be used for all switch control group 890 types.
  c. The pulse extender 803 is comprised of the following pulses:
    i. a leading pulse lengthener triggered by the leading edge of the current pulse having a leading pulse length of greater than half of the cycle duration but less than the cycle duration, and
    ii. a trailing pulse lengthener triggered by the trailing edge of the current pulse having a trailing pulse length of slightly less than the cycle duration.
  d. The pulse extender 803 uses a two-input OR gate connected to the leading pulse lengthener and the trailing pulse lengthener that extends the pulse duration time of the pulse extender 803 if either of the leading pulse lengthener or the trailing pulse lengthener is triggered.
  e. The leading pulse lengths and the trailing pulse lengths overlap each other to cover the periodicity of current pulses that may vary in periodicity from the voltage pulses.

(2) Alternative 2:
  a. The alternative 2 extended pulse is continuous.
  b. The alternative 2 extended pulse may be used for all switch control group 890 types.
  c. The pulse extender 803 is comprised of the following pulses:
    i. a leading pulse lengthener triggered by the leading edge of the current pulse having a leading pulse length of greater than half of the cycle duration but less than the cycle duration,
    ii. a trailing pulse lengthener triggered by the trailing edge of the current pulse having a trailing pulse length of slightly less than the cycle duration, and
    iii. the current pulse.
  d. The pulse extender 803 uses a three-input OR gate connected to the leading pulse lengthener and the trailing pulse lengthener and that also receives the current pulse, that extends the pulse duration time of the pulse extender 803 if the leading pulse lengthener is triggered or the trailing pulse lengthener is triggered or the current pulse is received.
  e. The leading pulse lengths and the trailing pulse lengths and the current pulse lengths overlap each other to cover periodicity of current pulses that may vary in periodicity from the voltage pulses.

(3) Alternative 3:
  a. The alternative 3 extended pulse is not continuous and may have a small period of time that the output is low which is between the trailing edge of the current pulse and the leading edge of the leading pulse lengthener.
b. The alternative 3 extended pulse may be used for all switch control group 890 types.
c. The pulse extender 803 is comprised of the following pulses:
   i. a trailing pulse lengthener triggered by the trailing edge of the current pulse having a trailing pulse length of slightly less than the cycle duration, and
   ii. the current pulse.
d. The pulse extender 803 uses a 2-input OR gate connected to the trailing pulse lengthener, and that receives the current pulse that extends the pulse duration time of the pulse extender 803 if the trailing pulse lengthener is triggered or the current pulse is received.
e. The trailing pulse lengths and the current pulse lengths overlap each other to cover the periodicity of current pulses that may vary in periodicity from the voltage pulses.

(4) Alternative 4:
a. The alternative 4 extended pulse is not continuous.
b. The alternative 4 extended pulse may be used for standalone power factor correction devices and for monitoring circuits and should not be used when a dispersed electrical generator is present.
c. The pulse extender 803 is comprised of a trailing pulse lengthener triggered by the trailing edge of the current pulse having a trailing pulse length of slightly less than the cycle duration.
d. The trailing pulse lengths cover periodicity of current pulses that may vary in periodicity from the voltage pulses.

The pulse extender 803 may be realized in a preferred integrated circuit called the monostable multivibrator. The +5 volt DC output may be based on using a preferred single +5 volt power supply. Other power supply types and voltages may alternatively be used. Multivibrators (relaxation oscillators) are sequential regenerative circuits that produce an output symmetrical or asymmetrical square wave. A monostable multivibrator is an electronic circuit that has only one stable state (hence their name: "mono"), which produces a single output pulse when it is triggered externally. In signal processing, pulse duration time is the interval of time between 50% of the leading edge of the pulse and 50% of the trailing edge of the pulse. When triggered, a pulse of a pre-determined duration (pulse duration time) is produced and the monostable multivibrator is in its unstable state. When the pulse duration time is complete, the circuit returns to its stable state and produces no more output until it is triggered again.

To explain the operation of the monostable multivibrator as it is used in the pulse extender 803, a graphical representation of the noise level detector output signal is used as the input to the monostable multivibrator is shown in FIG. 12 and the associated output of the monostable multivibrator is shown in FIG. 13. The vertical axis of both graphs represents voltage. The horizontal axis of both graphs represents time with each unit representing a cycle duration time ($T_{PC}$ is a cycle duration time shown at 1211, $2T_{PC}$ is two cycle duration times shown at 1212, $3T_{PC}$ is three cycle duration times shown at 1213, $4T_{PC}$ is four cycle duration times shown at 1214, etc.). The initial state of the input of the monostable multivibrator starts at the low voltage and is shown at 1200 with the resulting output of the monostable multivibrator shown at 1300. When a general voltage pulse shown at 1201 with a general pulse duration time of 1202 is sent to the monostable multivibrator at time $T_{PC}$ 1211, the monostable multivibrator may use this general voltage pulse as a trigger to create a general output pulse shown at 1301 with a general output duration time shown at 1302. The general output pulse duration time is created by implementing a resistor and capacitor timing circuit called a RC timing circuit. Once the monostable multivibrator sends out a pulse, it will disregard the state of its input until the pulse duration time is complete. A subsequent general voltage pulse shown at 1203 may be seen at time $2T_{PC}$ 1212 with a subsequent general pulse duration time shown at 1204. The monostable multivibrator may use this subsequent general voltage pulse as a trigger to create a subsequent general output pulse shown at 1303 with a subsequent general output duration time shown at 1304. If there is no input voltage trigger, then the monostable multivibrator may output a low voltage which is shown at 1205, and the subsequent output of the monostable multivibrator may be a low voltage which is shown at 1305.

Returning to FIG. 11, the monostable multivibrator output is a digital signal and will provide the following translation. An output of 0 volts translates to a digital logic 0 signal, which represents an unreliable current. An output of +5 volts DC translates to a digital logic 1 signal, which represents a reliable current. Two monostable multivibrators may be used to generate the two pulses described in the pulse extender 803 process block. One monostable multivibrator may use the leading edge of the current pulse as a trigger to create an output pulse while the second monostable multivibrator may use the trailing edge of the current pulse as a trigger to create an output pulse. An OR logic gate combines the pulses from both monostable multivibrators and the digital logic output of the pulse extender functional block is sent to the switch control 830.

Functional Block: Switch Control.

The preferred switch control 830 receives input from the polarity checker 850 and the pulse extender 803. When the polarity pulse is high, reverse power flow is considered to be possibly present. When the polarity pulse is low, reverse power flow is not considered to be possibly present. The polarity checker 850 is enabled only if the extended current pulse indicates reliable current. The output logic is dependent on the requirements of the output of the switch control group 890. For clarity purposes, the following output logic will be used: The switch control 830 indicates reverse power flow when reliable current is indicated and reverse power flow is considered to be possibly present, which the output of the switch control 830 will be low. The switch control 830 indicates no reverse power flow when reliable current is not indicated or when reverse power flow is not considered to be possibly present, which the output of the switch control 830 will be high. A NOT AND (NAND) logical operation with two inputs results in a value of true only if one or both of its inputs is false. The output of the switch control 830 results in the same NAND logic operation. Therefore, a preferred two-input logic gate called the NOT AND (NAND) logic gate may be used for the switch control 830 functional block. A buffer may also be used on the output of the NAND logic gate for isolation purposes.

Functional Block: Switch Control Group.

In electrical engineering, a switch is an electric device that may connect or disconnect an electrical circuit, interrupting the current or diverting it from one conductor to another. A switch removes or restores the conducting path in a circuit when it is operated. An example of a switch is a diode that allows current to flow in one direction and stops the current flow when it is in the reverse direction. However, a diode is used to make switching decisions based on the direction of the current and not on power and therefore may not be used to detect reverse power flow conditions. A control mechanism is required to energize the switch to connect or disconnect the load, and this switch is called a relay. A relay is a switch that uses either an AC or DC control input to connect or disconnect a larger power circuit or provide isolation between the input control or both. For clarity purposes, the terms switch and relay may be used interchangeably.

Solid-State Relay Description.

Because the reverse power flow detection and mitigation circuit relies on speed, switch operations need to be fast. Mechanical relays (high-powered ones are called contactors) are very slow to operate and have a limited useful life because of the mechanical contacts. Solid-state relays use semiconductor devices such as silicon-controlled rectifiers, triacs or MOSFETs to perform the switching. A solid-state relay (SSR) may respond to a control signal in less than 200 nanoseconds, has no moving parts, and does not suffer from contact arcing. Therefore, if speed and durability are required, then solid-state relays are the preferred switch. For high amperage switching, most solid-state relays incorporate a thyristor (silicon controlled rectifier or a triac). However, solid-state relays using silicon-controlled rectifiers in the output circuit cannot turn-off until their load current falls below their designed holding current which causes a zero-crossing voltage turn-off condition. The solid-state relay requires an instantaneous turn-on and turn-off feature. An alternative to thyristor controlled solid-state relays are power metal-oxide-semiconductor field-effect transistor (MOSFET). A MOSFET is a transistor that is a voltage-controlled device and may be used as a switch that may have an instantaneous turn-on and turn-off capability. A MOSFET has four interfaces: drain, source, gate, and body. The body and source may be connected together. A control voltage applied at the gate may determine whether the MOSFET will conduct current between the drain and the source. The main advantage of a MOSFET is that it requires almost no input current to control the load current. There are two modes of operation for a MOSFET: enhancement mode and depletion mode. In an enhancement mode MOSFET, voltage applied to the gate terminal increases the conductivity of the MOSFET. Since an enhancement mode MOSFET increases conductivity when the gate terminal is energized, the MOSFET may be thought to have an equivalent output connection state of being normally open (NO). In a depletion mode MOSFET, voltage applied to the gate terminal decreases the conductivity of the MOSFET. Since a depletion mode MOSFET decreases conductivity when the gate terminal is energized, the MOSFET may be thought to have an equivalent output connection state of being normally closed (NC). A MOSFET transistor can be made out of both n-type or p-type semiconductors. The output of the MOSFET supports bidirectional current flow, but the construction of the MOSFET may only be controllable in one direction. By using two power MOSFETs in series, AC current may be controlled in both directions allowing the MOSFET pair to function as a solid-state relay with instantaneous turn-on and turn-off capabilities.

Figure 14:
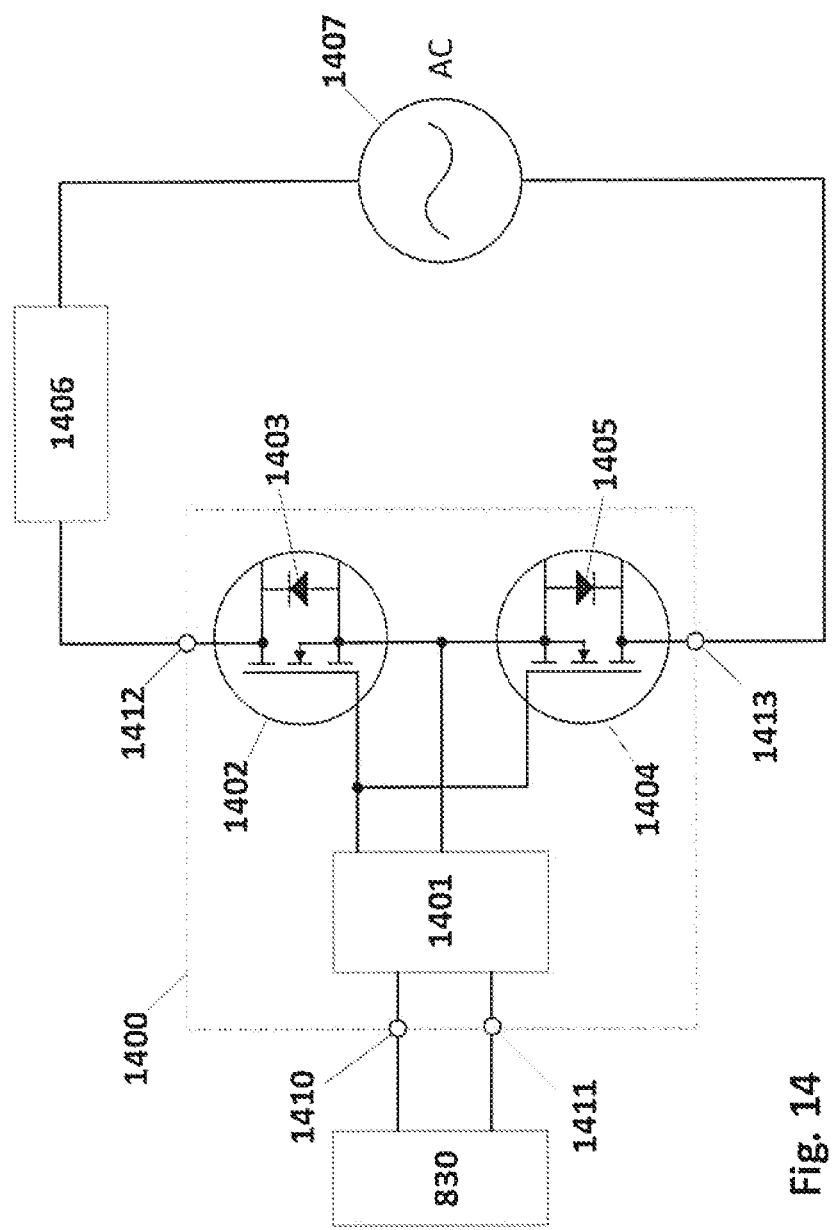
FIG. 14 is a preferred power metal-oxide-semiconductor field-effect-transistor solid-state relay of the preferred embodiment of a device according to the present invention.

FIG. 14 shows a diagram of a solid-state relay circuit. The solid-state relay may be shown at 1400 and may be composed of a MOSFET pair shown at 1402 and 1404, and a control circuit shown at 1401. The solid-state relay may have two inputs 1410 (positive) and 1411 (negative) which represents the DC digital logic inputs of the solid-state relay control circuit. The outputs of the solid-state relay shown at 1412 and 1413 and are connected to an AC current source shown at 1407. The input of the solid-state relay may be connected to the output of the switch control 830. The output of the solid-state relay may be connected to a generic AC source shown at 1407 and a generic load 1406. An intrinsic feature of an MOSFET may be a diode that is connected internally. This internal diode may be referred to as a body diode and may be shown at 1403 and 1405. During the off-time, the body diode of the MOSFET will block the current flow. When a diode blocks current, then it is said to be reverse-biased. When a diode allows current to flow through it, then it is said to be forward-biased. The body diode shown at 1403 is reverse-biased for positive voltages and the body diode shown at 1405 is reverse-biased for negative voltage. When the switch is turned-off both diodes will be in the reverse-bias mode of operation. When the switch is turned-on, the current will be able to pass through the drain and source connections of both MOSFETs in both directions. The MOSFET has an input capacitance and the control circuit shown at 1401 will provide the voltage necessary to turn-on and to turn-off the MOSFET. The control circuit 1401 may take the output digital logic signal from the switch control 830. Therefore, the solid-state relay shown at 1400 may operate as a DC controlled, instantaneous turn-on and turn-off switch AC output switch with a normally open (NO) output. Other combinations of MOSFET pairs and control circuits or both may provide a switch with a normally closed (NC) output. The conversion of the AC voltage may introduce an additional delay in the circuit, and therefore the DC controlled solid-state relays are preferable over the AC controlled solid-state relays. A DC controlled solid-state relay may be directly connected to the output of the switch control 830 if an external drive circuit is not required. The addition of a DC control circuit using different combinations of MOSFETs may function as a preferred single pole double throw switch or a preferred single pole double throw switch with instantaneous turn-on and turn-off that may switch high ampere AC loads. For clarity purposes, the general terms used for general power line 1191, general load line 1192, neutral line 1193, general power source 1160, and general load 1170 are mapped to the terminology used for each of the switch control group 890 types and will be described in each section where appropriate. Each of the switch control group 890 types are described below.

Switch Control Group: Single Pole Double Throw Switch.

FIG. 15 shows a single pole double throw switch 840. The single pole double throw switch connects to four electrical power lines.

(1) To an existing utility owned power service line 1591, which is connected to the utility power lines and is on the distribution grid side of the customer service panel.

(2) To an existing customer owned customer load line 1592 and includes the customer service panel (not shown), the customer load (not shown) and any dispersed electrical generators (not shown) if present.

(3) To a new recycled power line 1194.

(4) A neutral line 1193 is to be used as the common current return path to the source for all lines above.

A power service line 1591, customer load line 1592, neutral line 1193, and recycled power line 1194 are shown as heavier lines that represent alternating current electrical power lines as compared to the lighter line which represent a circuit signal of the switch control output shown at 843. Preferably, the power source is a power service line 1591, and the load is a customer load line 1592, the output comprises a single pole double throw switch 840 controlled by the switch control (not shown) connecting the power service line 1591 to (1) the customer load line 1592, when the switch control output 843 indicates no reverse power flow, and (2) a recycled power line 1194, when the switch control output 843 indicates reverse power flow, that diverts the alternating current from the customer load line 1592 to the recycled power line 1194 as recycled power. The single pole double throw switch 840 has one input control, a common output terminal, and two switched output terminals. The output terminals of a single pole double throw switch 840 are configured such that one output terminal is normally open (NO), which is not connected, and the other output terminal is normally closed (NC), which is connected. A normally open or closed connection is the state of a switch when there is no power applied to the control input of the switch. The input control to turn the switch power on (digital logic 1) will be referred to as energizing the switch. The input control to turn the switch power off (digital logic 0) will be referred to as de-energizing the switch. When the single pole double throw switch 840 is energized, the normally open terminal will be connected, and the normally closed terminal will be disconnected. When the single pole double throw switch 840 is de-energized, the normally open terminal will be disconnected, and the normally closed terminal will be connected. The customer load line 1592 may be connected to the common output terminal of the single pole double throw switch 840 and the power service line 1591 may be connected to one of the switched output terminals while the other switched output terminal may be connected to the recycled power line 1194. The operation of the single pole double throw switch 840 allows the connection of the customer load line 1592 to either the power service line 1591 or the recycled power line 1194 but not both at the same time.

Single Pole Double Throw Switch Equivalent.

Two single pole single throw switches may be used as an alternative to using one single pole double throw switch and will be described here. A single pole single throw switch has one input terminal and can only connect to one output terminal. The output terminal of a single pole single throw switch is configured to be either normally open (NO), which is not connected, or to be normally closed (NC), which is connected. When a single pole single throw switch with a normally open (NO) output terminal is energized the input is connected to the output. When a single pole single throw switch with a normally closed (NC) output terminal is energized, the input is disconnected from the output. The preferable combination for a single pole double throw alternative would be to use one single pole single throw switch with a normally open (NO) terminal output and one single pole single throw switch with a normally closed (NC) terminal output. Connecting the input terminals of two single pole single throw switches forms the common terminal connection. This configuration of two single pole single throw switches will in effect provide the same functionality as one single pole double throw switch. Other combinations of two single pole single throw switches with different terminal outputs may be used with the appropriate changes to the switch control logic.

Logic Control Design Considerations of Switch.

The input control of the switch determines what the output logic is required by the switch control. The logic gate requirements for the switch control will be described using one single pole double throw switch 840. The switch logic design may be based on several factors such as how efficiently the circuit needs to be in terms of the number of logic gates used, the timing of the gates based on how the logic gates are arranged, or even the propagation delay between logic gates. There is no one best logic design, as several designs may work. The decision to divert power will be referred to as recycling power. The decision to not divert power will be referred to as not recycling power. The switch control output 843 uses the following logic and will be repeated here for clarity purposes.

(1) The switch control output 843 indicates reverse power flow when reliable current is indicated and reverse power flow is considered to be possibly present, which the switch control output 843 will be low.

(2) The switch control output 843 indicates no reverse power flow when reliable current is not indicated or when reverse power flow is not considered to be possibly present, which the switch control output 843 will be high.

The common terminal is connected to the customer load line 1592, the normally open (NO) terminal output may be connected to the power service line 1591, and the normally closed (NC) terminal output may be connected to the recycled power line 1194. The switch control output 843 uses DC voltages to energize (high) or de-energize (low) the switch. The operation of the single pole double throw switch 840 will be as follows:

(1) If the switch control output 843 is low (reverse power flow is indicated), then de-energizing the switch which will result in the customer load line 1592 being connected to the recycled power line 1194 and disconnected from the power service line 1591.

(2) If the switch control output 843 is high (reverse power flow is not indicated), then energizing the switch which will result in the customer load line 1592 being connected to the power service line 1591 and disconnected from the recycled power line 1194.

Switch Control Group: Single Pole Single Throw Switch.

FIG. 16 depicts a single pole single throw switch 841. When a single pole single throw switch 841 is used, the present invention operates as a standalone power factor correction device. The single pole single throw switch connects to three electrical power lines.

(1) To a general power line 1191, which is connected to a general power source 1160.

(2) To a general load line 1192, which is connected to a general load shown at 1170.

(3) A neutral line 1193 is used as the common current return path to the source for all lines above.

The general power line 1191, general load line 1192, and neutral line 1193 are shown as heavier lines that represent alternating current electrical power lines as compared to the lighter line which represent a circuit signal of the switch control output shown at 843. The single pole single throw switch 841 connected to the Toad opens when the switch control output 843 indicates reverse power flow and closes when the switch control output 843 indicates no reverse power flow. A single pole single throw switch has one input terminal and can only connect to one output terminal. The output terminal of a single pole single throw switch is configured to be either normally open (NO), which is not connected, or to be normally closed (NC), which is connected. When a single pole single throw switch with a normally open (NO) output terminal is energized the input is connected to the output. When a single pole single throw switch with a normally closed (NC) output terminal is energized, the input is disconnected from the output. The input control of the switch determines what the output logic is required by the switch control (not shown). The logic gate requirements for the switch control (not shown) will be described using one single pole single throw switch 841. The switch logic design may be based on several factors such as how efficiently the circuit needs to be in terms of the number of logic gates used, the timing of the gates based on how the logic gates are arranged, or even the propagation delay between logic gates. There is no one best logic design, as several designs may work. The switch control output 843 uses the following logic and will be repeated here for clarity purposes.

(1) The switch control output 843 indicates reverse power flow when reliable current is indicated and reverse power flow is considered to be possibly present, which the switch control output 843 will be low.

(2) The switch control output 843 indicates no reverse power flow when reliable current is not indicated or when reverse power flow is not considered to be possibly present, which the switch control output 843 will be high.

The input terminal is connected to the general load line 1192 and the output terminal is connected to the general power line 1191. The switch control output 843 uses DC voltages to energize (high) or de-energize (low) the switch. If a single pole single throw switch 841 with a normally open (NO) terminal output is used, then the operation of the single pole single throw switch 841 will be as follows:

(1) If the switch control output 843 is low (reverse power flow is indicated), then de-energizing the switch which will result in the general load line 1192 being disconnected from the general power line 1191.

(2) If the switch control output 843 is high (reverse power flow is not indicated), then energizing the switch which will result in the general load line 1192 being connected to the general power line 1191.

If a single pole single throw switch 841 with a normally closed (NC) terminal output is used, then changes to the logic of the switch control (not shown) is required to support this type of switch.

Switch Control Group: Monitoring Circuit.

FIG. 17 depicts a functional block diagram of a monitoring circuit 842. The monitoring circuit connects to the following electrical power lines.

(4) General power line 1191, which is connected to a general power source 1160.

(5) General load line 1192, which is connected to a general load 1170.

(6) The neutral line 1193 is to be used as the common current return path to the source for all lines above.

The monitoring circuit may be connected to the power sensing and switching circuit with or without a switch. The preferred monitoring circuit that is shown enclosed in the dashed line box includes the additional following functional blocks: (1) Voltage Signal Re-scaler 1780, (2) Current Signal Re-scaler 1781, (3) Level Shifter 1782, (4) Microcontroller 1783, (5) Display 1784, and (6) Communications Interface 1785. Since the power sensing and switching circuit operates in real time, the reporting and calculation of reverse power flow measurements may not be possible using sampling techniques used in integrated circuit energy meter chips. Additionally, the current signal may not be sinusoidal and therefore the meter will require instantaneous power measurements. A different method may be used to measure reverse power flow, which will be described below. A microcontroller is a small computer on a single integrated circuit. A microcontroller contains one or more central processing units (CPU), memory, programmable input/output interfaces, analog-to-digital converters (ADC), and digital-to-analog converters (DAC). The voltage sensor 810 may provide the voltage signal information for the monitoring circuit 842. The current sensor 820, may provide the current signal information for the monitoring circuit 842. The voltage and current signals from the sensors may require rescaling depending on the electrical input requirements of the microcontroller 1783 used. A re-scaler converts a signal used for a power supply from the input system to be equivalent to a signal used for a power supply from the output system. For example, an input system may be using a +5 volt DC power supply and the output system may be using a +3.3 volt DC power supply. A re-scaler will translate the signal used in the +5 volt DC power supply system to an equivalent signal used in the +3.3 volt DC power supply system. This translation is done for analog signals. The voltage sensor 810 signal may be rescaled using a voltage signal re-scaler 1780 and the current sensor 820 signal may be rescaled using a current signal re-scaler 1781. The outputs of both re-scalers may be connected to the microcontroller 1783 analog-to-digital inputs. A level shifter is similar to a re-scaler in that it also translates a signal from one power supply system to another power system. The difference is that a level shifter is used to translate digital signals. The switch control output 843 is connected to the digital inputs of the microcontroller 1783 and may require a level shifter 1782 if the power supplies are different for both systems. Polling of the voltage sensor 810, current sensor 820, and the output of the switch control 830 are done simultaneously. The voltage sensor 810 and current sensor 820 signals are processed through the analog-to-digital converter and the output of the switch control 830 is processed through the digital input/output (I/O) ports. The calculation for the non-reverse power (non-recycled power) and reverse power (recycled power) is described though additional power measurements may also be calculated using these three input signals. The root mean square for a continuous function f(t) defined over the interval $T_1 \leq t \leq T_2$ is:

$$f_{rms} = \sqrt{\frac{1}{T_2 - T_1} \int_{T_1}^{T_2} [f(t)]^2 dt}$$

If we are polling the data, then the same function may be defined with the number of polls N, where N is taken for the time period $T_2 - T_1$, which is equal to a cycle duration:

$$RMS\{f[n]\} = \sqrt{\frac{1}{N} \sum_{n=0}^{N} f^2[n]}$$

The following algorithm may provide the root-mean-square values of both the diverted and non-recycled power for all cases of reverse power flow detection. At each poll, the microcontroller 1783 will perform the following function until a cycle duration time is completed:

(1) If the switch control output 843 is low, then the microcontroller 1783 will increment a recycled power counter, multiply the voltage and current measurement from the analog-to-digital converter, square this value and add the result to a cumulative recycled power variable.

(2) If the switch control output 843 is high, then the microcontroller 1783 will increment a non-recycled power counter, multiply the voltage and current measurement from the analog-to-digital converter, square this value and add the result to a cumulative non-recycled power variable.

(3) At the end of the cycle, the square root of the quotient of the recycled power variable divided by the recycled power counter will equal to the root-mean-square of the recycled power for a cycle duration which may then be accumulated over time such as an hour.

(4) At the end of the cycle, the square root of the quotient of the non-recycled power variable divided by the non-recycled power counter will equal to the root-mean-square of the non-recycled power for a cycle duration which may then be accumulated over time such as an hour.

(5) At the completion of the calculations, the power counters and variables are reset and the polling process continues for the next cycle.

The reverse and non-reverse power information may then be sent to a display 1784 for local viewing or to a remote location via a communications interface 1785 for monitoring and billing purposes.

Input/Output Timing Diagrams.

Timing diagrams show how different digital signals in a circuit relate to each other from a timing standpoint. For purposes of clarity, timing diagrams may show a high digital logic signal and a low digital logic signal as they transition between the two logic levels over time.

Figure 18:
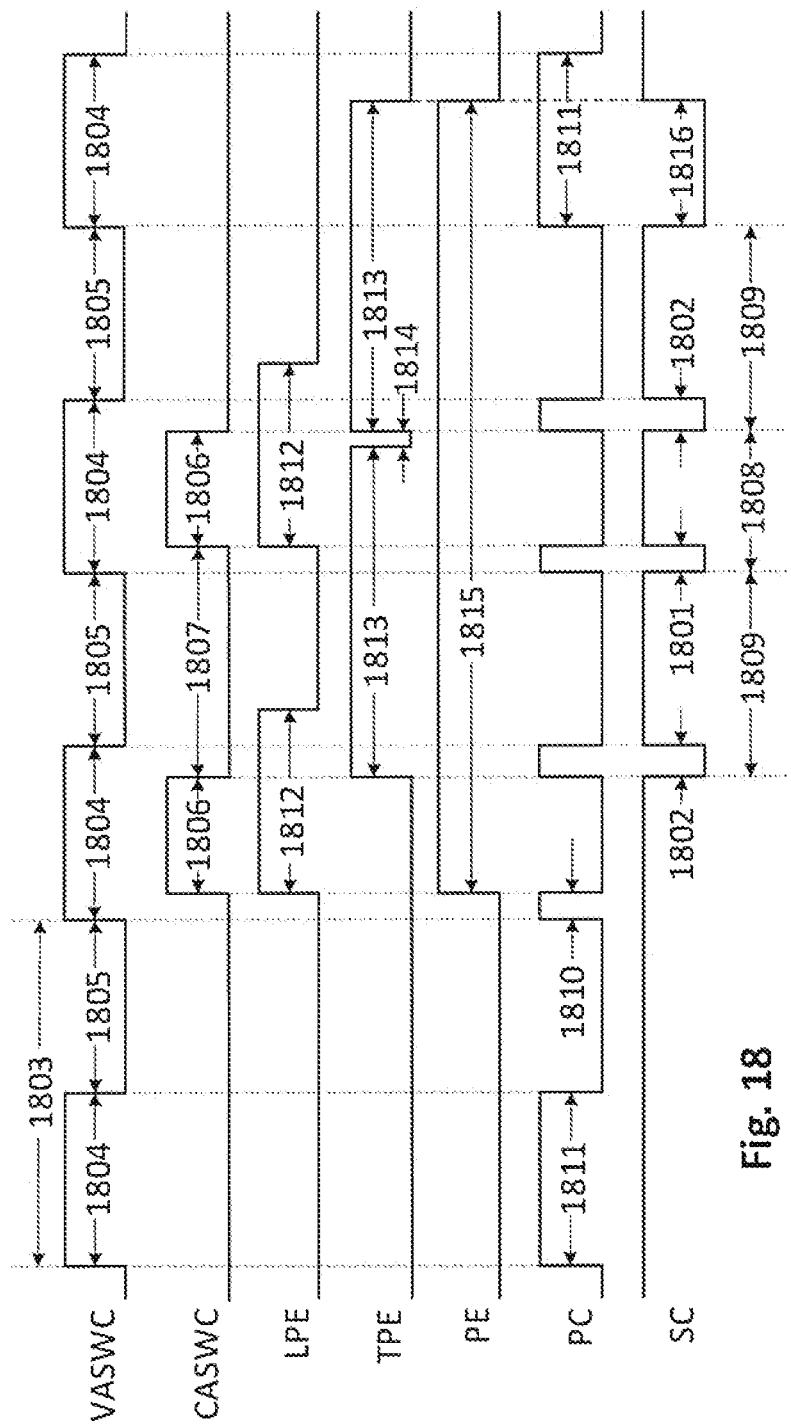
FIG. 18 is a preferred example circuit input/output timing diagram of the preferred embodiment of a device according to the present invention when diverting reverse power created by a reactive or non-linear load.
Figure 19:
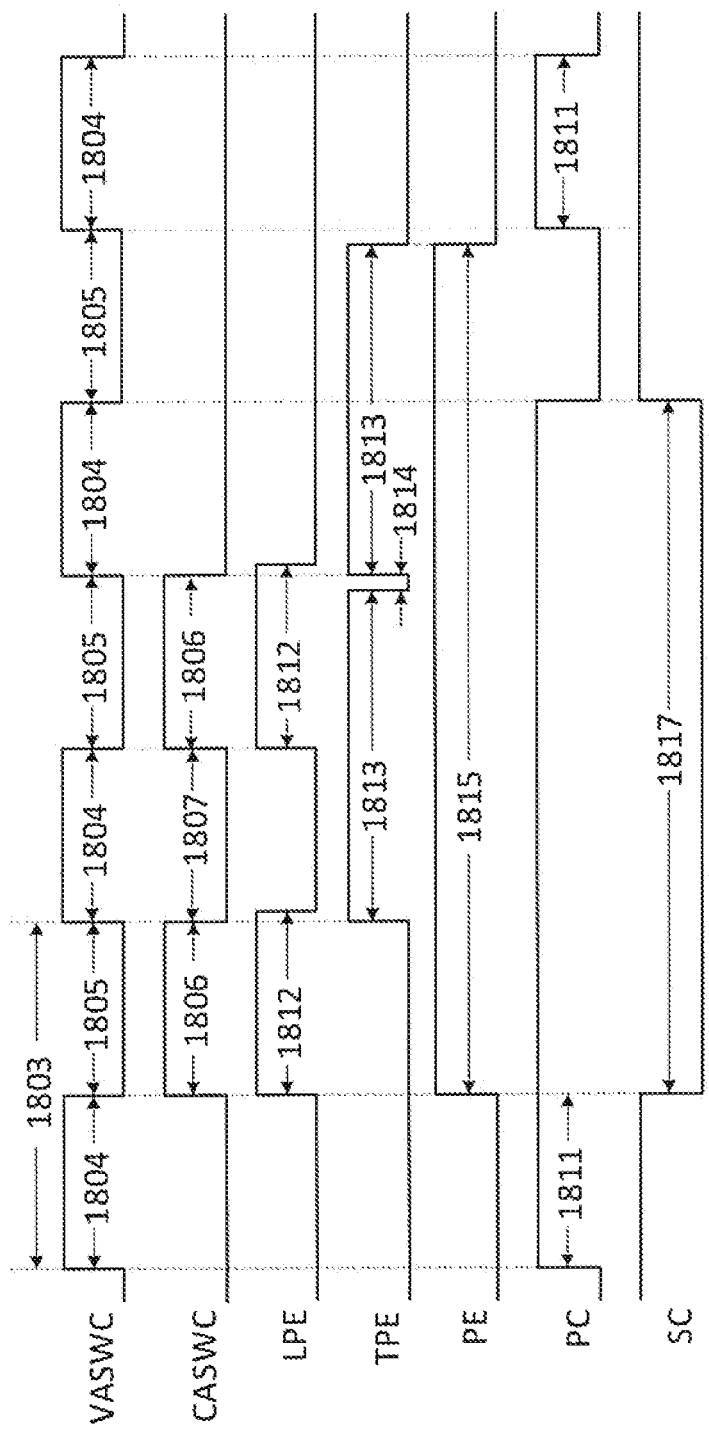
FIG. 19 is a preferred example circuit input/output timing diagram of the preferred embodiment of a device according to the present invention when diverting reverse power created by a dispersed electrical generator.

FIGS. 18 and 19 show timing diagrams when reverse power is detected in both reactive and non-linear load cases and in dispersed electrical overgeneration of power cases. The following time parameters may be first defined:

(1) $T_{RPF1}$ 1801 is defined as the time between the leading edge of voltage pulse and the leading edge of the current pulse. This time represents the reverse power flow type 1 which occurs just prior to the current pulse.

(2) $T_{RFP2}$ 1802 is defined as the time between the trailing edge of the voltage pulse and the trailing edge of the current pulse. This time represents the reverse power flow type 2 which occurs just after the current pulse.

(3) $T_{CYCLE}$ 1803 is defined as the time duration of a cycle duration (60 Hz mains frequency has a cycle duration of 16.67 milliseconds).

(4) $T_{VASC1}$ 1804 is defined as the time duration of the voltage square wave high digital logic level output signal.

(5) $T_{VASC2}$ 1805 is defined as the time duration of the voltage square wave low digital logic level output signal.

(6) $T_{CASC1}$ 1806 is defined as the time duration of the current pulse.

(7) $T_{CASC2}$ 1807 is defined as the time duration between two consecutive current pulses.

(8) $T_{CAP1}$ 1808 is defined as the time duration between the leading edge of the voltage pulse and the trailing edge of the current pulse.

(9) $T_{CAP2}$ 1809 is defined as the time duration between the trailing edge of the current pulse and the leading edge of the voltage pulse.

(10) $T_{UNK}$ 1810 is defined as an unknown time interval where the reverse power flow may be present, but the reliable current has not yet been detected.

(11) $T_N/A$ 1811 is defined as a time interval that is present but should not be considered to be legitimate.

(12) $T_{PULSE1}$ 1812 is defined as the leading pulse lengthener triggered by the leading edge of the current pulse.

(13) $T_{PULSE2}$ 1813 is defined as the trailing pulse lengthener triggered by the trailing edge of the current pulse.

(14) $T_{GAP}$ 1814 is defined as the gap of time between two consecutive $T_{PULSE2}$ pulses.

(15) $T_{OUT}$ 1815 is defined as the output pulse of the pulse extender.

(16) $T_{ERR}$ 1816 is defined as the errant pulse created when the $T_{OUT}$ pulse overlaps the $T_N/A$ pulse.

(17) $T_{RPF3}$ 1817 is defined as the reverse power flow pulse that is seen during an overgeneration of power created by a dispersed electrical generator.

Timing Diagram for Reactive and Non-Linear Load Reverse Power-Flow Cases.

FIG. 18 shows timing diagrams of important points of the example circuit when detecting both reactive and non-linear load reverse power flow conditions. The following input/output times are described below:

(1) The voltage any to square wave converter (VASWC) digital logic output signal may be repeating a mains voltage frequency with a period of $T_{CYCLE}$ 1803 (cycle duration) which is composed of time intervals $T_{VASC1}$ 1804 and $T_{VASC2}$ 1805.

(2) The current any to square wave converter (CASWC) digital logic output signal shows two output pulses $T_{CASC1}$ 1806 that indicate a reliable current which in this example is present for two cycle durations. The time between the end of the $T_{CASC1}$ 1806 pulse time and the start of the next $T_{CASC1}$ 1806 pulse time is $T_{CASC2}$ 1807.

(3) The leading pulse extender (LPE) digital logic output signal of the monostable multivibrator in the pulse extender (not shown) with a duration time of $T_{PULSE1}$ 1812 which is slightly greater than half of a cycle duration which is triggered by the leading edge of the current pulse.

(4) The trailing pulse extender (TPE) digital logic output signal of the monostable multivibrator in the pulse extender (not shown) with a duration time of $T_{PULSE2}$ 1813 which is slightly less than a cycle duration which is triggered by the trailing edge of current pulse. Time $T_{GAP}$ 1814 is the time between the end of $T_{PULSE2}$ 1813 time and the beginning of the next $T_{PULSE2}$ 1813 time.

(5) The pulse extender (PE) digital logic output signal is the combined outputs of leading pulse extender (LPE) output signal and trailing pulse extender (TPE) output signal using an OR logic gate with a resulting pulse duration time of $T_{OUT}$ 1815.

(6) The polarity checker (PC) digital logic output signal is the result of an XOR logic operation using the voltage any to square wave converter (VASWC) output signal and the current any to square wave converter (CASWC) output signal as inputs. The operation of the polarity checker is only valid when there is a reliable current. Therefore, the output pulses shown as time $T_{N/A}$ 1811 are not used in the detection of a reverse power flow condition. The output pulse shown as time $T_{UNK}$ 1810 correctly shows a reverse power flow condition. However, the present invention relies on the detection of a reliable current first before considering the polarity checker (PC) output and as such, the reverse power flow associated with $T_{UNK}$ prior to the first $T_{CASC1}$ 1806 time may not be correctly detected.

(7) The switch control (SC) digital logic output is the result of an NAND logic operation using the polarity checker (PC) output signal and the pulse extender (PE) output signal as inputs. The switch control (SC) output signal shows pulse times $T_{RPF1}$ 1801 (occurring within time $T_{CAP1}$ 1808) and $T_{RPF2}$ 1802 (occurring within time $T_{CAP2}$ 1809), which represents reverse power flow detected times. Since the pulse extender (not shown) does not know when the reliable current is no longer present, the output pulse $T_{OUT}$ 1815 will overlap the $T_{N/A}$ 1811 pulse and create an errant pulse at the end of the detection time with an error duration time of $T_{ERR}$ 1816. Since there is no reliable current detected at this point, the amount of reverse power flow detected during $T_{ERR}$ 1816 may be from noise.

Notice that pulse time $T_{PULSE2}$ 1813 is able to identify times $T_{RPF1}$ 1801 and $T_{RPF2}$ 1802 alone. However, $T_{PULSE1}$ 1812 covers the $T_{GAP}$ 1814 time that $T_{PULSE2}$ 1813 cannot cover alone. The leading pulse extender (LPE) output signal and trailing pulse extender (TPE) output signals overlap each other to cover the periodicity of the current any to square wave converter (CASWC) output signal that fluctuates and differs from the periodicity of the voltage any to square wave converter (VASWC) output signal. From a tolerance standpoint, if $T_{PULSE2}$ 1813 is used without $T_{PULSE1}$ 1812, then the following equation needs to be adhered to:

$$T_{PULSE2}\ \mathbf{1813} > T_{CASC2}\ \mathbf{1807}$$

For requirements where $T_{CASC2}$ 1807 is understood, shorter $T_{PULSE2}$ 1813 times may be used. If $T_{CASC2}$ 1807 is unknown, then using the second pulse $T_{PULSE1}$ 1812 is recommended. The largest value of $T_{PULSE2}$ 1813 may be slightly less than a cycle duration (60 Hz cycle duration is 16.67 milliseconds). However, from a practical standpoint, the $T_{PULSE2}$ 1813 time should be slightly less than the allowed frequency regulated error. For example, if the frequency tolerance level is ±0.5 Hz, with a low frequency of 59.5 Hz and a high frequency of 60.5 Hz, then $T_{PULSE2}$ 1813 should be slightly less than 16.53 milliseconds. The reverse power flow condition may be present before the leading edge of the current pulse or after the trailing edge of the current pulse or both. Equations may be constructed to describe these times based on these observations. The following equations may be used to describe the reverse power flow conditions from reactive and non-linear loads.

(1) $T_{RPF1}\ \mathbf{1801} = T_{CAP1}\ \mathbf{1808} - T_{CASC1}\ \mathbf{1806}$
(2) $T_{RPF2}\ \mathbf{1802} = T_{CAP2}\ \mathbf{1809} - T_{VASC2}\ \mathbf{1805}$
(3) $T_{CYCLE}\ \mathbf{1803} = T_{VASC1}\ \mathbf{1804} + T_{VASC2}\ \mathbf{1805}$ Timing Diagram for Dispersed Electrical Generator Reverse Power-Flow Cases.

FIG. 19 shows timing diagrams of important points of the example circuit when detecting reverse power flow from dispersed electrical generators. The following input/output times are described below:

(1) The voltage any to square wave converter (VASWC) digital logic output signal may be repeating a mains voltage frequency with a period of $T_{CYCLE}$ 1803 time (cycle duration) which is composed of time intervals $T_{VASC1}$ 1804 and $T_{VASC2}$ 1805.
(2) The current any to square wave converter (CASWC) digital logic output signal shows two output pulses $T_{CASC1}$ 1806 that indicate a reliable current which in this example is present for two cycle durations. The time between the end of the $T_{CASC1}$ 1806 pulse time and the start of the next $T_{CASC1}$ 1806 pulse time is $T_{CASC2}$ 1807.
(3) The leading pulse extender (LPE) digital logic output signal of a monostable multivibrator in the pulse extender (not shown) with a duration time of $T_{PULSE1}$ 1812 which is slightly greater than half of a cycle duration which is triggered by the leading edge of the current pulse.
(4) The trailing pulse extender (TPE) digital logic output signal of a monostable multivibrator in the pulse extender (not shown) with a duration time of $T_{PULSE2}$ 1813 which is slightly less than a cycle duration which is triggered by the trailing edge of the current pulse. Time $T_{GAP}$ 1814 is the time between the end of $T_{PULSE2}$ 1813 time and the beginning of the next $T_{PULSE2}$ 1813 time.
(5) The pulse extender (PE) digital logic output signal of the pulse extender (not shown) which is the combined outputs of leading pulse extender (LPE) output signal and trailing pulse extender (TPE) output signal using an OR logic gate with a resulting pulse duration time of $T_{OUT}$ 1815.
(6) The polarity checker (PC) digital logic output signal is the result of an XOR logic operation using the voltage any to square wave converter (VASWC) output signal and the current any to square wave converter (CASWC) output signal as inputs. The operation of the polarity checker is only valid when there is a reliable current.

Therefore, the polarity checker (PC) output pulses shown as time $T_{N/A}$ 1811 are not used in the detection of a reverse power flow condition.

(7) The switch control (SC) digital logic output is the result of an NAND logic operation using the polarity checker (PC) output signal and the pulse extender (PE) output signal as inputs. The switch control (SC) output signal shows pulse times $T_{RPF3}$ 1817, which represents reverse power flow detected times.

When detecting reverse power flow from dispersed electrical generators, the voltage any to square wave converter (VASWC) and the current any to square wave converter (CASWC) will be at opposite digital logic levels and will appear as opposite logic signal levels which are shown at times $T_{VASC2}$ 1805 (low digital logic level) and $T_{CASC1}$ 1806 (high digital logic level) as well as at times $T_{VASC1}$ 1804 (high digital logic level) and $T_{CASC2}$ 1807 (low digital logic level). Notice that time interval $T_{PULSE2}$ 1813 is no longer able to identify the reverse power flow alone. The combination of both time intervals $T_{PULSE1}$ 1812 and $T_{PULSE2}$ 1813 is now required to identify the reverse power flow condition. $T_{PULSE1}$ 1812 identifies the initial reverse power flow occurring between the start of the $T_{OUT}$ 1815 time and the start of the $T_{PULSE2}$ 1813 time and the reverse power flow occurring during the $T_{GAP}$ 1814 time. The smallest value of $T_{PULSE1}$ 1812 may be slightly greater than half of a cycle duration (one-half of the 60 Hz cycle duration is 8.33 milliseconds). However, from a practical standpoint, the $T_{PULSE1}$ 1812 time should be slightly greater than the allowed frequency regulated error. For example, if the frequency tolerance level is ±0.5 Hz, with a low frequency of 59.5 Hz and a high frequency of 60.5 Hz, then $T_{PULSE2}$ 1813 should be slightly greater than 8.40 milliseconds. Therefore, from a tolerance standpoint, the following equation needs to be adhered to:

$$T_{PULSE1}\ \mathbf{1812} > T_{VASC2}\ \mathbf{1805}$$

If the reverse power flow condition from reactive and non-linear loads and the overgeneration of power from dispersed electrical generators are simultaneously being detected, then $T_{PULSE1}$ 1812 should be slightly greater than half of a cycle duration and $T_{PULSE2}$ 1813 should be slightly less than a cycle duration.

Example Circuit Diagram of Power Sensing and Switching Circuit.

Figure 20:
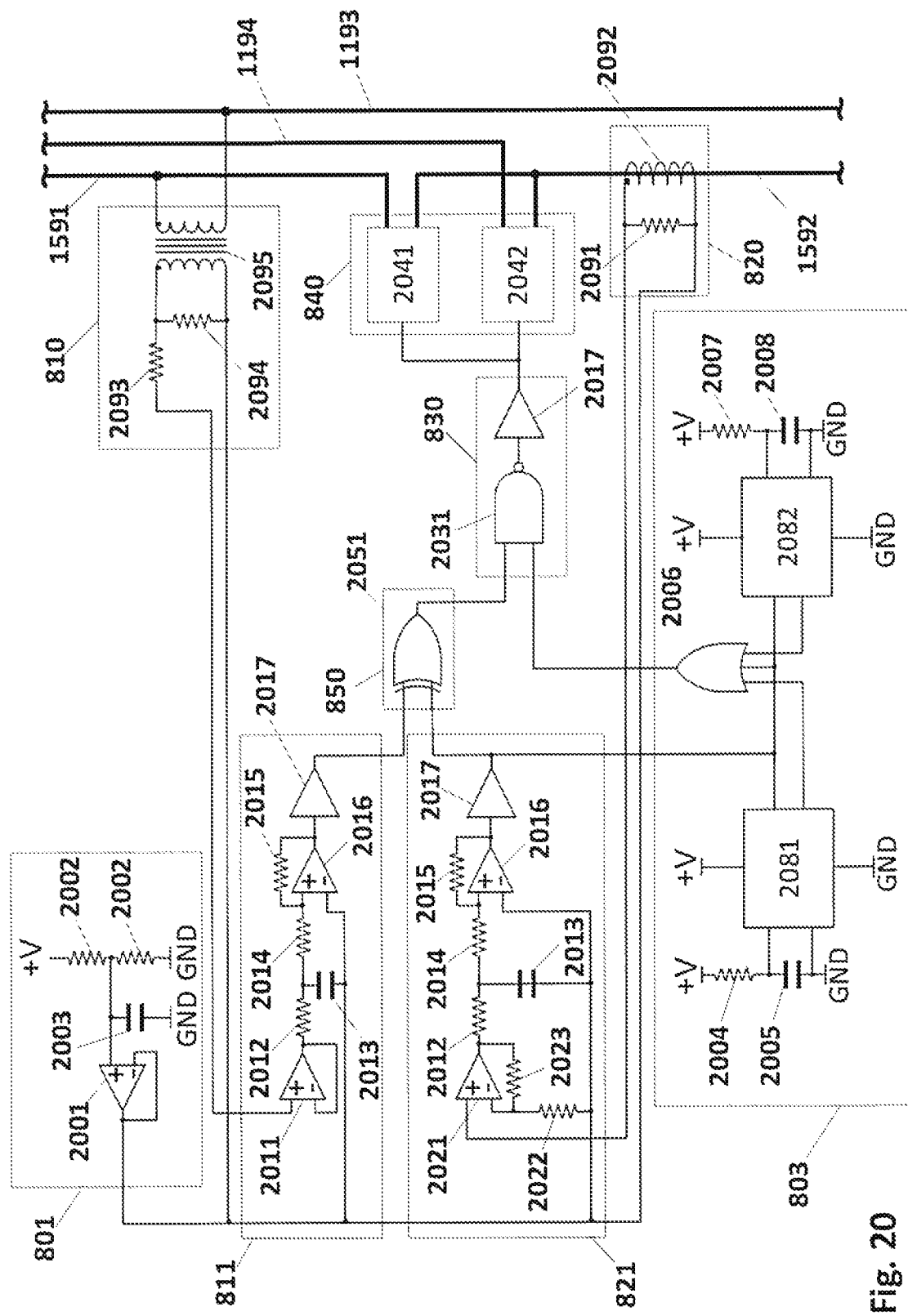
FIG. 20 is a preferred circuit diagram example of the preferred embodiment of a device according to the present invention.

FIG. 20 depicts a preferred example circuit using a single pole double throw switch 840. The preferred example circuit shows only the mandatory parts to make the circuit function correctly. Parts such as pullup/pulldown resistors, bypass capacitors, protection parts, and proper terminations of unused inputs to make the integrated circuit work are not shown unless specified otherwise. The power sensing and switching circuit interfaces to three electrical power lines.

(1) To an existing utility owned power service line 1591, which is connected to the utility power lines and is on the distribution grid side of the customer service panel.

(2) To an existing customer owned customer load line 1592 and includes the customer service panel (not shown), the customer load (not shown) and any dispersed electrical generators (not shown) if present.

(3) To a new recycled power line 1194.

(4) The neutral line 1193 is to be used as the common current return path to the source for all lines above.

A power service line 1591, customer load line 1592, and neutral line 1193 are shown as heavier lines that represent alternating current electrical power lines as compared to the lighter lines which represent circuit signals. The power sensing and switching circuit includes the following functional blocks: (1) Reference Voltage 801, (2) Voltage Sensor 810, (3) Current Sensor 820, (4) Voltage Any to Square Wave Converter 811, (5) Current Any to Square Wave Converter 821, (6) Pulse Extender 803, (7) Polarity Checker 850, (8) Switch Control 830, (9) Single Pole Double Throw Switch 840 equivalent switch circuit.

Power Supply.

The power supply (not shown) used in the preferred example circuit is a single power supply with a positive supply voltage of +5 volts DC (labeled +V) and a negative supply voltage of 0 volts DC which also serves as the ground shown as GND.

Example Circuit: Reference Voltage.

The reference voltage 801, is created by using identical divider resistors $R_{RV}$ 2002 with a decoupling capacitor $C_{RV}$ 2003, which is used to keep the voltage stable and to absorb voltage spikes. In an ideal situation, the reference voltage 801 will be at the middle crossing point of the signal. In reality, the integrated circuits used may require that the divider resistors be adjusted to the actual middle crossing point of the signal. A voltage follower (also called a unity-gain amplifier, a buffer amplifier, and an isolation amplifier) is an operational amplifier circuit which has a gain (amplification) of one, so the operational amplifier provides no amplification to the signal. A voltage follower also provides electrical isolation between circuits, with the goal of preventing the signal source from being affected by the current that the load may require. In effect, the signal is "buffered from" the load currents which gives rise to its name of being called a buffer amplifier. The example reference voltage 801 uses a voltage follower 2001 to isolate and provide the additional drive current needed by the analog circuits. The preferred operational amplifier uses a Texas Instruments, OPA350PA low-noise, low harmonic distortion operational amplifier chip.

Example Circuit: Voltage Sensor.

The voltage sensor 810, may be composed of a step-down power transformer 2095 to scale the voltage mains down to a compatible voltage for the circuit. The step-down power transformer primary inputs may be connected to the power service line 1591 and to the neutral line 1193. The step-down power transformer secondary outputs may provide a proportionally scaled, compatible voltage using the preferred resistor divider circuit ($R_{V1}$ 2093 and $R_{V2}$ 2094). The preferred step-down power transformer, Triad Magnetics FS12-090-C2, may be a Class 2 transformer that provides +6.3 volts AC on the secondaries. The output of the voltage sensor 810 is sent to the voltage any to square wave converter 811.

Example Circuit: Current Sensor.

The current sensor 820, may be composed of a non-intrusive solid nickel core or a high-grade amorphous or nanocrystalline alloy current transformer 2092 that has a hole through its center which the customer load line 1592 passes through. A burden resistor 2091 may be connected to the current transformer and may be used to convert the current output from the current transformer into a proportionally scaled compatible voltage. The preferred current transformer may be a Vacuumschmelze T60404-E4626-X502 current transformer, which has an approximate phase error of 0.11°. The output of the current sensor 820 is sent to the current any to square wave converter 821.

Example Circuit: Any to Square Wave Converter.

The voltage any to square wave converter 811, and the current any to square wave converter 821, use identical chips in each of the voltage and signal processing stages. The individual circuit sections (input isolation circuit, low-pass filter circuit, analog-to-digital signal conversion circuit, and buffer circuit) are described below.

Input Isolation Circuit.

A preferred input chip used for the preferred input isolation circuit is a Texas Instruments, OPA350PA low-noise, low harmonic distortion operational amplifier chip. The same chip is used in both the voltage any to square wave converter 811 and the current any to square wave converter 821 to reduce timing errors between the two circuits. The input isolation circuit of the voltage any to square wave converter 811 implements the operational amplifier chip as a voltage follower circuit 2011 which provides isolation of the voltage sensor 810 from the voltage any to square wave converter 811. The input isolation circuit of the current any to square wave converter 821 implements the operational amplifier chip as a non-inverting amplifier 2021 with amplification created by resistors ($R_{C1}$ 2022 and $R_{C2}$ 2023). The operational amplifier chip provides isolation, additional drive power, and amplification of the current signal.

Low-Pass Filter Circuit.

A preferred low-pass passive filter is created by resistor $R_F$ 2012 and capacitor CF 2013 to attenuate external high frequency noise. The phase shift created by the low-pass filter at the frequency of the mains should be significantly identical so that the phase difference between the voltage and current any to square wave converters are minimized.

Analog-to-Digital Signal Conversion Circuit.

A preferred non-inverting Schmitt trigger comparator 2016 is used to convert the analog signal (both voltage signal and current signal) to a digital signal. The non-inverting Schmitt trigger (hysteresis circuit) is composed of feedback resistors ($R_1$ 2014 and $R_2$ 2015). The preferred comparator is a Maxim Integrated MAX942EPA+-ND comparator with rail-to-rail outputs.

Buffer Circuit.

A buffer is an integrated logic circuit which has a 0 voltage output when there is a digital logic 0 signal input and has a high impedance (the effective resistance of an electrical circuit to an alternating current) output when there is a digital logic 1 signal input. A buffer logic gate is used to provide isolation between the analog comparator circuits and digital logic circuits. If a logic circuit provides +5 volts DC for a digital logic 1 signal and there is a requirement to interface to a logic circuit that uses +3.3 volts DC for a digital logic 1 signal, then the buffer may shift the voltage level between these two systems. The ability to shift voltages is the reason buffers are called level shifters. A buffer may also provide isolation and drive current to devices such as relay switches. A buffer should not be confused with a buffer amplifier (voltage follower). Whereas a buffer has a digital signal input and a digital signal output, the buffer amplifier has an analog signal input and an analog signal output. The preferred buffer 2017 integrated logic circuit is a Texas Instruments SN74LS07N buffer and driver chip. The outputs of the voltage any to square wave converter 811 and the current any to square wave converter 821 are sent to the polarity checker 850. The preferred noise level detector circuit used for the reliable current detection is identical to the current any to square wave converter 821 and is also used as the trigger for the preferred pulse extender 803.

Example Circuit: Pulse Extender.

The preferred pulse extender 803 is composed of two monostable multivibrators ($MM_1$ 2081 and $MM_2$ 2082) and an OR 2006 logic gate. Monostable multivibrator $MM_1$ 2081 may be configured to use the leading edge of the current pulse as its trigger and the pulse duration time may be set by an RC timing circuit consisting of a timing resistor $R_{T1}$ 2004 and timing capacitor $C_{T1}$ 2005, used to create a pulse duration time which is slightly longer than half of a cycle duration (for a 60 Hz power frequency, half of a cycle duration time is 8.33 milliseconds). Monostable multivibrator $MM_2$ 2082 may be configured to use the trailing edge of the current pulse as its trigger and the pulse duration time may be set by an RC timing circuit consisting of a timing resistor $R_{T2}$ 2007 and timing capacitor $C_{T2}$ 2008, used to create a pulse duration time which is slightly less than a cycle duration (for a 60 Hz power frequency, a cycle duration time is 16.67 milliseconds). Some monostable multivibrators provide retriggerable inputs which allow the timing circuit to be restarted if a new trigger comes in prior to the monostable multivibrator returning to the stable state. Retriggerable inputs may extend the unstable state for periods longer than the RC timing circuit. For the preferred example circuit, the retriggerable feature is not used. However, the preferred invention is not limited by the use of this feature. Some monostable multivibrators do not incorporate an RC timing circuit but still provide a programmable pulse duration time and may be used in the pulse extender 803. The preferred monostable multivibrator is a Texas Instruments CD74AHC221E monostable multivibrator. The output pulse of monostable multivibrator $MM_1$ 2081 is the leading pulse lengthener. The output pulse of monostable multivibrator $MM_2$ 2082 is the trailing pulse lengthener. The output pulse of the current any to square wave converter 821 is the current pulse which is used as a trigger for both monostable multivibrators. The various combinations for connectivity to the OR gate are described by the following options:

(1) Leading pulse lengthener, trailing pulse lengthener, and current pulse.
 a. The output pulse of the pulse extender 803 is continuous.
 b. The monostable multivibrator $MM_1$ 2081 propagation delay is mitigated that occurs for the first reliable current pulse detected for the time between the leading edge of the current pulse and the leading edge of the monostable multivibrator $MM_1$ 2081 output.
 c. This is the ideal implementation for the pulse extender 803.

(2) Trailing pulse lengthener and current pulse.
 a. The output pulse of the pulse extender 803 is not continuous.
 b. The output of the pulse extender 803 will be momentarily low for the time between the trailing edge of the current pulse and the leading edge of the monostable multivibrator $MM_2$ 2082 output, because of the monostable multivibrator $MM_2$ 2082 propagation delay.

(3) Leading pulse lengthener and trailing pulse lengthener.
 a. The output pulse of the pulse extender 803 is continuous.
 b. The monostable multivibrator $MM_1$ 2081 propagation delay is not mitigated that occurs for the first reliable current pulse detected for the time between the leading edge of the current pulse and the leading edge of the monostable multivibrator $MM_1$ 2081 output.
 c. This is the preferred implementation for the pulse extender 803.

(4) Trailing pulse lengthener only.
 a. The output pulse of the pulse extender 803 is not continuous.
 b. Reverse power flow detection for the overgeneration of power from dispersed electrical generators is not supported if monostable multivibrator $MM_2$ 2082 is absent.

The OR logic gate is a Texas Instruments CD74HC4075E. The output of the pulse extender 803 is sent to the switch control 830.

Example Circuit: Polarity Checker.

The polarity checker 850, is a Texas Instruments SN74HC86N exclusive OR (XOR) 2051 logic gate. Inputs from the voltage any to square wave converter 811, and the current any to square wave converter 821 are connected to the inputs of the XOR 2051 gate. The resulting digital signal output (polarity pulse) of the polarity checker 850 is sent to the switch control 830.

Example Circuit: Switch Control.

The switch control 830, is composed of a preferred Texas Instruments SN74AHC00N NAND 2031 logic gate is used to determine when solid-state relay $SSR_1$ 2041 and solid-state relay $SSR_2$ 2042 switches (equivalent to a single pole double throw switch) shown at 840 may be energized (connects the customer load line 1592 to the power service line 1591) and de-energized (connects the customer load line 1592 to the recycled power line 1194). The propagation delay of the OR 2006 gate (used in the pulse extender 803) and the XOR 2051 gate (used in the polarity checker 850) should be approximately equal so that the NAND 2031 gate will receive the input signals of the polarity checker 850 and pulse extender 803 at the same time. This is not required if the ideal implementation for the pulse extender 803 is used. Outputs from the polarity checker 850, and the pulse extender 803 are connected to the inputs of the switch control 830 logic NAND 2031 gate. Logic math may create many combinations of logic gates that provide the same result. Because the logic gates are faster than analog integrated circuits, increased propagation delays because of a non-simplified logic design may be tolerated as long as the performance of the circuit is not impacted. The output of the NAND 2031 logic gate may be connected to relay switches. Relay switches are controlled via a low voltage (turn-on switch) or a high voltage (turn-off switch). Although relay switches have logic input states, they may not be compatible with digital logic gate outputs. A buffer 2017 integrated logic circuit may be used to address this incompatibility between interfaces. A buffer 2017 integrated logic circuit is a Texas Instruments SN74LS07N buffer and driver chip may connect the NAND 2031 logic gate output to the switch circuit shown at 830.

Example Circuit: Switch.

The present switch used in the example circuit, may be implemented using discrete power MOSFET transistors. The switch circuit (equivalent to a single pole double throw switch), shown at 840, is implemented with two solid-state relays (shown as $SSR_1$ 2041 and $SSR_2$ 2042). Solid-state relay $SSR_1$ 2041 connects the customer load line 1592 to the power service line 1591. Solid-state relay $SSR_2$ 2042 connects the customer load line 1592 to the recycled power line 1194. Solid-state relays $SSR_1$ 2041 and $SSR_2$ 2042 are connected together to be an equivalent representation of a single pole double throw switch 840 where the common terminal is the customer load line 1592. Solid-state relay $SSR_1$ 2041 is configured to function as a normally open equivalent switch. Solid-state relay $SSR_2$ 2042 is configured to function as a normally closed equivalent switch.

Example Circuit Propagation Delay.

The power sensing and switching circuit relies on speed for both detection and mitigation of reverse power flow. The vendor data sheets of the propagation delays or settling times at 0.1% of the chips used in the preferred example circuit may be used to calculate the maximum propagation delay of the circuit.

(1) Texas Instruments OPA350PA-ND; settling time of 220 nanoseconds.
(2) Maxim Integrated MAX942EPA+-ND; maximum propagation delay of 200 nanoseconds; typical 80 nanoseconds.
(3) Texas Instruments SN74LS07N (buffer); maximum high to low propagation delay 30 nanoseconds; typical 19 nanoseconds.
(4) Texas Instruments SN74HC86N (XOR); maximum propagation delay at 25° C. for a 15 picofarad load for a 5 volt DC power supply of 6.8 nanoseconds; typical 4.8 nanoseconds.
(5) Texas Instruments SN74AHC00N (NAND); maximum propagation delay at 25° C. for a 15 picofarad load for a 5 volt DC power supply of 5.5 nanoseconds; typical 3.7 nanoseconds.
(6) Texas Instruments SN74LS07N (buffer); maximum high to low propagation delay 30 nanoseconds; typical 19 nanoseconds.

The total propagation time of the circuit less switch is calculated for the worst-case scenario to be 492.3 nanoseconds (typical 346.5 nanoseconds). Solid-state relay technology may be the area of largest improvement where circuit speed and advances in solid-state relay technology are concerned. Future high-speed power switching technology may have the greatest impact on circuit performance.

Mitigating Reverse Power-Flow.

Reverse power flow from dispersed electrical generators are both an asset and a liability for the utility. On one hand, excess power created by dispersed electrical generators provides cheaper power to the grid. On the other hand, it causes grid instability issues when there is too much of it. Reverse power flow from reactive or non-linear loads may be considered a waste of power by both the utility and the consumer. Because utilities need to generate more current to compensate for this reverse power flow, the overall capacity of the power system is decreased by having to carry this wasted power. Increasing the capacity in the distribution grid will allow for more dispersed electrical generators. However, dispersed electrical generators may not be aware of either a backfeeding condition occurring or when the utility has removed power from the distribution grid. One approach is to divert the power to the ground. Although reverse power flow has been mitigated, this approach may be wasteful and would not be in the best interest of either the utility or the consumer. Another approach to dealing with overgeneration of power may be to create a communications network that communicates with dispersed electrical generators to throttle back on their production. This is a very complicated task, as communications takes time and reverse power flow would have already entered into the distribution grid before any mitigation attempt is made. Since mitigation needs to be done in real time, mitigation of the reverse power needs to be done when the reverse power flow is detected without any external intervention, making this approach less preferred. Furthermore, a communications system may create a potential security hole for unwanted control and access of the distributed electrical generators. Another approach is to divert excess power into an energy storage system (like battery storage) for future use. The energy storage system may be a good solution for customers, as these systems continue to drop in cost. However, in the present situation, battery systems increase capacity only up to the point that they are allowed to meet their own consumption and any additional capacity may not be sent into the distribution grid. Therefore, this approach does not allow customers who have dispersed electrical generators to participate in the wholesale power market. The approach that may best fit the present invention is conceptualized in a layered generation and consumption model.

Layered Generation and Consumption Model.

The creation of distinct layers of power generation and consumption with the ability to accommodate excess power generation without creating instability in the distribution grid is presented by Lorentz, De Martini, and Taft in a concept referred to as the decentralized, layered-decomposition optimization structure. The key takeaway from this conceptualized model is the creation of a layered structure of power generation and consumption. Each layer has a capacity limit determined by the amount of consumption from customer loads and energy storage systems. Each layer has a power generation limit equal to the consumption capacity limit, and excess power is sent to the layer above it. Using the layered generation and consumption model allows for an approach that identifies the issues at each layer and therefore provides insight into the best way to mitigate those issues. Three layers may be identified and are described below.

(1) The first layer of power generation and consumption is at the customer site.
   a. Utility power and dispersed electrical generators are the power generation sources, while the customer load is the primary consumption load.
   b. Storage devices (like batteries) are both power generation sources and consumption loads.
   c. The consumption capacity limit of the first layer is when the customer load and battery storage are at full capacity.
   d. Power generated in excess would expect to be sent to the second layer, but doing so may create grid instability issues.
(2) The second layer of power generation and consumption is at the community level, where multiple consumer sites are connected via medium voltage distribution lines and low voltage distribution lines.
   a. The utility power and any excess power from the first layer are the power generation sources.

b. The consumption capacity comprises all the first layer customer loads, including those that have no dispersed electrical generators as well as community energy storage systems.

c. In the distribution grid, the excess power would create a benefit to customers connected to the same distribution line. Enough power could be generated up to the capacity of the distribution grid at which point the excess power causes backfeeding instability issues in the distribution grid. The backfeeding protection circuitry may disconnect the distribution grid from the power grid when excess power is sensed, preventing excess power to be sent to the layer above.

(3) The third layer of power generation and consumption is at the transmission line level, where many communities are interconnected together.

a. If power from the second layer could make it to this layer, then the customers who own dispersed electrical generators could take part in the wholesale power market. However, selling wholesale power is not possible because excess power is not allowed at the second layer.

Each of the three layers of power generation and consumption work independently and has a clear demarcation from each other, which reduces the overall complexity of the power delivery system. The present invention addresses these issues in a recycled power system model which is described below.

Micro Model of the Recycled Power System.

The invention defines a process for mitigating reverse power flow in an alternating current circuit that includes a generator and a customer load which utilizes the power sensing and switching circuit to detect times of reverse power flow by detecting when the current and voltage are of opposite polarities and diverts the reverse power flow to create recycled power. The recycled power sent to the recovery service line is a low voltage line. The recovery service line connects to recovery lines, are low voltage lines for remote recycling of the recycled power. The recycled power sent to the preconditioned power lines may be used for local recycling of the recycled power by reconditioning the recycled power using a recycled power reconditioning circuit to create reconditioned power and introducing the reconditioned power into a customer service panel for use by a customer load or by storing the recycled power in an energy storage system for future use. To accomplish the diversion of reverse power flow, the single pole double throw switch 840 is used and the invention further comprises:

(1) a power transformer circuit connected to the recycled power line;

(2) a preconditioned power line connected to the power transformer circuit; and (3) a recycled power reconditioning circuit containing a recycled energy storage system connected to the preconditioned power line.

When the output of the switch has the recycled power, the alternating current flows from the recycled power line through the power transformer circuit, through the preconditioned power line to the recycled power reconditioning circuit and into the recycled energy storage system. The stored power may be then reinserted into the customer service panel for use by the customer load.

Figure 21:
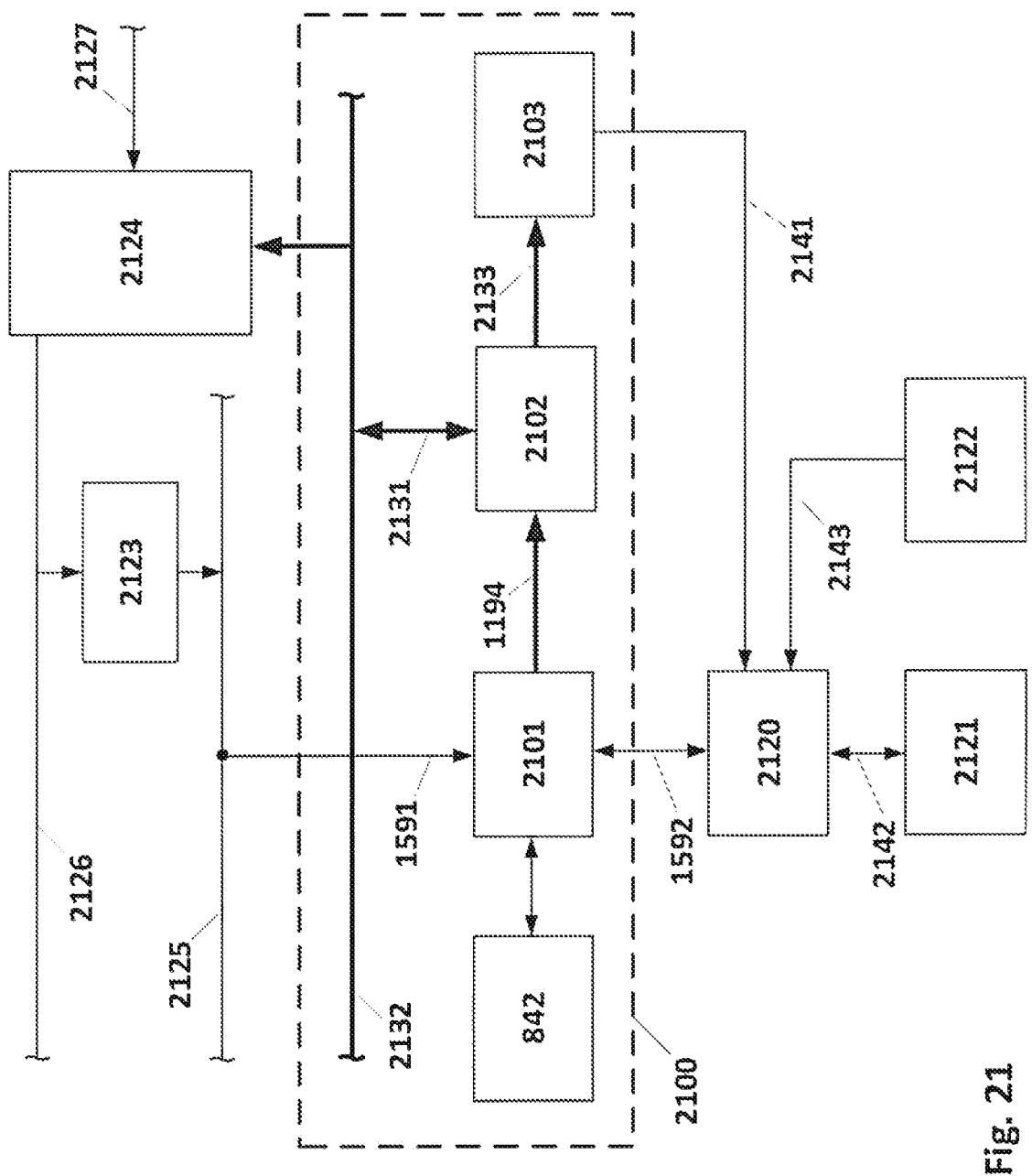
FIG. 21 is a block diagram of a power sensing and switching circuit, recovery service lines, recovery lines, recycled power reconditioning circuit, monitoring circuit, and power transformer circuit integrated as a total solution for detecting and mitigating reverse power flow.

FIG. 21 shows a functional block diagram of the recycled power system, enclosed in a dashed box, shown at 2100 and how it is integrated into the customer site and distribution grid. Recycled power may exist on the recycled power line 1194, the preconditioned power line 2133, the recovery service line 2131, and the recovery line 2132. Recycled power is shown as heavy solid lines and are low voltage lines.

The Distribution Grid.

The utility power originates from the transmission grid (not shown) and power is sent to the substation 2124 on high voltage lines 2127. Power is then sent from the substation 2124 to medium voltage lines 2126 within the distribution grid. The medium voltage lines 2126 are connected to the low voltage lines 2125 via a step-down power transformer 2123. Utility power may be provided to the customer site by the power service line 1591.

The Combined Customer Load.

The customer load 2121 may be connected to the customer service panel 2120 via the customer load connection 2142. A dispersed electrical generator 2122 may be connected to the customer service panel 2120 via a dispersed electrical generator connection 2143. The combined customer load is sent to a customer load line 1592. The bidirectional arrows between the customer service panel 2120 and the power sensing and switching circuit 2101 and between the customer service panel 2120 and the customer load 2121, shows forward power flow towards the customer load 2121 and reverse power flow towards the power sensing and switching circuit 2101.

Power Sensing and Switching Circuit.

The power sensing and switching circuit 2101 may have the following functionality:

(1) Is connected to the distribution grid via the power service line 1591.

(2) Is connected to the combined customer load via the customer load line 1592.

(3) Detects and mitigates reverse power flow from:
   a. Reactive loads.
   b. Non-linear loads.
   c. The overgeneration of power by dispersed electrical generators 2122.

(4) Diverts reverse power flow as recycled power to the power transformer circuit 2102 via the recycled power line 1194.

(5) Operates as a power factor correction device.

(6) May be connected to the monitoring circuit 842 which may be used to collect and/or display power metering information.

Recovery Lines.

The amount of wasted power being created by inefficient customer loads in total may not have been known, but it was less than the amount of power being generated. Therefore, backfeeding issues could be controlled by existing protection circuits even if waste power was created by these inefficient customer loads. The arrival of dispersed electrical generators when creating excess power has magnified backfeeding issues that have increased the instability of the distribution grid. If the paradigm shift is moving towards the implementation of more dispersed electrical generators, then a new approach is needed to handle the overgeneration of power which does not compromise the grid and allows customers with dispersed electrical generators to take part in wholesale power generation without restriction from issues (like backfeeding) from the existing power distribution grid. The architecture of the new system keeps the existing distribution grid operating in the same manner which has allowed the reliable delivery of power for over a century but augmenting the system with a new transmission grid built specifically for dispersed electrical generators located in the outlying community areas. The reverse power from inefficient loads and the reverse power generated by the over-generation of power may be combined and the net result may be called recycled power. The recycled power comes from the power sensing and switching circuit diverting reverse power to new recovery lines. The existing transmission grid carries only utility power. In contrast, the recovery lines may carry only recycled power. In the United States, utility specifications define low voltage as an insulated cable that carries current having voltages ranging from +120 volts AC to +600 volts AC. These low voltage cables are used in both aerial and underground distribution lines. These same types of low voltage cables may be used for the recovery lines using the same aerial and underground infrastructure used for the existing distribution lines.

Recycled Power Reconditioning Circuit.

Recovering waste power, recycling it, and reinserting it as a reconditioned power into the customer Load may restore this lost power. note that recycled power should not be reinserted back into the customer site without first reconditioning the recycled power. The present embodiment of a recycled power reconditioning circuit may be described below.

Figure 23:
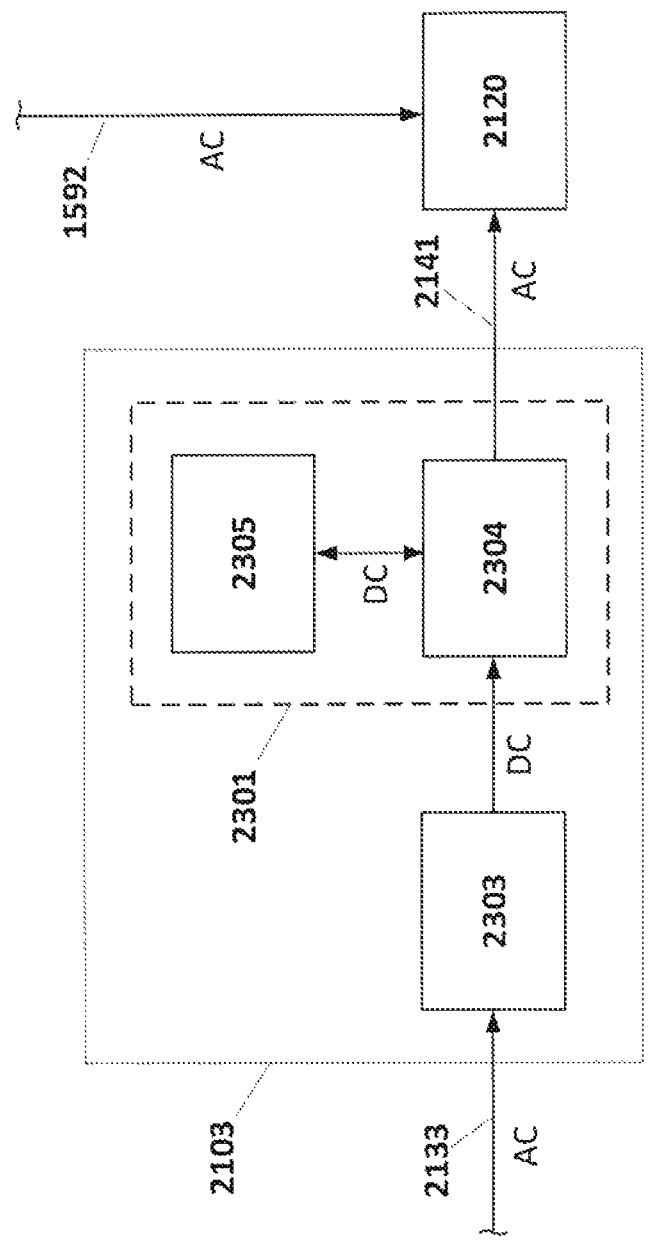
FIG. 23 is a block diagram of a recycled power reconditioning circuit.

FIG. 23 depicts a functional block diagram of the recycled power reconditioning circuit 2103. The solid lines in the diagram may show the actual power and the arrows may show the direction of the power. The power may be shown as an alternating current AC or a direct current DC. The dashed lines may show the control signal lines of the circuit. The recycled power reconditioning circuit comprises the following functional blocks: (1) rectifier 2303, (2) hybrid inverter 2304, and (3) battery system 2305.

The customer service panel shown at 2120 connects the customer load line 1592 to the conditioned power line 2141. When introducing the reconditioned power back into the distribution grid, the phases of the mains voltage and reconditioned power voltage need to be the same. When the sine wave is synchronized with the mains voltage, reconditioned power may be reinserted back into the customer service panel 2120 via the conditioned power line 2141. The recycled power reconditioning circuit 2103 may incorporate a recycled energy storage system 2301. The recycled energy storage system is comprised of a hybrid inverter 2304 and a battery system 2305. The hybrid inverter converts both the rectifier DC voltage and battery DC voltage to AC voltage. It also handles all of the battery control charging and discharging functions. Returning to FIG. 21, the recycled power reconditioning circuit shown at 2103 may have the following functionality:
(1) Receive recycled power from the power transformer circuit.
(2) Process recycled power to be reinserted into the customer service panel 2120 as reconditioned power via the conditioned power line 2141.
(3) The recycled power sent to the preconditioned power lines 2133 may be used for local recycling of the recycled power.
(4) Incorporates a recycled energy storage system (not shown) that may store the recycled power for future use.

Power Transformer Circuit.

Figure 22:
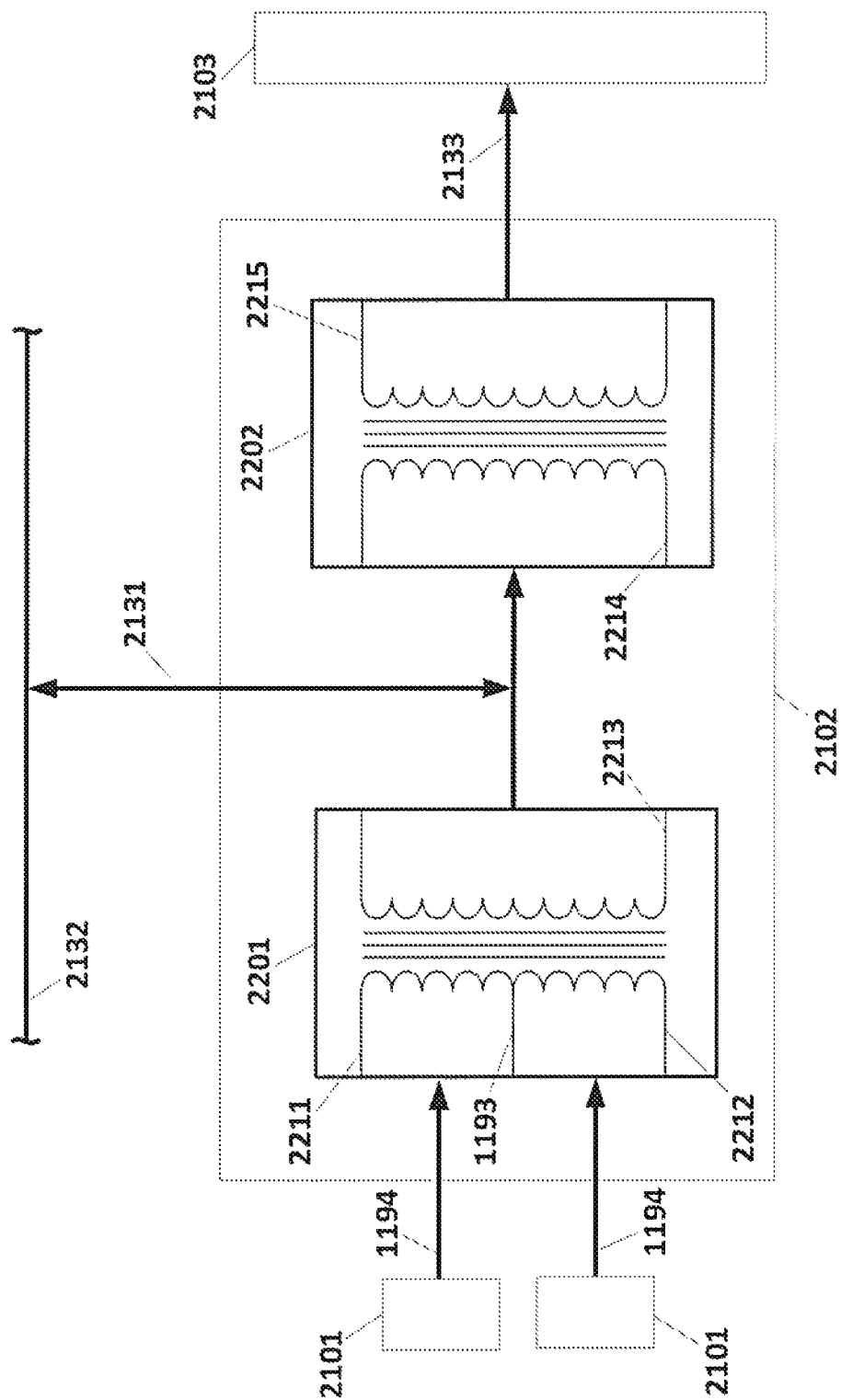
FIG. 22 is a block diagram of a power transformer circuit that connects the power sensing and switching circuit and the recycled power reconditioning circuit to the recovery line.

FIG. 22 provides a detailed view of the power transformer circuit 2102. The power transformer circuit 2102 may be composed of two power transformers XFMR$_{IN}$ 2201 and XFMR$_{OUT}$ 2202. The power transformer circuit is used to connect different voltages from the power sensing and switching circuit, recovery lines, and the recycled power reconditioning circuit. The transformer voltages are described using US voltages but can be adapted for use in other countries. Actual voltages used may be different depending on the voltages required for each of the lines connected to the power transformer circuit. For clarity, lines are shown as logical connections and not physical connections. Recycled power may exist on the following four lines:
(1) Recycled power line 1194 is connected to the power transformer circuit 2102.
(2) Recovery service line 2131 is connected to the power transformer circuit 2102.
(3) Recovery line 2132 is connected to the recovery service line 2131.
(4) Preconditioned power line 2133 is connected to the power transformer circuit 2102.

The power sensing and switching circuit 2101 may be connected to the power transformer XMFR$_{IN}$ 2201 via the recycled power line 1194. Line L1 shown at 2211 on power transformer XFMR$_{IN}$ 2201 has a voltage of 120 volts AC. Line L2 shown at 2212 on power transformer XFMR$_{OUT}$ 2202 has a voltage of 120 volts AC. A neutral line is shown at 1193. Power transformer XMFR$_{IN}$ 2201 is used to convert both lines L1 and L2 from two separate power sensing and switching circuits, that has 120 volts AC on two recycled power lines 1194 to 600 volts AC shown at 2213 on the recovery service line 2131. Power transformer XFMR$_{OUT}$ 2202 may be connected to the recycled power reconditioning circuit 2103. Power transformer XMFR$_{OUT}$ 2202 is used to convert 600 volts AC shown at 2214 on the recovery service line 2131 to 240 volts AC shown at 2215 on the preconditioned power line 2133. The power transformers XMFR$_{IN}$ 2201 and XMFR$_{OUT}$ 2202 are connected to the recovery line 2132 via the recovery service line 2131.

Returning to FIG. 21, the power transformer circuit 2102 may have the following functionality:
(1) May be used to interconnect different voltages from the recycled power line 1194, recovery service line 2131, and the preconditioned power line 2133.
(2) Carries recycled power between the power sensing and switching circuit 2101, the recovery lines 2132 via the recovery service line 2131, and the recycled power reconditioning circuit 2103.

There may be no space allocated for a new transformer on either the utility poles or the sidewalk equipped with transformer pads. Therefore, the preferred location of the power transformer circuit may be at the customer site.

Understanding the Power Sensing and Switching Circuit and the Recovery Lines.

The power sensing and switching circuit works with the recovery lines by detecting reverse power flow in real time and then switching only the overgeneration of power to the recovery lines. References to US power standards are made for the sake of simplicity.

Figure 24:
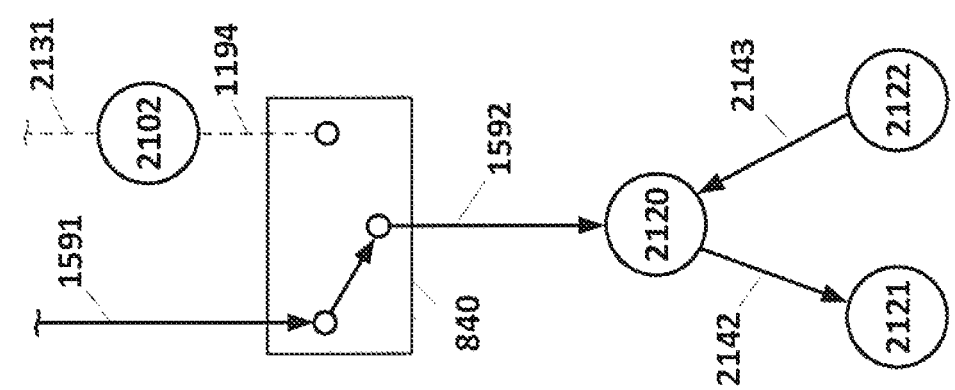
FIG. 24 is a diagram showing power flow to a customer having a dispersed electrical generator, and the present invention, where the dispersed electrical generator generates less power than the customer load.
Figure 25:
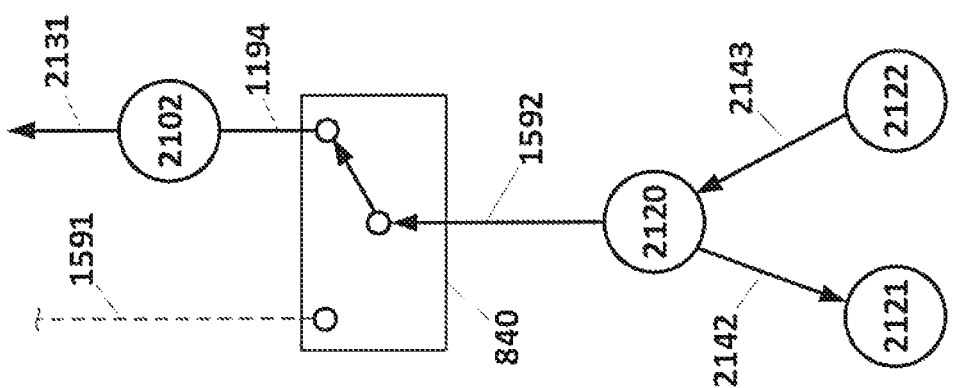
FIG. 25 is a diagram showing power flow to a customer having a dispersed electrical generator, and the present invention, where the dispersed electrical generator generates more power than the customer load.
Figure 26:
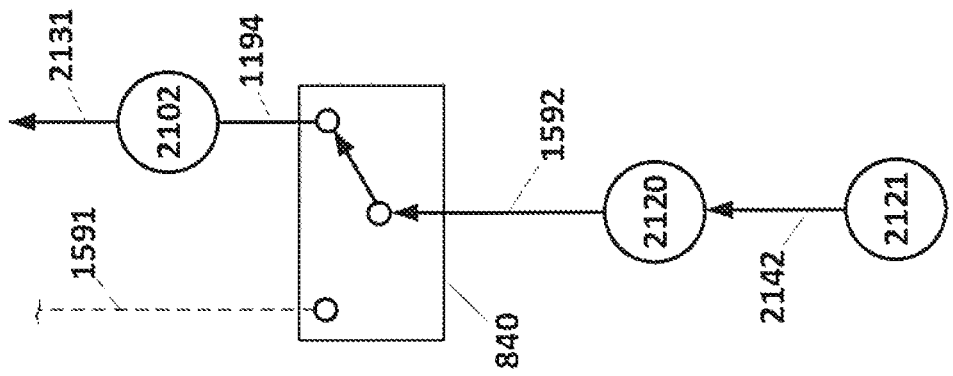
FIG. 26 is a diagram showing normal power flow to a customer without a dispersed electrical generator and the present invention, where the customer load (alone) generates a reverse power flow.

FIGS. 24, 25, and 26 depict logical diagrams of the power sensing and switching circuit and recovery lines. The recovery service line 2131 connects the recovery line (not shown) to the customer site. The present invention connection to the customer site is via a single pole double throw switch 840. The single pole double throw switch 840 common connection is to the customer load line 1592. One terminal output of the single pole double throw switch 840 is connected to the power service line 1591 while the other terminal output is connected to the recycled power line 1194. The recycled power line 1194 is connected to the power transformer circuit 2102 which is then connected to the recovery service line 2131. The customer load line 1592 is connected to the customer service panel 2121. If a dispersed electrical generator 2122 is present, then it is connected via a dispersed electrical generator connection 2143. The customer load 2121 is connected via a customer load connection 2142 to the customer service panel 2120. The customer load line 1592, the dispersed electrical generator connection 2143, and the customer load connection 2142, intersect at the customer service panel 2120. The arrows in the figures show the direction of the power flow. Dash lines represent no power flow.

FIG. 24 shows a forward power flow condition (no reverse power condition). A forward power flow condition exists when the load consumption is greater than the power generated by the dispersed electrical generator 2122. During the forward power flow condition, the single pole double throw switch 840 is not connected to the recycled power line 1194 and no power may be flowing in or out of the power transformer circuit 2102. The direction of the arrows shows the forward power flow in the direction towards the customer load 2121.

FIG. 25 shows a reverse power flow condition occurring by the overgeneration of power of a dispersed electrical generator 2122. A reverse power flow condition exists when the load consumption is less than the power generated by the dispersed electrical generator 2122. During the reverse power flow condition, the single pole double throw switch 840 is connected to the recycled power line 1194 and power may be flowing towards the power transformer circuit 2102 and the power service line 1591 will be disconnected from the customer site. The direction of the arrows shows the reverse power flow in the direction towards the recovery service line 2131.

FIG. 26 shows a reverse power flow condition occurring by a reactive load or non-linear load or both. For simplicity, the dispersed electrical generator 2122 is removed from the figure. The invention acts as power factor correction device in this scenario. During the reverse power flow condition, the single pole double throw switch 840 is connected to the recycled power line 1194 and recycled power may be flowing towards the power transformer circuit 2102. The direction of the arrows shows the reverse power flow in the direction towards the recovery service line 2131.

Returning to FIG. 21, the recovery lines 2132 may have the following functionality:
(1) Provide a transmission line within the distribution grid for recycled power.
(2) Utilize the same low voltage cable types used in the low voltage lines 2125 which allows the recovery lines 2132 to use the same easements as the existing low voltage lines 2125.
(3) Provide isolation from the existing distribution lines to mitigate backfeeding problems.
(4) Carry recycled power from a customer site to another customer site or to the substation 2124.
(5) The recycled power sent to the recovery service line 2131 and recovery lines 2132 may be used for remote recycling of the recycled power.

Deployment Combinations of the Recycled Power System. The power sensing and switching circuit, recovery lines, and recycled power reconditioning circuit may be used independently or in combinations with each other. Each of these use cases will be described below:
(1) Power Sensing and Switching Circuit Only
   a. Monitoring Circuit
     i. A monitoring circuit may be used to provide recycled power and non-recycled power information.
     ii. No switch is required in this mode of operation.
   b. Power Factor Correction Device for Device Loads
     i. A power factor correction device for commercial products that may be attached to device power source (for example, a power outlet and circuit breaker in a customer service panel) located in the customer load.
     ii. A single pole single throw switch (not shown) may be used to connect and disconnect the device load from the device power source.
   c. Power Factor Correction Device for Customer Site
     i. A power factor correction device for the customer site.
     ii. A single pole single throw switch (not shown) may be used to connect and disconnect the customer load line from the power service line.
     iii. This mode of operation is not recommended for customers who have net metering contracts, as overgeneration of power will not be allowed into the distribution grid.
     iv. This mode of operation may be used for customers which have renewable power contracts that prohibit overgeneration of power into the power grid.
(2) Power Sensing and Switching Circuit+Recovery Lines
   a. A power factor correction device for the customer site.
   b. A single pole double throw switch (not shown) may be used to connect the customer load line to either the power service line or the recycled power line.
   c. Used for diversion of reverse power from reactive loads, non-linear load, and from dispersed electrical generator overgeneration of power to be used as recycled power that may be sent to recovery lines.
   d. This mode of operation may be used by customers who have net metering contracts or contracts that prohibit overgeneration of power into the power grid.
   e. Any contracts that allow for the sale of wholesale power may be accommodated.
   f. If a dispersed electrical generator is deployed, then the utility power may be looked at as a backup power source.
(3) Power Sensing and Switching Circuit+Recycled Power Reconditioning Circuit
   a. A power factor correction device for the customer site.
   b. A single pole double throw switch (not shown) may be used to connect the customer load line to either the power service line or the recycled power line.
   c. Used for diversion of reverse power from reactive loads, non-linear load, and from dispersed electrical generator overgeneration of power to be used as recycled power that may be sent to recovery lines.
   d. This mode of operation may be used for net metering contracts with the use of the optional storage capability of the recycled power reconditioning circuit.
   e. This mode of operation may be used for customers which have renewable power contracts that prohibit overgeneration of power into the power grid.
(4) Recycled Power Reconditioning Circuit+Recovery Lines
   a. Recycled power from customer sites connected to the recovery line may be reconditioned and reinserted into the customer service panel for use by the customer load.

(5) Power Sensing and Switching Circuit+Recycled Power Reconditioning Circuit+Recovery Lines
  a. This is the preferred deployment of the present invention.
  b. A power factor correction device for the customer site.
  c. Used for diversion of reverse power from reactive loads, non-linear load, and from dispersed electrical generator overgeneration of power to be used as recycled power that may be sent to recovery lines.
  d. Recycled power may be received from the preconditioned power line, reconditioned, and reinserted via the conditioned power line through the customer service panel and into the customer load.
  e. Any contracts that allow for the sale of wholesale power may be accommodated.
  f. If a dispersed electrical generator is deployed, then the utility power may be looked at as a backup power source.

Macro Model of the Recycled Power System.

Figure 27:
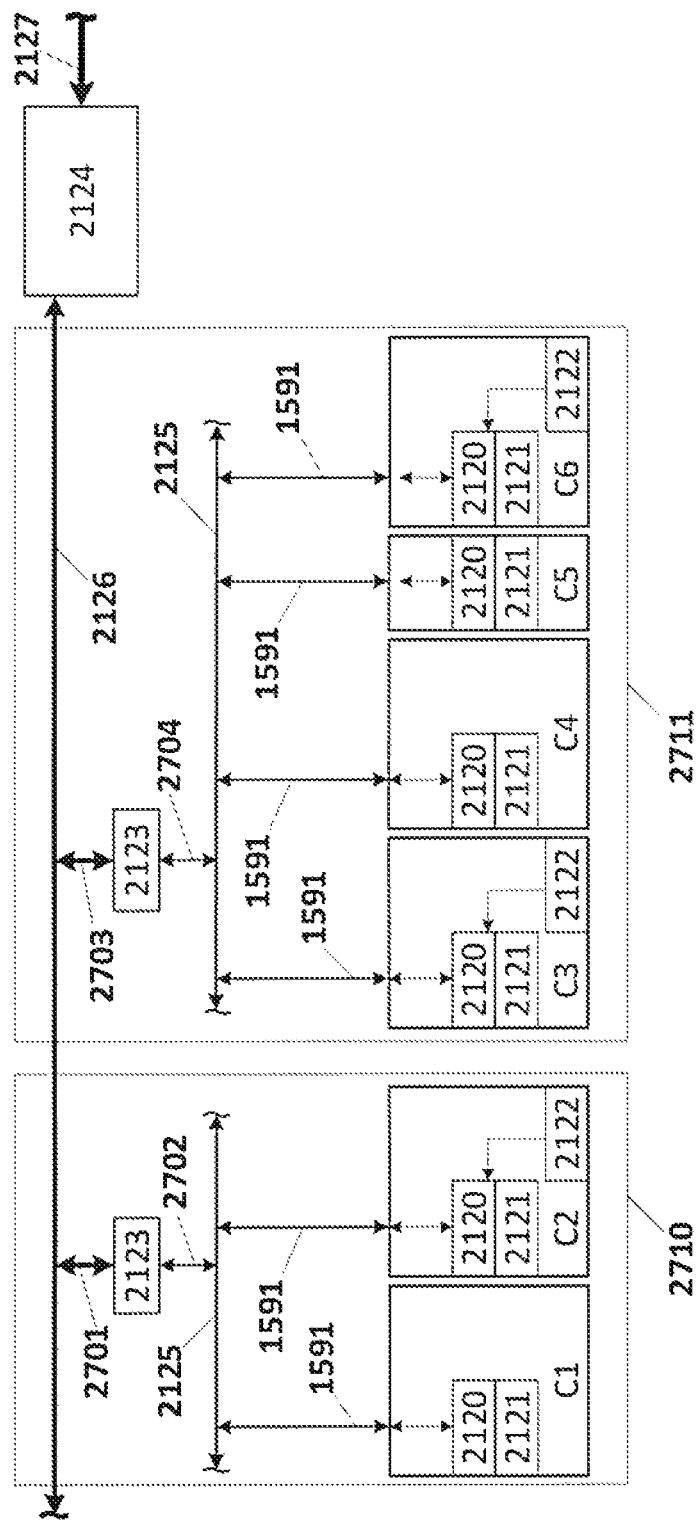
FIG. 27 is a diagram showing power flow in the distribution grid with various combinations of customers with and without dispersed electrical generators, without the present invention.
Figure 28:
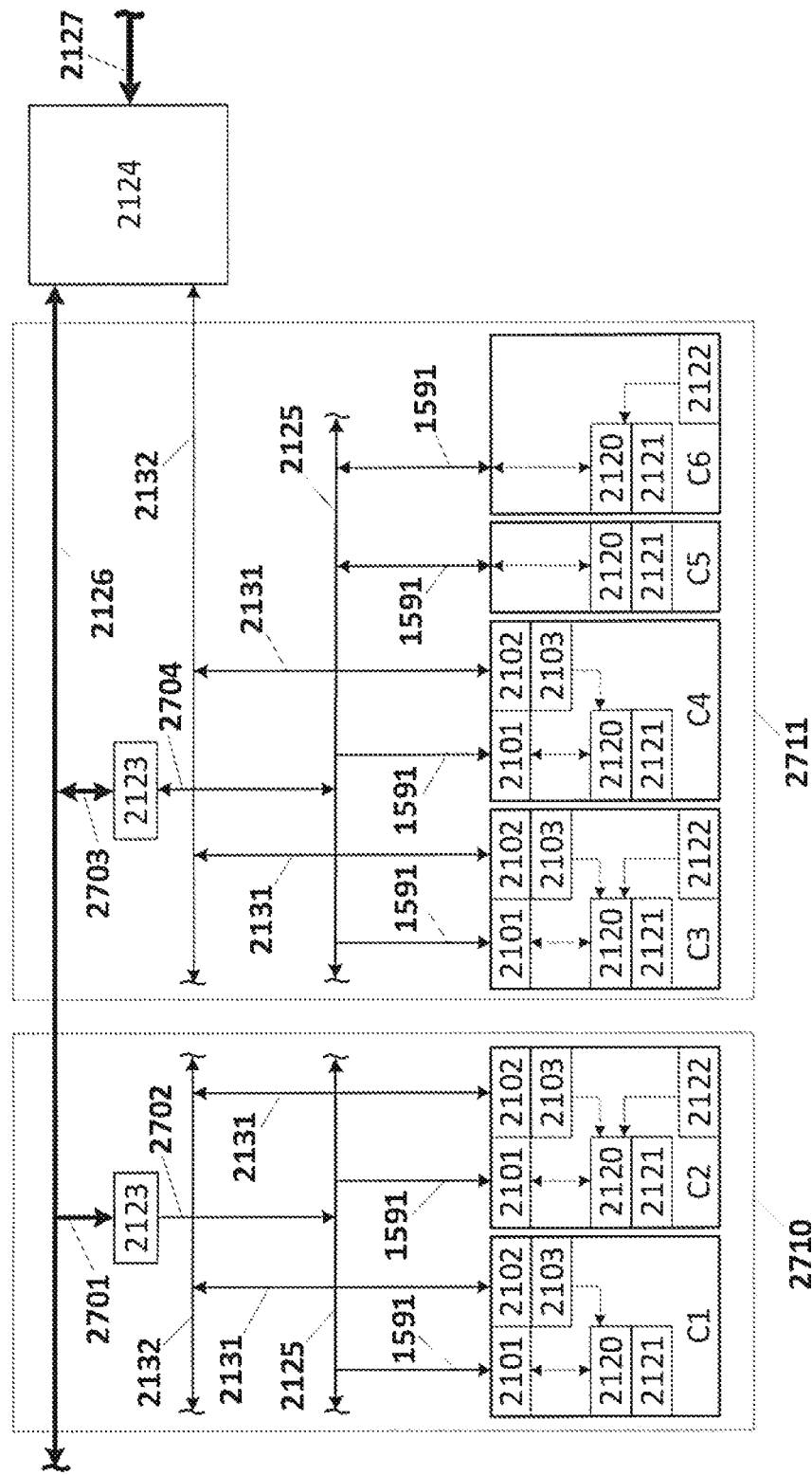
FIG. 28 is a diagram showing power flow in the distribution grid with various combinations of customers with and without dispersed electrical generators, with the present invention.

To get a better understanding on how the present invention may be incorporated into the distribution grid, FIG. 27 shows the distribution grid without the present invention and FIG. 28 shows the distribution grid with the present invention. The following designations apply to both FIGS. 31 and 32. Transmission lines in the transmission grid are shown as high voltage lines 2127 and enter into the substation 2124. Distribution lines in the distribution grid are shown as medium voltage lines 2126 and low voltage lines 2125. The medium voltage lines 2126 may be reduced to a low voltage by using a step-down transformer 2123. The low voltage may be then sent out on to low voltage lines 2125 to customer sites. The low voltage lines 2125 appear as branch circuits connected to the step-down transformer 2123 off of the medium voltage lines 2126 and may only serve the number of customers based on the amount of power that the step-down transformer 2123 can deliver. The flow of power may be shown by the direction of the arrows and the width of the arrow lines showing the high voltage transmission lines (heavy weighted lines), medium voltage lines (medium weighted lines), and low voltage lines (light weighted lines). Customer site locations shown within rectangular boxes enumerated from C1 to C6. There are two different types of customer sites:
  (1) Customer sites without dispersed electrical generators (C1, C4, C5).
  (2) Customer sites with dispersed electrical generators (C2, C3, C6).

Customer sites without dispersed electrical generators have the following:
  (1) Customer service panel 2120 which is connected to the power service line 1591.
  (2) Customer load 2121, which is connected to the customer service panel 2120.

Customer sites with dispersed electrical generators have the following:
  (1) Customer service panel 2120 which is connected to the power service line 1591.
  (2) Customer load 2121, which is connected to the customer service panel 2120.
  (3) A dispersed electrical generator 2122 which is connected to the customer service panel 2120.

The low voltage lines 2125 provide power to each customer site via the power service line 1591. Customer sites are further grouped into customer groups:
  (1) Customer group A shown at 2710 includes customers C1 and C2.
  (2) Customer group B shown at 2711 includes customers C3, C4, C5, and C6.

Both the low voltage lines 2125 and the medium voltage lines 2126 are designed to operate as bidirectional power flow lines, which is represented by arrows at both ends of the line. For customer group A shown at 2710, medium voltage lines 2126 are shown at 2701 and low voltage lines 2125 are shown at 2702. For customer group B shown at 2711, medium voltage lines 2126 are shown at 2703 and low voltage lines 2125 are shown at 2704. The backfeeding (reverse power flow) into the substation 2124 is depicted by the medium voltage line 2126 with arrows on both sides that is entering into the substation 2124.

FIG. 28 shows the same diagram shown in FIG. 27 but with the additional components of the recycled power system which include the following: (1) the power sensing and switching circuit 2101, (2) the power transformer circuit 2102, (3) the recycled power reconditioning circuit 2103, (4) the recovery service lines 2131, and (5) the recovery lines 2132. There are four different types of customer sites with the addition of the recycled power system:
  (1) Customer sites without dispersed electrical generators without the recycled power system (C5).
  (2) Customer sites without dispersed electrical generators with the recycled power system (C1 an C4).
  (3) Customers with dispersed electrical generators without the recycled power system (C6).
  (4) Customers with dispersed electrical generators with the recycled power system (C2 and C3).

Customers who have the recycled power system have additionally the following:
  (1) The power sensing and switching circuit 2101 which is connected between the customer service panel 2120 and the power service line 1591.
  (2) The recycled power reconditioning circuit 2103 which is connected to the customer service panel 2120.
  (3) The power transformer circuit 2102 which is connects the power sensing and switching circuit 2101 and the recycled power reconditioning circuit 2103 to the recovery service line 2131.

For customers C1 and C2 who have implemented the recycled power system, notice that the power service line 1591 has power flow only in the direction towards to the customer site. This is because the recycled power system is diverting the reverse power flow to the recovery service line 2131. Since customers C1 and C2 are the only customers in customer group A shown at 2710, the low voltage line 2125 shown at 2702 will always be in the forward power flow direction. Subsequently, the medium voltage line 2126 shown at 2701 will also be in the forward power flow direction. For customer group A shown at 2710, there is no reverse power flow entering back into the distribution grid, as all customer sites have the recycled power system. Customer C1 is able to receive recycled power from the overgeneration of power produced by the dispersed electrical generator 2122 from customer C2. Since both customers C1 and C2 are connected to the recovery line 2132, the recycled power moves freely between customer sites. The recycled power reconditioning circuit receives the recycled power and reconditions and reinserts it into the customer service panel 2120 for immediate use or the recycled power may be stored in an energy storage system (not shown) that is part of the recycled power reconditioning circuit 2103 for future use. For customer group B shown at 2711, customers C3 and C4 also have the recycled power system and their operation is the same as customers C1 and C2. However, for customer group B shown at 2711, customers C5 and C6 do not have the recycled power system and as such, the power service line 1591 for both customer sites may still create reverse power flow which is shown by the arrows on both ends of the power service line 1591. Because customers C5 and C6 do not have the recycled power system, the reverse power flow is still able to create backfeeding problems. This is shown as bidirectional Tines for both the low voltage line 2125 shown at 2704 and the medium voltage line 2126 shown at 2703. Backfeeding is still occurring as shown by the two arrows on the medium voltage line 2126 that enters into the substation 2124. However, the amount of reverse power flow has been reduced by the diversion of the reverse power flow for customers C1, C2, C3, and C4. If all customers on a distribution grid utilize the recycled power system, then reverse power flow may be mitigated and subsequently the backfeeding problem may be mitigated. Because the recovery line 2132 may be built in sections, only the customer sites connected together by the recovery line 2132 may be able to share power. Customers C1 and C2 are able to share recycled power, and customers C3 and C4 are able to share power. However, customers C1 and C2 are not able to share recycled with customers C3 and C4 until the recovery line 2132 connects both sites together. Customers C3 and C4 are shown connected to the substation 2124, which allows them to participate in any wholesale power sales. The present invention implemented as a recycled power system for addressing reverse power flow may allow for the automatic balancing of power generation, power storage, and power recovery closer to customer demand. The present invention may operate with no utility intervention and no changes to how existing dispersed electrical generators operate. The solution addresses the distribution grid backfeeding issue by preserving the current distribution grid support structure assets and augmenting them with low voltage recovery lines 2132 to create a new distribution grid that may solve the backfeeding issue. The recovery lines 2132 may be incrementally built and may be immediately used even if they are not connected back to the substation. The solution also allows customers who have invested in dispersed electrical generators to participate in the wholesale power market.

Recovery Lines: Aerial and Underground Considerations.

There are two ways that service is typically provided to residential and commercial customers. The first is aerial implementation via utility poles, and the second is via underground easements.

Figure 29:
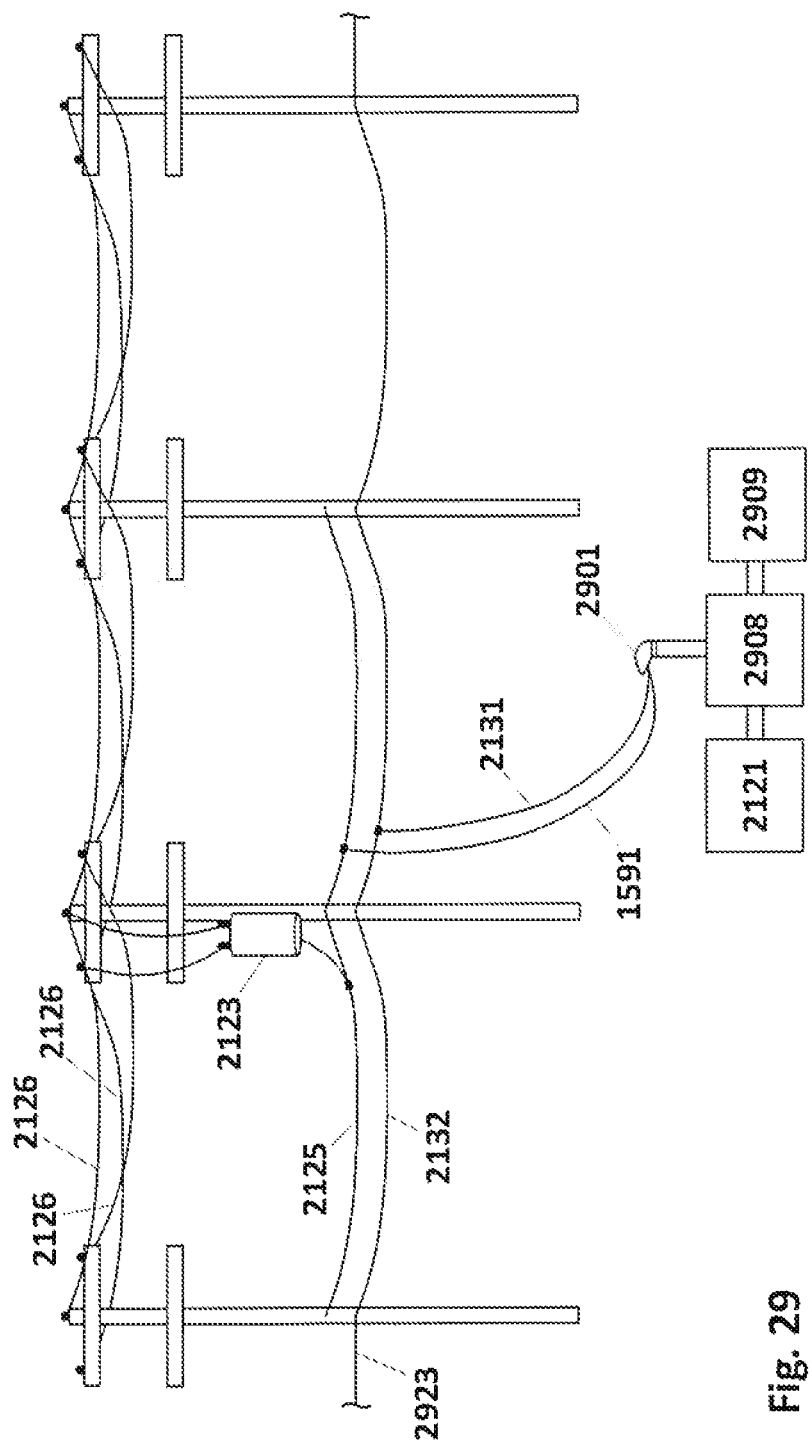
FIG. 29 is a schematic side-elevation view of an embodiment of the present invention connected to above ground power lines.

FIG. 29 depicts how the recovery lines 2132 and the recovery service lines 2131 would work in an aerial implementation. Details of the utility poles and lines are purposely left out to provide a better understanding of where the recovery lines may be implemented. The diagram has a side-elevation view of the aerial implementation of the embodiment. Medium voltage lines 2126 and are at the top of the utility poles. The medium voltage is reduced by the step-down power transformer 2123 and then sent through the low voltage lines 2125. The low voltage lines 2125 are below the medium voltage lines 2126 on the utility poles. The low voltage lines 2125 are connected to the power service line 1591, entering the customer site via a weatherhead shown at 2901 (weatherproof service drop entry point where overhead power enters a building through an entry pipe, with a rounded cap designed to keep water out of the entry pipe) and terminates to a customer service panel (not shown) inside of an existing utility cabinet 2908. The customer service panel (not shown) connects the power service line 1591 to the customer load 2121. The recovery lines 2132 may be insulated low voltage cables that make it possible to be used at low voltage heights on the utility poles. The recovery lines may be connected to the recovery service line 2131, entering the customer site via the same weatherhead 2901 as used by the power service lines 1591. The recovery service lines 2131 may then be terminated to the power transformer circuit (not shown) which in turn is connected to the power sensing and switching circuit (not shown) and the recycled power reconditioning circuit (not shown), which are located inside the new utility cabinet system 2909. The recovery lines 2132 continue via 2923 to either the next utility pole (not shown) or to the substation (not shown).

Figure 30:
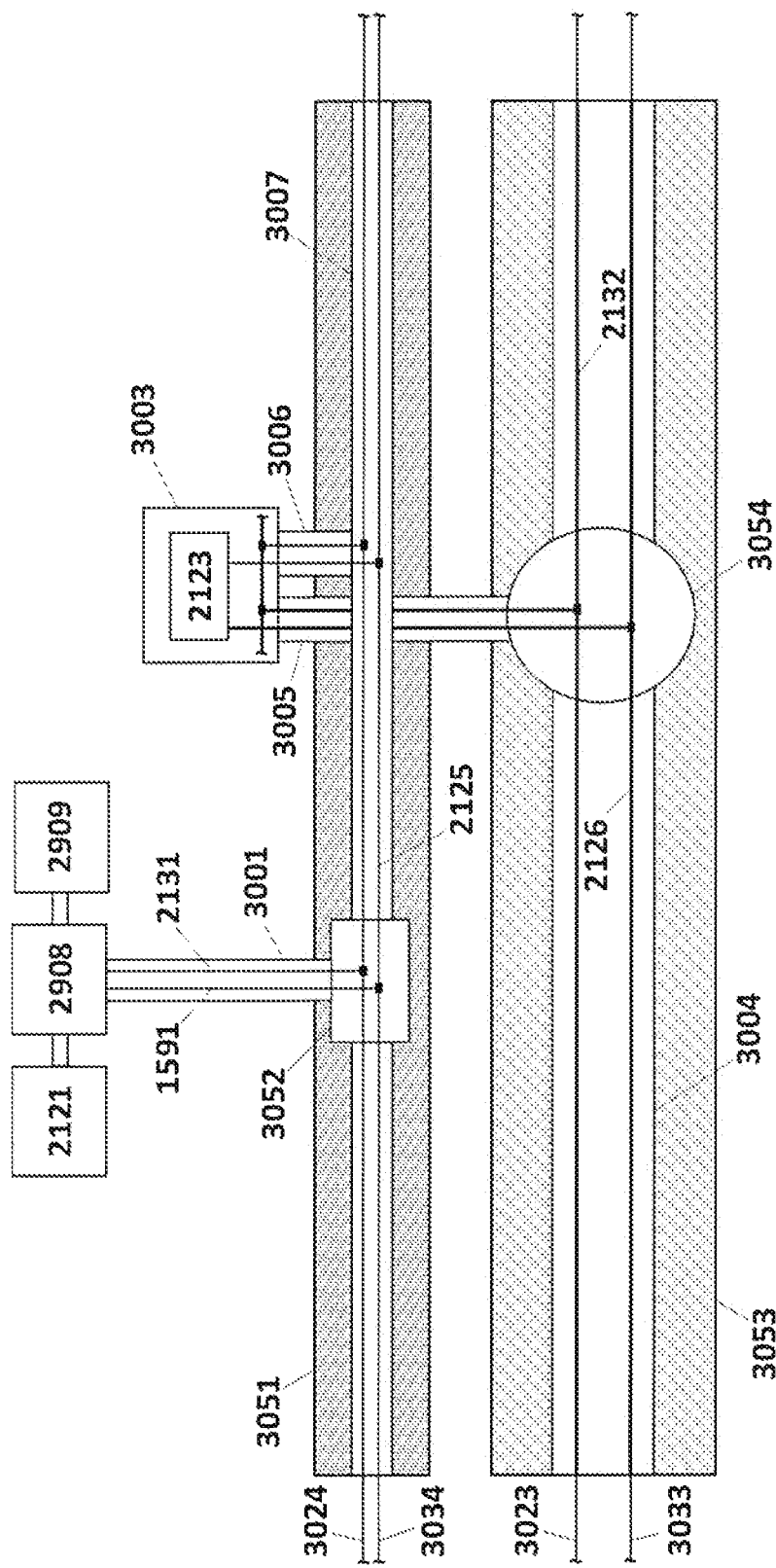
FIG. 30 is a schematic top plan view of an embodiment of the present invention connected to underground power lines.

FIG. 30 depicts how the recovery lines 2132 and the recovery service lines 2131 would work in an underground implementation. Details of the underground infrastructure are purposely left out to provide a better understanding of where the recovery lines may be implemented. The diagram has a schematic top plan view of the underground implementation of the embodiment. Medium voltage lines 2126, run through conduits in the roadway 3004 that run within the roadway 3053 and through manholes 3054. The medium voltage lines 2126 continues via 3033 to the next manhole (not shown) or to the substation (not shown). The medium voltage lines 2126, run through conduits that connect manholes to the power transformer on the sidewalk 3005, then connect to a step-down power transformer 2123, enclosed in a utility cabinet on the sidewalk shown at 3003 on a transformer pad (not shown) on the sidewalk 3051. The medium voltage is reduced by the step-down power transformer 2123, sent through conduits that connect the power transformer to the sidewalk conduits 3006, and then to low voltage lines 2125. The low voltage lines 2125 are then sent through conduits that run under the sidewalk 3007, and are connected to power service lines 1591, entering the customer site through handholes 3052, then through conduits that connect the handholes to the existing utility cabinet 3001, which passes through an existing utility cabinet 2908 and terminates to a customer service panel (not shown) inside of the existing utility cabinet 2908. The customer service panel (not shown) connects the power service line 1591 to the customer load 2121. The low voltage lines 2125 continue via 3034 to the next handhole (not shown) servicing other customer sites. The recovery lines 2132 may be insulated low voltage cables that make it possible to be used in utility underground implementations. The recovery lines 2132 may be connected to the recovery service line 2131, entering the customer site via the same conduits as the power service lines 1591. The recovery service lines 2131 may then be terminated to the power transformer circuit (not shown) which in turn is connected to the power sensing and switching circuit (not shown) and the recycled power reconditioning circuit (not shown), which are located inside the new utility cabinet system 2909. The recovery lines 2132 continue via 3024 to the next handhole (not shown) servicing other customer sites. The recovery lines 2132 also continue via 3023 to the next manhole (not shown) or to the substation (not shown).

Recovery Line Reinsertion to the Power Grid.

Connecting recovery lines back into the power grid (reinsertion) could be done at several locations on the medium voltage lines. However, the preferable location would be at the substation since this is where the high voltage transmission lines and the medium voltage lines are connected. Power created closest to the consumption location may be cheaper than the power transported from far distances. The lowest cost of power should be considered the primary source of power, therefore, the recovery lines may be the primary source of power for customers on a distribution grid and the power delivered by the high voltage transmission lines would be the secondary power source for these customers, which may be the backup power to the distribution grid. A microgrid may be a small network of electricity users which have enough dispersed electrical generators to produce enough power to function without requiring utility power but may be connected to the power grid for backup. When the power created by the recovery lines can sustain power for the customer loads attached to it, the distribution grid would operate as an independent grid within a grid which is the definition of a microgrid. The reinsertion of power back at the substation would occur when the recovery lines are generating more power than is being consumed. The recovery lines carry recycled power and reconditioning of the power may be required before it is reintroduced back into the distribution grid or if it is to be sold back to the utility. The recycled power reclamation process is described below.

FIG. 31 depicts a functional block diagram of the preferred connectivity of the recovery lines to reclaim the recycled power at the substation. The following three power lines types are as follows.

(1) Utility owned high voltage lines 2127.
(2) Utility owned medium voltage lines:
   a. Utility pole power lines shown at 3110.
   b. Underground power lines shown at 3111.
(3) Low voltage recovery lines:
   a. Utility pole recovery lines shown at 3120.
   b. Utility underground recovery lines shown at 3121.

The following four functional blocks are summarized as follows.

(1) Recycled power reconditing system at 3100.
   a. Step-down power transformer-A shown at 3101.
   b. Rectifier system shown at 3102.
   c. Inverter-A system shown at 3103.
   d. Step-up power transformer-B shown at 3104.
(2) Medium voltage system shown at 3140.
   a. Cross-connect system shown at 3141.
   b. Control system shown at 3142.
(3) High voltage system shown at 3150.
   a. Step-down power transformer-C shown at 3151.
(4) Electrical energy storage system shown at 3130.
   a. Electrical storage device shown at 3131.
   b. Inverter-B system shown at 3132.

High Voltage System.

The high voltage system 3150 may be connected to the medium voltage system 3140 via a step-down power transformer-C 3151. The step-down power transformer-C 3151 transforms the high voltage on the high voltage lines 2127 to the medium voltage used on the medium voltage lines.

Recycled Power Reconditioning System.

The recycled power reconditioning system 3100 shows the low voltage utility pole recovery lines 3121 and the low voltage underground recovery lines 3130 connected to a step-down power transformer-A 3101. The recovery lines may have the same cable specifications as the low voltage lines (not shown) used to carry power on the distribution grid, which have a maximum voltage of +600 volts AC. The step-down power transformer-A 3101 may then convert the +600 volt AC power to a preferable low voltage shown as LV (for example +240 volts AC), Recycled power is carried on the low voltage recovery lines and may have a distorted voltage waveform due to the reverse power flow power diversion process and will require reconditioning to utility specifications for reinsertion back into the power grid. A recycled power reconditioning system 3100 may include a rectifier system 3102 which may convert the power from the step-down power transformer-A 3101 to a DC voltage which may then be converted back to a low voltage by an inverter-A system 3103, which meets utility specifications. The step-up power transformer-B 3104 may then convert the low voltage to the existing utility medium voltage shown as MV (for example 5 kV or 12 kV) used on the existing medium voltage lines.

Electrical Energy Storage System.

Stored energy in a standalone electrical energy storage system 3130 may be converted to a low voltage by an inverter-B system 3132 which may then be connected to the low voltage connection shared by the inverter-A system 3103. This method of connectivity may allow the recycled power reconditioning system 3100 and electrical energy storage system 3130 to operate independently from each other. Additional storage capacity may easily be added using this connectivity approach. Electrical storage devices 3131 (such as a battery or flywheel) may be charged by using the recycled power that has been reconditioned. In this way, the new generation of power may be conserved and only recycled power is used for energy storage.

Medium Voltage System.

The medium voltage system 3140 may connect the recycled power reconditioning system 3100 and the high voltage system 3150 to the outgoing medium voltage utility pole lines 3110 and medium voltage underground power lines 3111 through a cross-connect system 3141. The cross-connect system 3141 may be envisioned as an augmentation of the existing power cable connections (not shown) but with relay switches (not shown) that may be controlled by a control system 3142. The cross-connect system 3141 may allow for the any-to-any connection of power generation sources (reconditioned power, storage generation power, or utility generated power). The control system 3142 operates within the medium voltage system 3140 and may have the primary function of balancing the incoming power generated by the recycled power reconditioning system 3100, the high voltage system 3150, and the electrical energy storage system 3130 with the demand on the medium voltage lines. The control system's control signals are shown as dashed lines. The control system 3142 may be equipped with communications capability (not shown), which may allow the utility to balance, control, and monitor the power within the substation or from a remote location. During peak times of operation when the recovery lines are operating at capacity, the control system 3142 may instruct the electrical energy storage system 3130 to store the excess power for later use. At the point where the amount of excess power generated may be over the capacity of both the distribution grid and the electrical energy storage system capacities, the overgeneration of power may be sold as wholesale power back to the utility. The important thing to note here is that since the overgeneration of power will appear to the utility as a mini-power plant, the connection to the power grid may be accomplished in the same manner that current generated power is connected to the transmission grid which has been working reliably for over a century.

Present Invention Example Customer Site Implementation.

Figure 32:
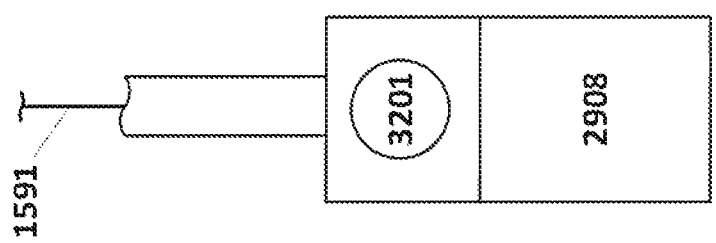
FIG. 32 is a block diagram showing an example customer site before installation of a system according to the present invention.

FIG. 32 depicts a typical customer site which may have the power service line 1591 connected to a utility meter 3201 which may then be connected to an existing utility cabinet 2908 that houses a customer service panel (not shown).

Figure 33:
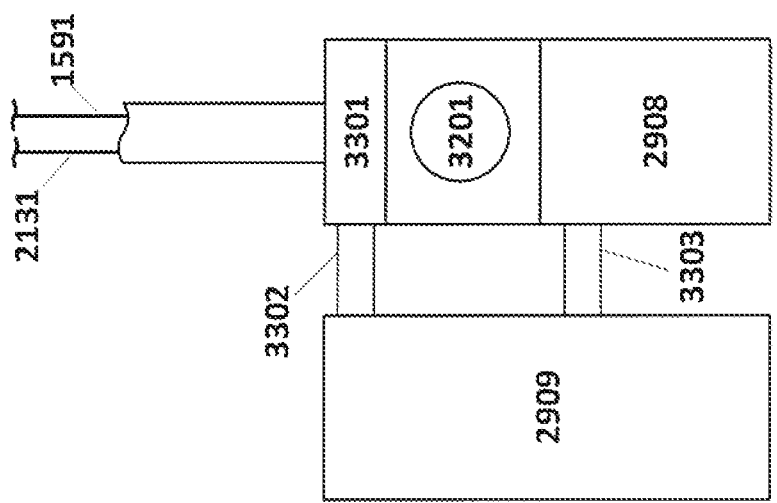
FIG. 33 is a block diagram showing an example customer site after installation of a system according to the present invention.

FIG. 33 depicts the present invention example customer site implementation. Cables are needed to interconnect the power service line 1591 and recovery service line 2131 to the present invention which is accomplished by implementing a new utility cabinet extension 3301 located above the utility meter 3201 but could also be located below the utility meter 3201. All power cables and sensor lines used for the present invention may then be extended through a conduit 3302 to the recycled power system (not shown) enclosed in a preferred new utility cabinet system 2909. The cable extension implementation allows the new utility cabinet to be located in an alternate location from what is shown in the figure. The reconditioned power may then be reinserted into the customer service panel (not shown) located in the existing utility cabinet 2908 via a conduit 3303.

INDUSTRIAL APPLICABILITY

While the power sensing and switching circuit has been disclosed in connection with the preferred embodiments described herein, there may be other embodiments that fall within the spirit and scope of the power sensing and switching circuit, as defined by the claims. Accordingly, no limitations are to be implied or inferred in this power sensing and switching circuit, except as specifically and explicitly set forth in the claims. This power sensing and switching circuit may be used in any situation in which real time detecting and mitigating or reuse of reverse power flow is desired, including (without limitation) power factor correction, overgeneration by dispersed electrical generators, and energy storage by energy storage systems.

What is claimed is:

1. A device for mitigating reverse power flow to a power source providing an alternating current to a load, said alternating current alternating according to a current waveform and having a cyclically varying voltage alternating between a minimum and a maximum at a frequency that defines a cycle duration, wherein said varying voltage has a voltage waveform, whereby changes in current flow direction define current middle crossing points, whereby said load changes said current waveform so said current waveform fluctuates, may vary in periodicity, and may differ from said voltage waveform, and whereby noise is introduced into said alternating current by extraneous sources or said device, comprising:

a power supply having a power supply positive voltage and a power supply negative voltage that creates a reference voltage midway between said power supply positive voltage and said power supply negative voltage;

a voltage sensor connected to said power source, whereby said voltage sensor senses said varying voltage and outputs in real time a voltage-representative voltage signal with approximately said voltage waveform, scaled and biased to be centered between said power supply positive voltage and said power supply negative voltage and with crossing points over said reference voltage defining voltage middle crossing points at the ends and midpoint of each cycle;

a current sensor connected to said load, whereby said current sensor senses said alternating current and outputs in real time a current-representative voltage signal with approximately said current waveform, scaled and biased to be centered between said power supply positive voltage and said power supply negative voltage and also scaled to be able to be compared with said reference voltage;

a voltage any to square wave converter that has a voltage converter propagation delay, to receive said voltage-representative voltage signal and compare said voltage-representative voltage signal with said reference voltage, having a hysteresis circuit to generate a high voltage trigger point voltage in response to a voltage-representative voltage signal higher than said voltage middle crossing point plus said noise, and a low voltage trigger point voltage in response to a voltage-representative voltage signal lower than said voltage middle crossing point minus said noise, and that outputs voltage square waves that are high in response to said high voltage trigger point voltage and low in response to said low voltage trigger point voltage, whereby a voltage square wave that transitions from low to high and back to low again constitutes a voltage pulse;

a current any to square wave converter that has a current converter propagation delay, to receive said current-representative voltage signal, and to compare said current-representative voltage signal with said reference voltage, having a hysteresis circuit, to generate a high current trigger point voltage in response to a current-representative voltage signal higher than said current middle crossing voltage plus said noise, and a low current trigger point voltage in response to a current-representative voltage signal lower than said current middle crossing voltage minus said noise, and that outputs current square waves that are high in response to said high current trigger point voltage and low in response to said low current trigger point voltage, whereby a current square wave that transitions from low to high and back to low again constitutes a current pulse having a leading edge and a trailing edge, that has a current pulse length;

wherein said voltage converter propagation delay and said current converter propagation delay are substantially identical;

a polarity checker that compares said voltage square waves and said current square waves that generates a polarity pulse when said voltage square wave is high and said current square wave is low, and also when said voltage square wave is low and said current square wave is high;

a pulse extender connected to said current any to square wave converter that extends a current pulse for a pulse duration time and continues to extend said pulse duration time if a subsequent current pulse arrives in less than a cycle duration, whereby an extended current pulse indicating reliable current for said pulse duration time is created;

a switch control leading to an output operably connected to said pulse extender and said polarity checker that enables said polarity checker only for said pulse duration time, whereby when said polarity pulse is high, reverse power flow is considered to be possibly present, and when said polarity pulse is low, reverse power flow is not considered to be possibly present, but said polarity checker is enabled only if said extended current pulse indicates reliable current, whereby said switch control indicates to said output reverse power flow when reliable current is indicated and reverse power flow is considered to be possibly present, and said switch control indicates to said output no reverse power flow when reliable current is not indicated or when reverse power flow is not considered to be possibly present.

2. A device according to claim 1, wherein said high current trigger point and said high voltage trigger point are substantially identical, and said low current trigger point and said low voltage trigger point are substantially identical.

3. A device according to claim 1, wherein said pulse extender further comprises:

a leading pulse lengthener triggered by said leading edge of said current pulse having a leading pulse length of greater than half of said cycle duration but less than said cycle duration; and a trailing pulse lengthener triggered by said trailing edge of said current pulse having a trailing pulse length of slightly less than said cycle duration; and a two-input OR gate connected to said leading pulse lengthener and said trailing pulse lengthener that extends said pulse duration time of said pulse extender if either of said leading pulse lengthener or said trailing pulse lengthener is triggered;

whereby said leading pulse lengths and said trailing pulse lengths overlap each other to cover periodicity of current pulses that may vary in periodicity from said voltage pulses.

4. A device according to claim 1, wherein said pulse extender further comprises:

a leading pulse lengthener triggered by said leading edge of said current pulse having a leading pulse length of greater than half of said cycle duration but less than said cycle duration; and a trailing pulse lengthener triggered by said trailing edge of said current pulse having a trailing pulse length of slightly less than said cycle duration; and a three-input OR gate connected to said leading pulse lengthener and said trailing pulse lengthener and that also receives said current pulse, that extends said pulse duration time of said pulse extender if said leading pulse lengthener is triggered or said trailing pulse lengthener is triggered or said current pulse is received;

whereby said leading pulse lengths and said trailing pulse lengths and said current pulse lengths overlap each other to cover periodicity of current pulses that may vary in periodicity from said voltage pulses.

5. A device according to claim 1, wherein said pulse extender further comprises:

a trailing pulse lengthener triggered by said trailing edge of said current pulse having a trailing pulse length of slightly less than said cycle duration; and a 2-input OR gate connected to said trailing pulse lengthener and that receives said current pulse that extends said pulse duration time of said pulse extender if said trailing pulse lengthener is triggered or said current pulse is received;

whereby said trailing pulse lengths and said current pulse lengths overlap each other to cover periodicity of current pulses that may vary in periodicity from said voltage pulses.

6. A device according to claim 1, wherein said output comprises a monitoring circuit connected to said voltage sensor, said current sensor, and said switch control, that provides reverse power flow metering information.

7. A device according to claim 6, wherein said pulse extender further comprises:

a trailing pulse lengthener triggered by said trailing edge of said current pulse having a trailing pulse length of slightly less than said cycle duration; and whereby said trailing pulse lengths cover periodicity of current pulses that may vary in periodicity from said voltage pulses.

8. A device according to claim 1, wherein said power source is a power service line and said load is a customer load line, wherein said output comprises:

a single pole double throw switch controlled by said switch control connecting said power service line to (1) said customer load line, when said output of said switch control indicates no reverse power flow, and (2) a recycled power line, when said output of said switch control indicates reverse power flow, that diverts said alternating current from said customer load line to said recycled power line as recycled power.

9. A device according to claim 8, further comprising:

a power transformer circuit connected to said recycled power line;

a preconditioned power line connected to said power transformer circuit;

a recycled power reconditioning circuit containing a recycled energy storage system connected to said preconditioned power line;

whereby when said output of said switch has said recycled power, said alternating current flows from said recycled power line through said power transformer circuit, through said preconditioned power line to said recycled power reconditioning circuit and into said recycled energy storage system.

10. A device according to claim 1, wherein said output comprises:

a single pole single throw switch controlled by said switch control connected to said load that opens when said switch control indicates reverse power flow and closes when said switch control indicates no reverse power flow.

11. A device according to claim 10, wherein said pulse extender further comprises:

a trailing pulse lengthener triggered by said trailing edge of said current pulse having a trailing pulse length of slightly less than said cycle duration; and whereby said trailing pulse lengths cover periodicity of current pulses that may vary in periodicity from said voltage pulses.

* * * * *